United States Patent [19]

Ohara et al.

[11] Patent Number: 4,750,045

[45] Date of Patent: Jun. 7, 1988

[54] LIGHT BEAM SCANNING SYSTEM

[75] Inventors: Yuji Ohara; Kenichi Yamagishi; Takashi Shoji; Masaaki Konno; Hiroshi Kushima, all of Kaisei, Japan

[73] Assignee: Fuji Photo Film Co., Ltd., Minamiashigara, Japan

[21] Appl. No.: 895,997

[22] Filed: Aug. 13, 1986

[30] Foreign Application Priority Data

| Aug. 15, 1985 | [JP] | Japan | 60-179869 |
| Aug. 29, 1985 | [JP] | Japan | 60-190556 |
| Sep. 6, 1985 | [JP] | Japan | 60-197306 |
| Sep. 6, 1985 | [JP] | Japan | 60-197307 |
| Sep. 6, 1985 | [JP] | Japan | 60-197308 |
| Sep. 24, 1985 | [JP] | Japan | 60-210392 |
| Sep. 24, 1985 | [JP] | Japan | 60-210393 |
| Sep. 24, 1985 | [JP] | Japan | 60-210394 |
| Sep. 26, 1985 | [JP] | Japan | 60-213463 |
| Oct. 9, 1985 | [JP] | Japan | 60-225869 |
| Oct. 9, 1985 | [JP] | Japan | 60-225870 |
| Oct. 9, 1985 | [JP] | Japan | 60-225871 |
| Jan. 30, 1986 | [JP] | Japan | 61-18591 |
| Feb. 3, 1986 | [JP] | Japan | 61-21726 |
| Mar. 20, 1986 | [JP] | Japan | 61-63370 |
| Apr. 18, 1986 | [JP] | Japan | 61-90542 |

[51] Int. Cl.⁴ ............................................. H04N 1/04
[52] U.S. Cl. ..................................... 358/285; 358/293

[58] Field of Search ............... 358/285, 293, 199, 206; 250/566

[56] References Cited

U.S. PATENT DOCUMENTS

| 4,321,628 | 3/1982 | Cream | 358/285 |
| 4,445,126 | 4/1984 | Tsukada | 358/285 |
| 4,584,612 | 4/1986 | Ono | 358/285 |

Primary Examiner—Edward L. Coles, Sr.
Attorney, Agent, or Firm—Fleit, Jacobson, Cohn & Price

[57] ABSTRACT

A light beam scanning system two-dimensionally scans a recording medium with a light beam to record image information on or read out recorded image information from a recording medium such as a stimulable phosphor sheet. The light beam scanning system includes a main scanning light deflector for deflecting a light beam in a main scnning direction, an auxiliary scanning light deflector angularly movable about an axis for deflecting the light beam in an auxiliary scanning direction normal to the main scanning direction, and an image-forming lens disposed between the main and auxiliary scanning light deflectors. The recording medium is supported by a recording medium support and scanned with the light beam deflected by the main and auxiliary scanning light deflectors. The recording medium support includes an arcuate support surface having a center of curvature substantially aligned with the axis of angular movement of the auxiliary scanning light deflector.

53 Claims, 42 Drawing Sheets

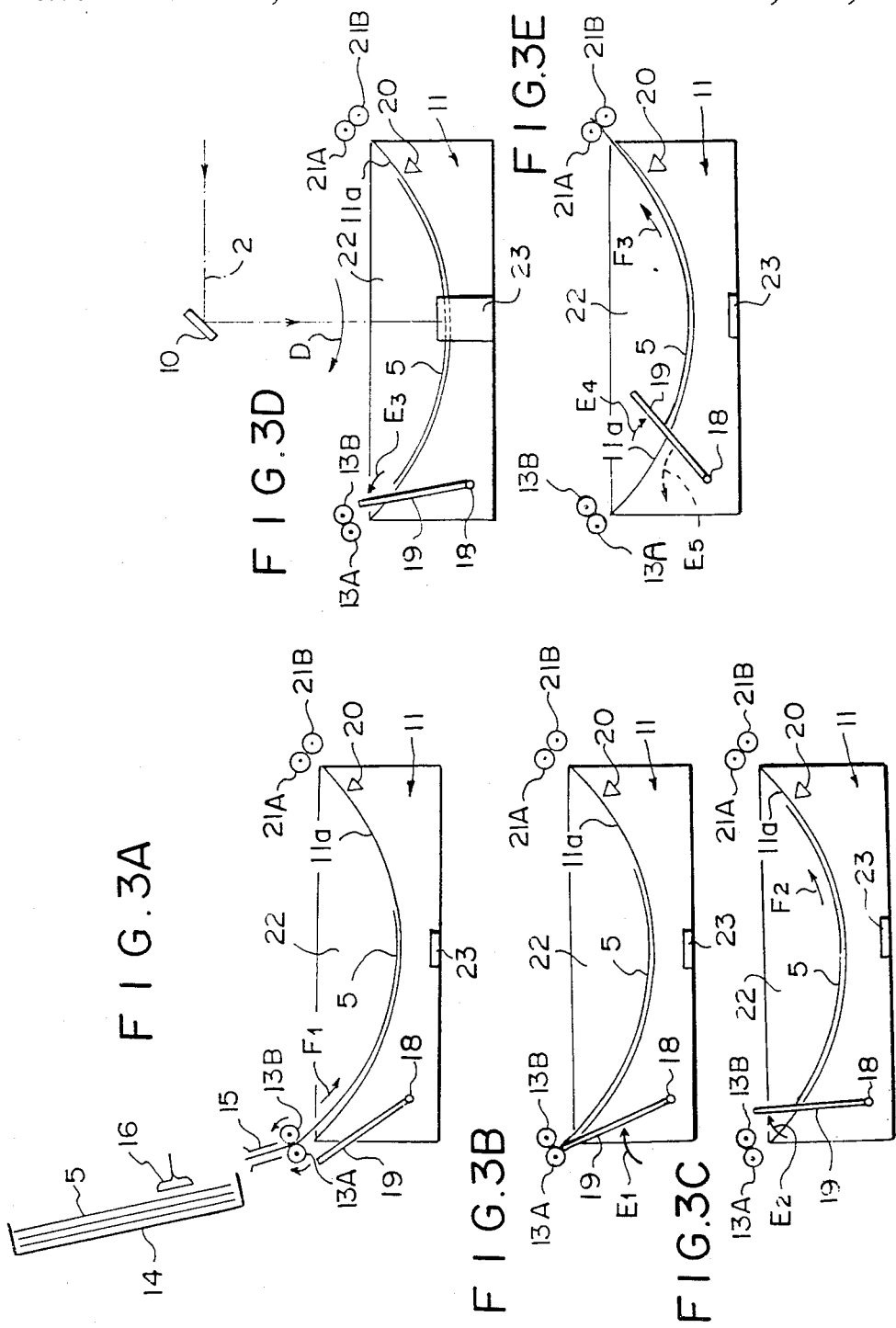

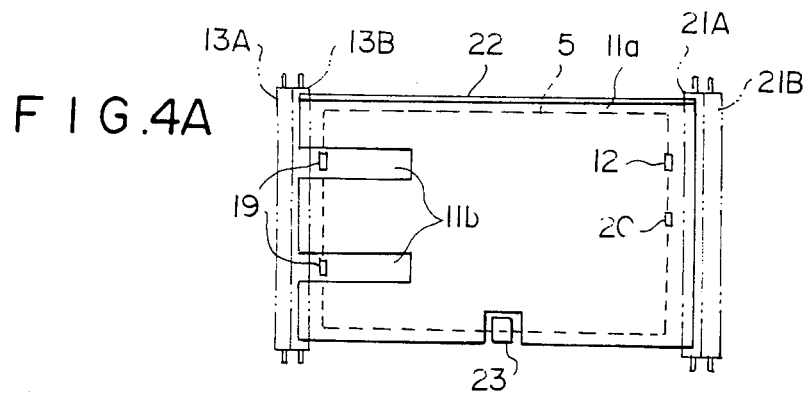
FIG. 4A
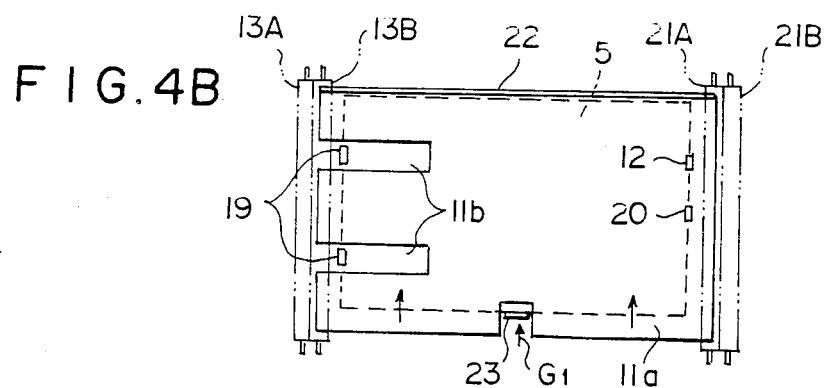
FIG. 4B
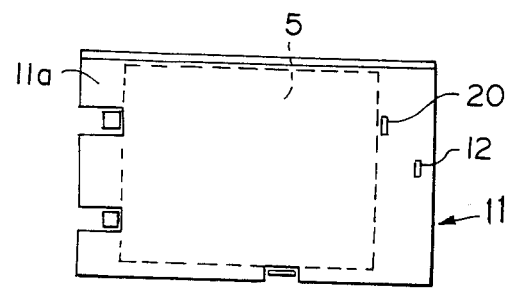
FIG. 6
FIG. 7
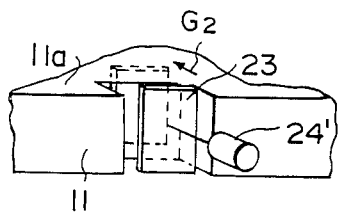

F I G. 5A
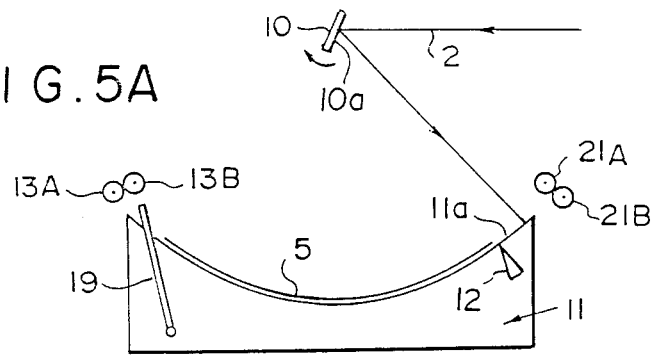
F I G. 5B
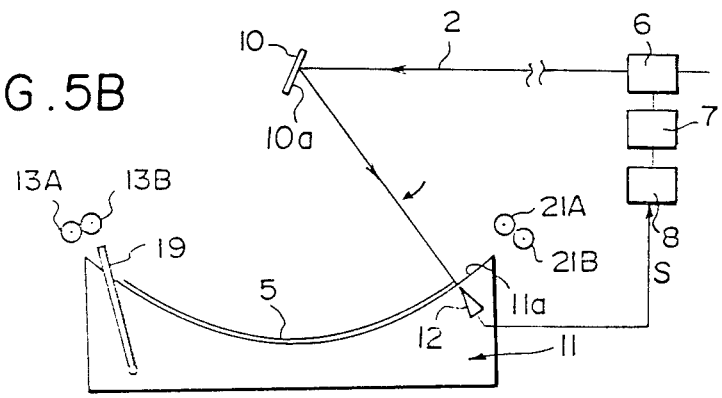
F I G. 5C
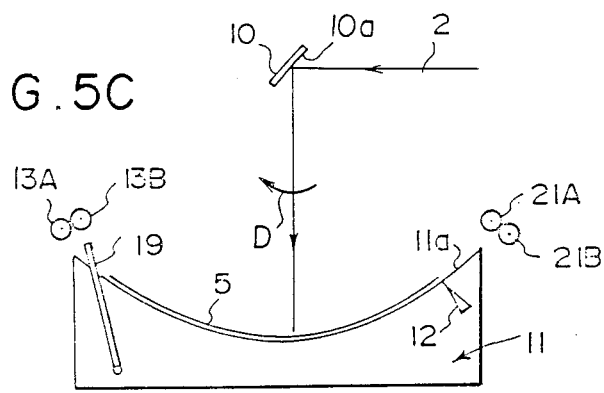

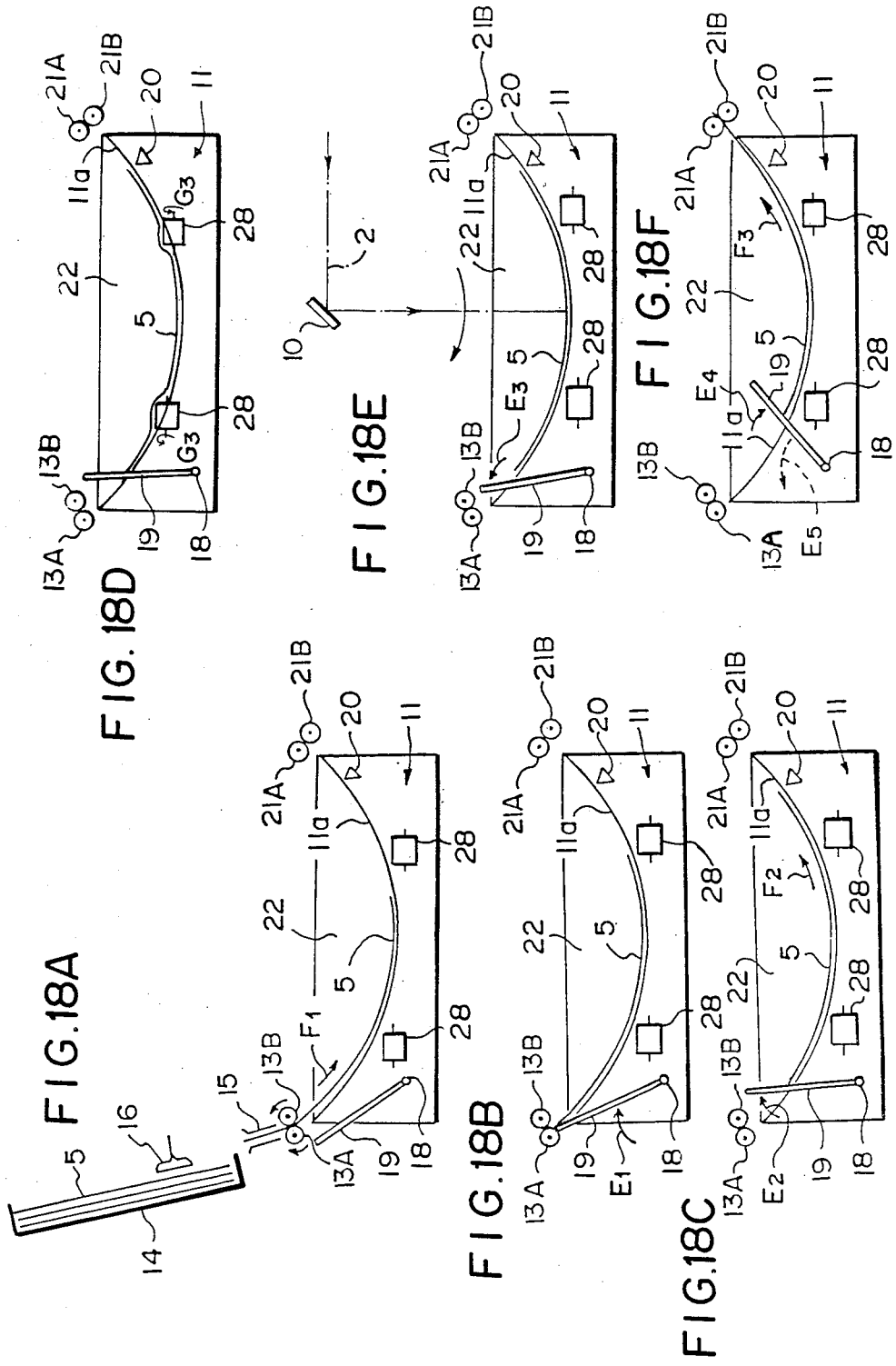

F I G. 19A
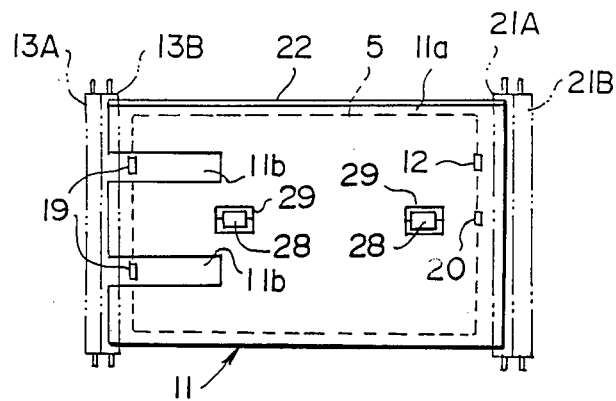
F I G. 19B
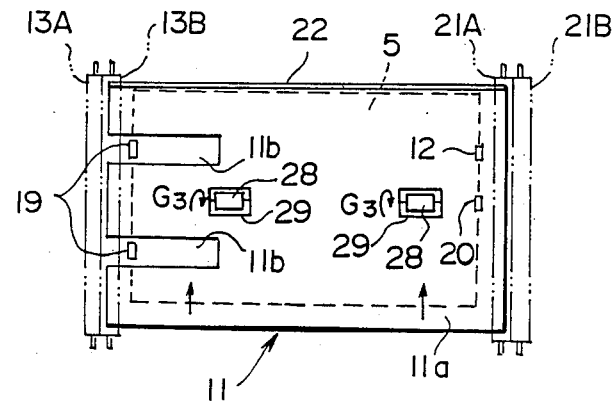
F I G. 20
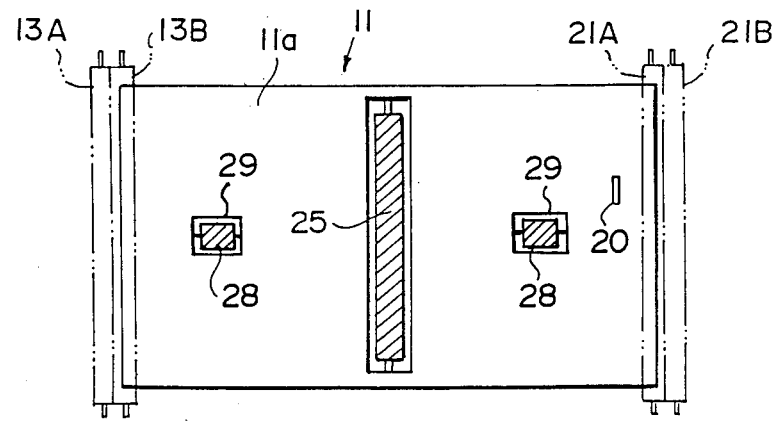

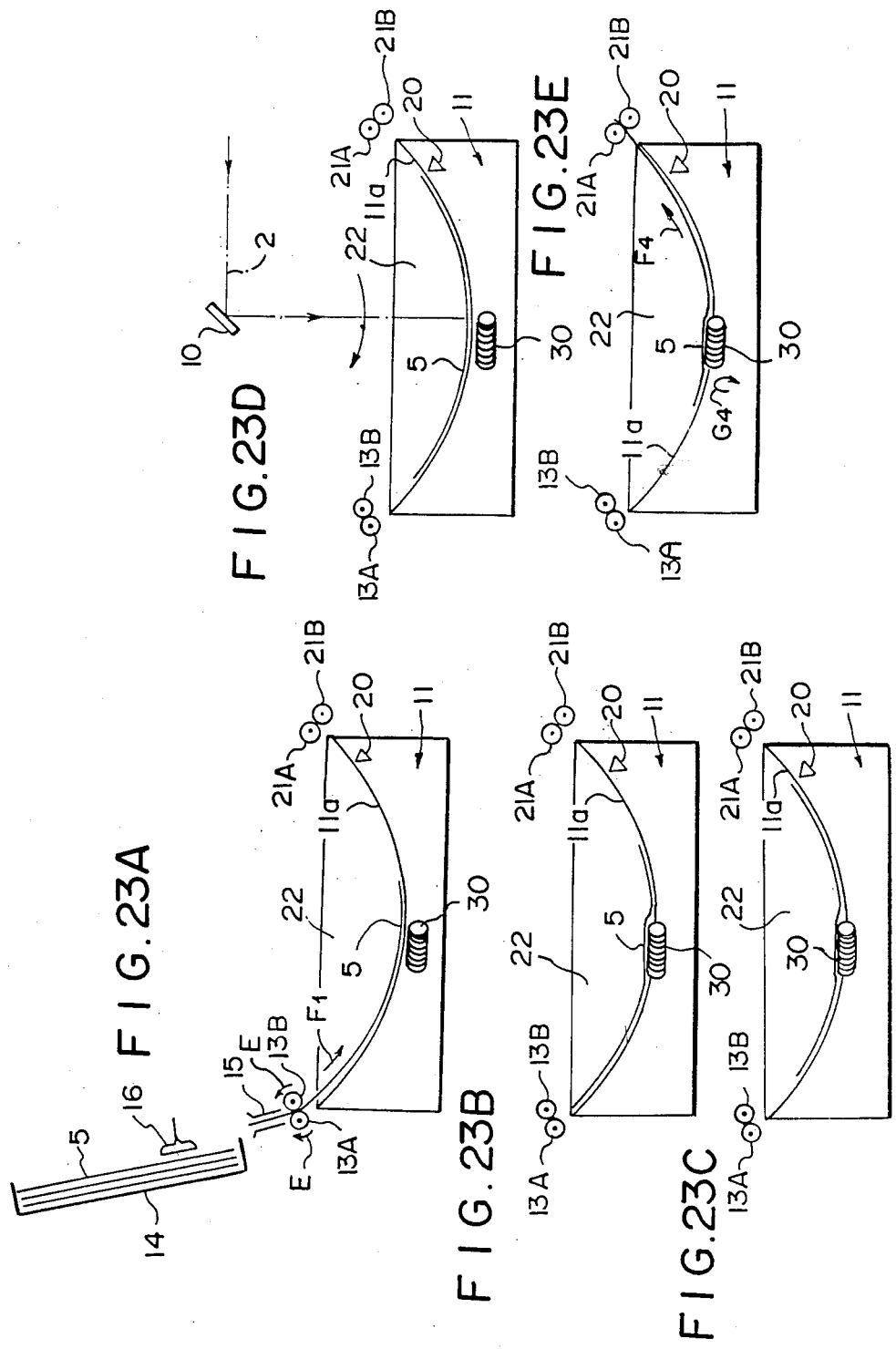

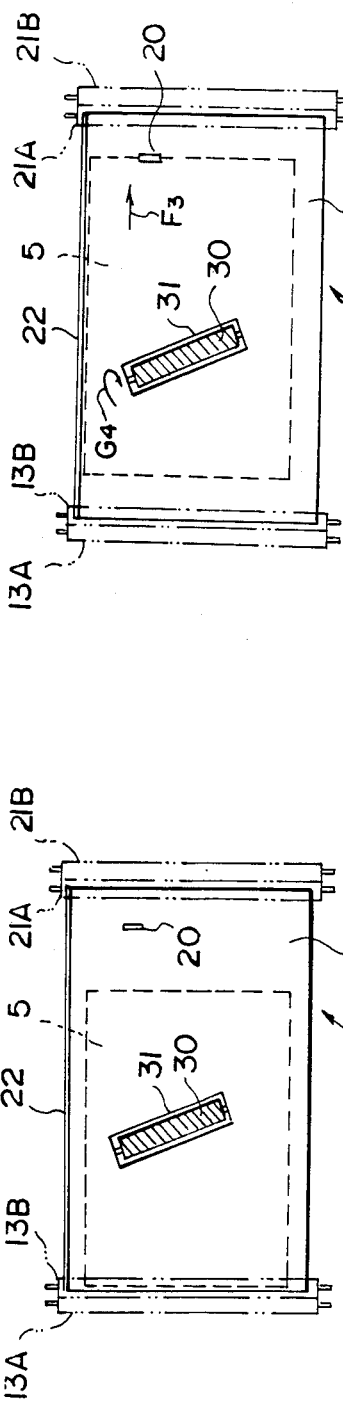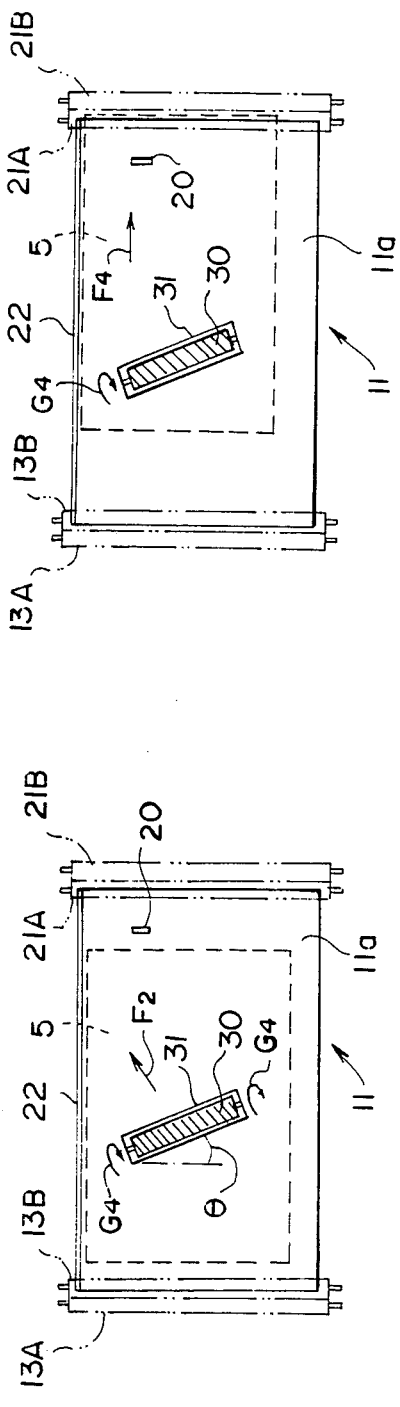

F I G. 29
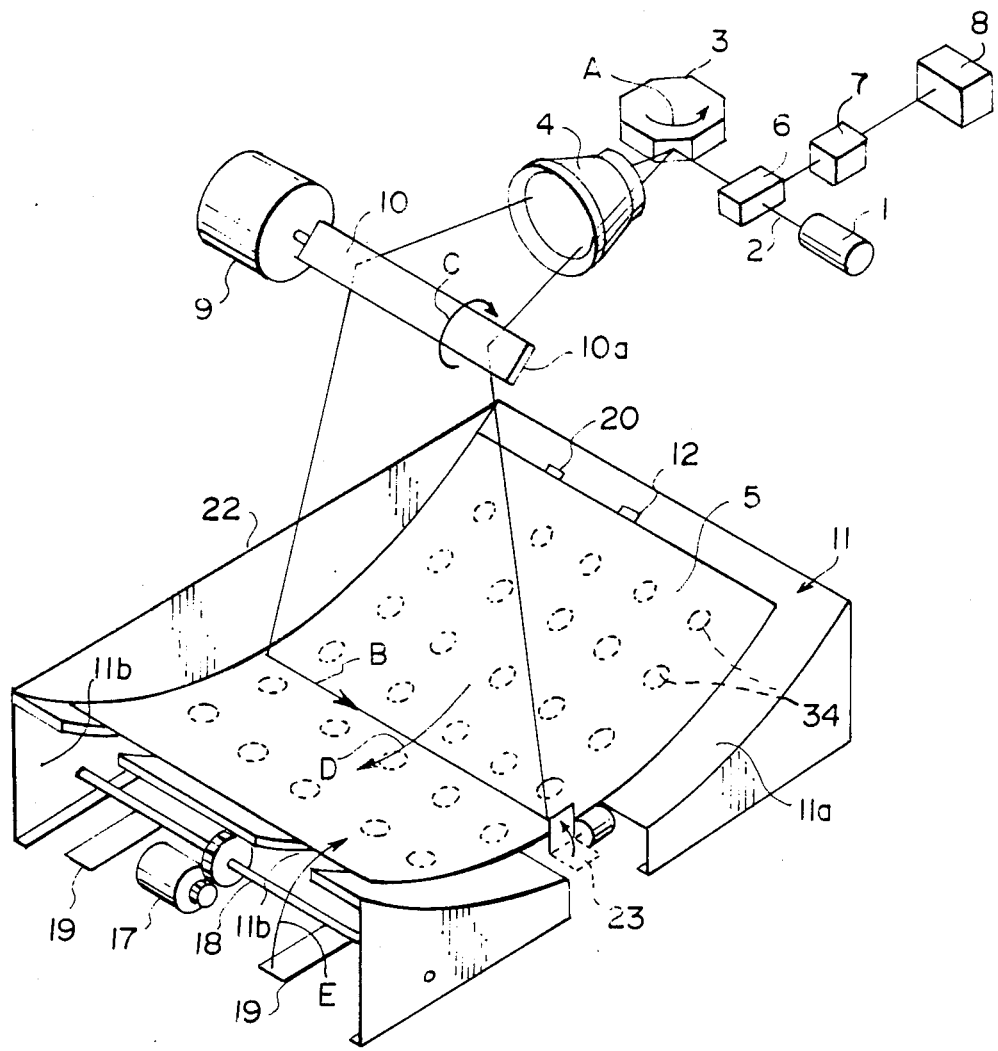

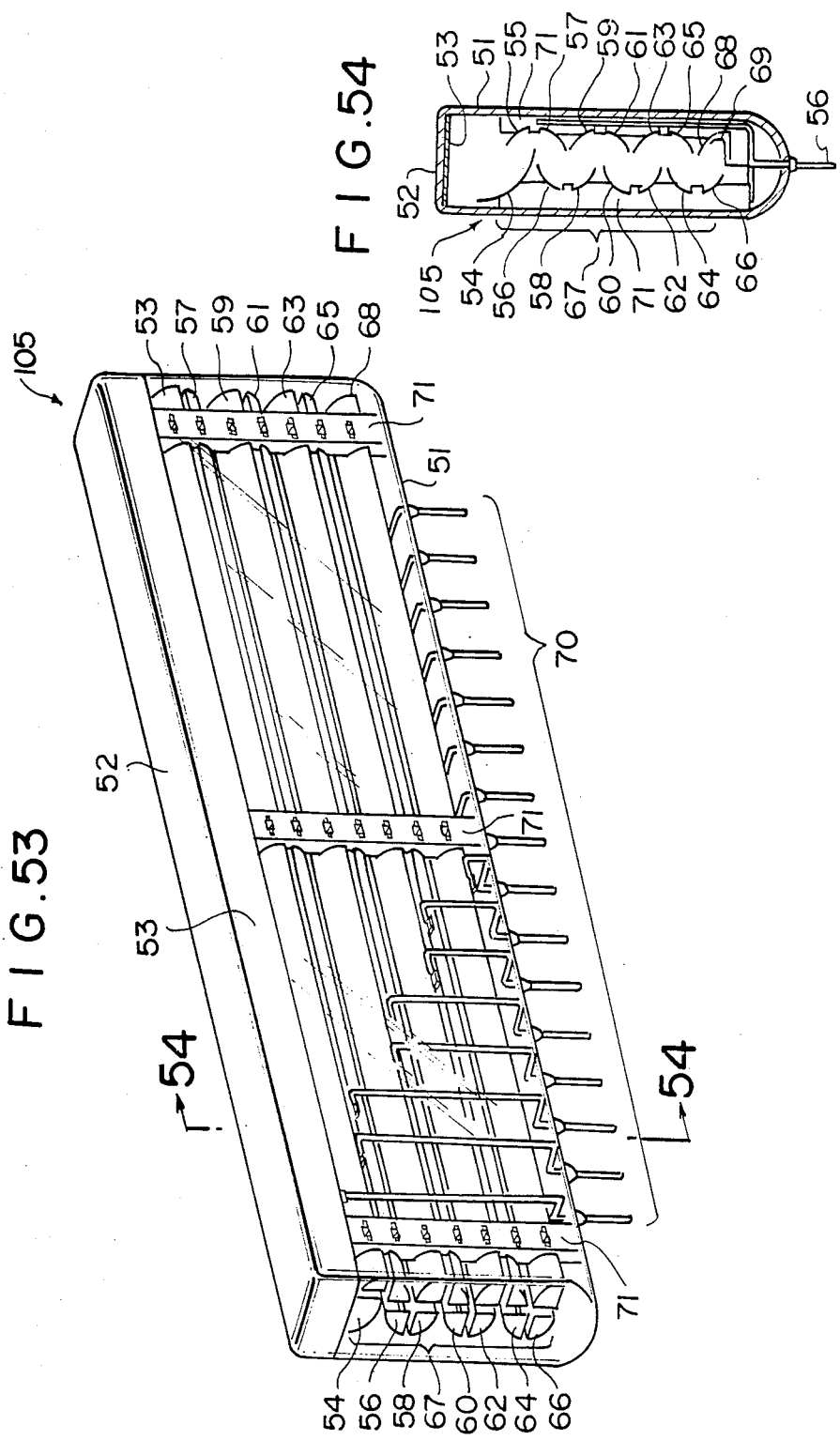

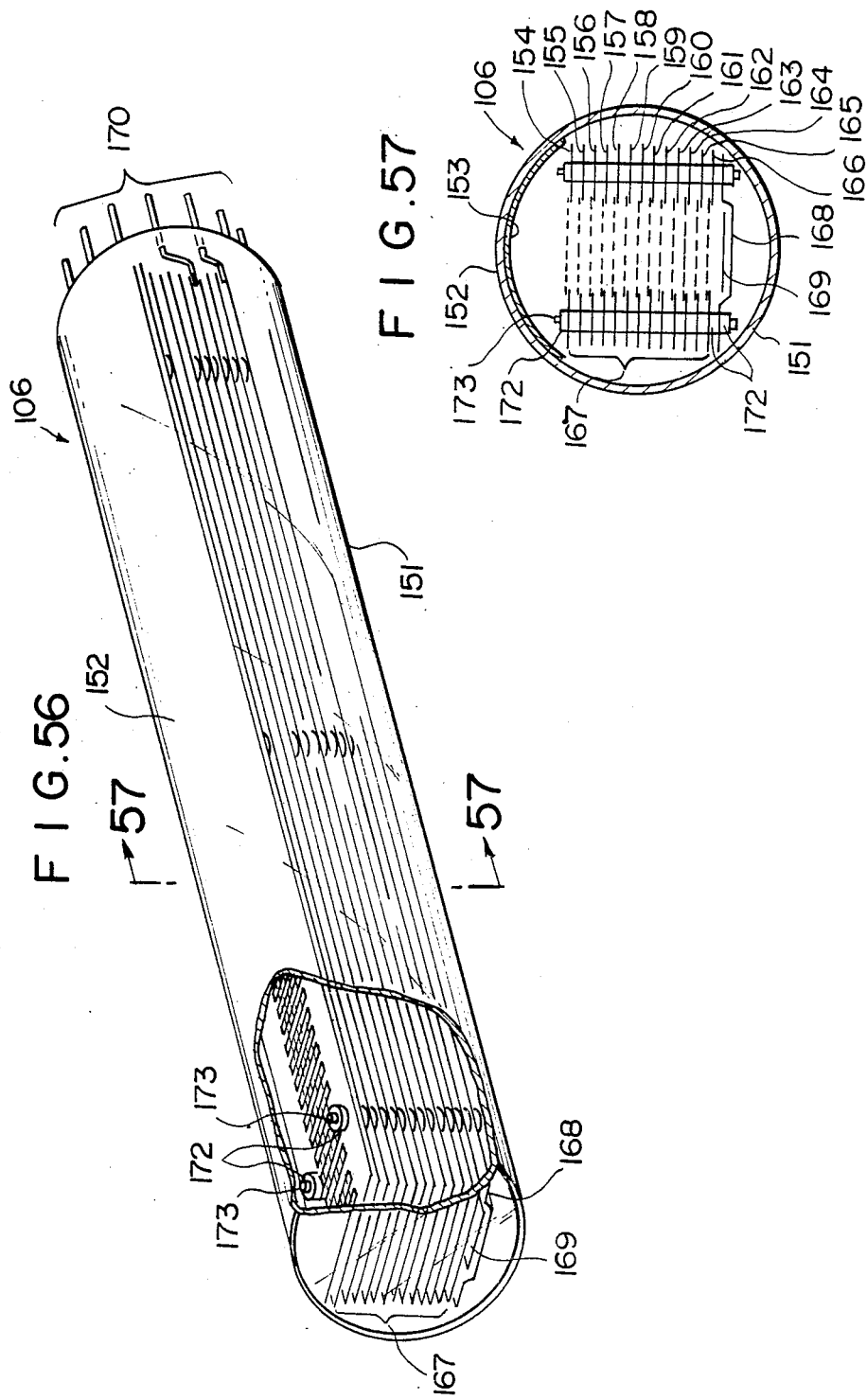

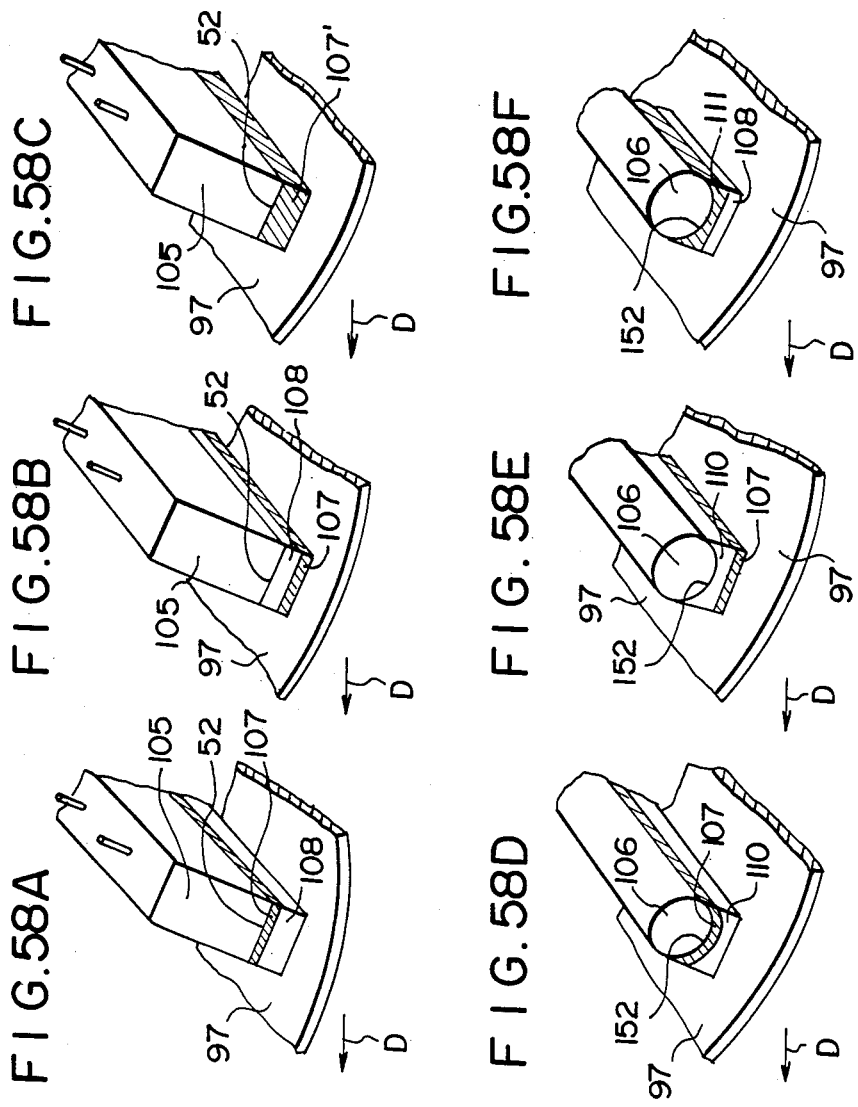

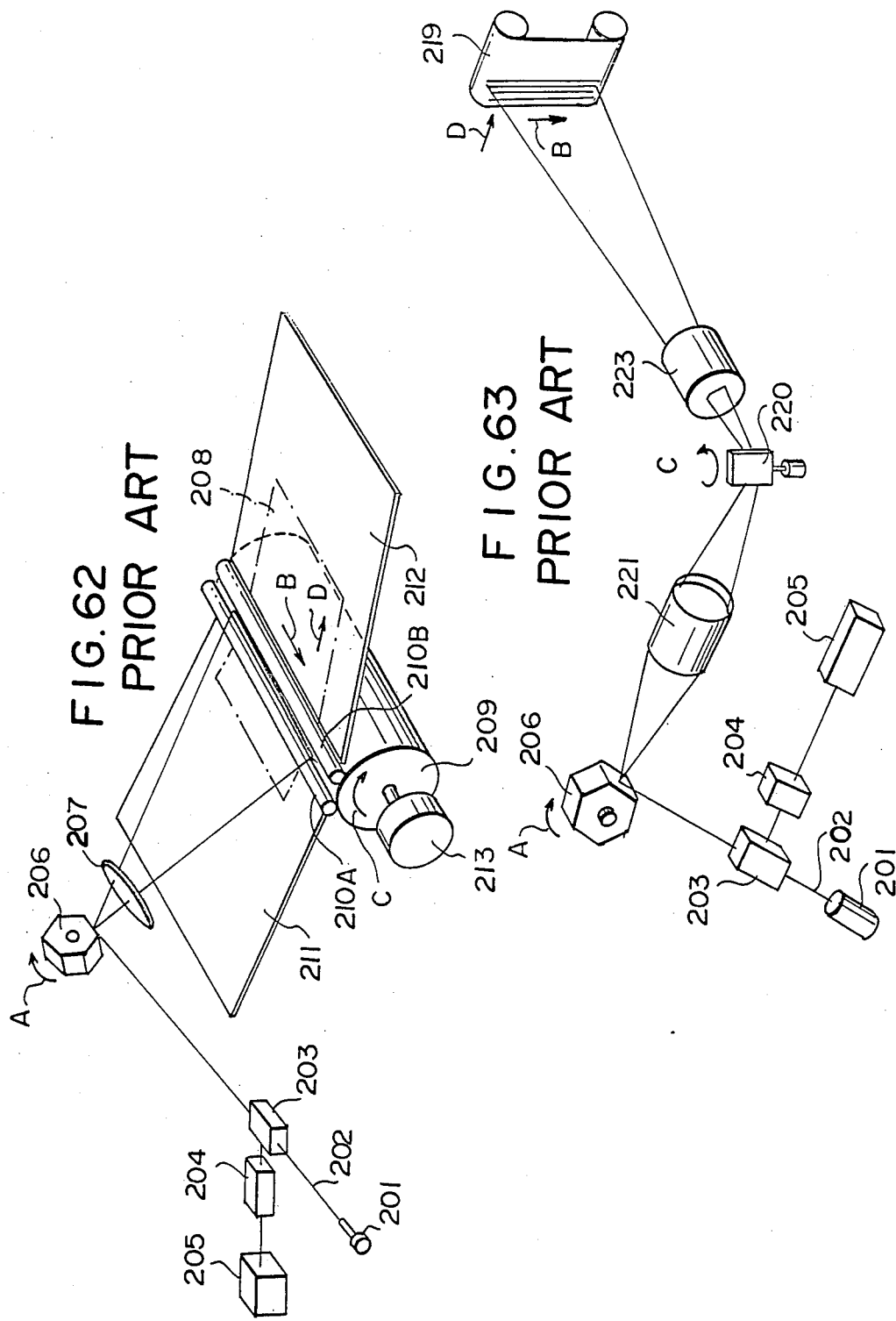

LIGHT BEAM SCANNING SYSTEM

BACKGROUND OF THE INVENTION

1. Field of the Invention

The present invention relates to a light beam scanning system including light beam deflectors for scanning a recording medium with a two-dimensionally deflected light beam to record image information such as radiation image information on the recording medium or to read out such recorded image information from the recording medium.

1. Description of the Prior Art

There have been proposed various light beam scanning systems for use in image information recording and reading apparatus. In the image recording apparatus, a light beam such as a laser beam emitted from a light beam source is modulated by image information to be recorded, and a recording medium is two-dimensionally scanned by the modulated light beam to record the image information on the recording medium. In the apparatus for reading out image information, a light beam such as a laser beam two-dimensionally scans a recording medium storing image information to enable the recording medium to reflect, pass, or emit light representative of the stored image information. The light from the recording medium is then detected by a light detector such as a photomultiplier to produce an image signal indicating the stored image information. The apparatus for reading out image information is used, for example, in a scanner in the graphics arts field, a computer or facsimile input device, or a system for recording and reproducing radiation image information using a stimulable phosphor sheet, as proposed by the applicant in Japanese Unexamined Patent Publication Nos. 55(1980)-12429, 56(1981)-11395, and 56(1981)-11397, for example.

The image recording apparatus may preferably be connected to an apparatus for reading out radiation image information in such a system. The apparatus for reading out radiation image information operates by scanning a stimulable phosphor sheet that stores radiation image information with a stimulating light beam and photoelectrically reading light emitted from the stimulable phosphor sheet to produce an image signal. The image signal is applied to the image recording apparatus to produce a hard copy of good image quality for better image observation.

In the light beam scanning system, the light beam from the light beam source is deflected by a light beam deflector to scan the recording medium in a main scanning direction while the recording medium is being moved in an auxiliary scanning direction transverse to the main scanning direction, so that the recording medium can be scanned two-dimensionally by the light beam. However, conventional light beam scanning systems are disadvantageous in that they are large in size because of means required for moving the recording medium in the auxiliary scanning direction and they require a complex and expensive optical system.

One prior optical scanning system incorporated in an image recording apparatus will be described with reference to FIG. 62 of the accompanying drawings. A light beam 202 emitted from a light beam source 201 is applied to and modulated by a light modulator 203 which is driven by a modulator driver 204 based on an image signal from an image signal generator 205. The modulated light beam 202 is then applied to a light deflector 206 such as a rotating polygonal mirror by which the light beam 202 is cyclically reflected and deflected as the polygonal mirror 206 is rotated about its own axis in the direction of the arrow A. The light beam 202 reflected by the polygonal mirror 206 passes through an image-forming lens 207 such as an f $\theta$ lens to scan a sheet-like recording medium 208 in a main scanning direction indicated by the arrow B. The recording medium 208 is sandwiched between a drum 209 and a pair of pinch rollers 210A, 210B on the drum 209. As the drum 209 rotates in the direction of the arrow C, the recording medium 208 is moved in an auxiliary scanning direction indicated by the arrow D which is normal to the main scanning direction. The light beam 202 therefore scans the recording medium 208 repeatedly in the main scanning direction of the arrow B while the recording medium 208 is being moved in the auxiliary scanning direction of the arrow D. Thus, the recording medium 208 is two-dimensionally scanned to record image information on the recording medium 208 substantially over its entire surface.

The drum 209 is rotated in the direction of the arrow C by a motor 213 coupled thereto. To minimize any variations in the load on the motor 213 during movement of the recording medium 208 in the auxiliary scanning direction for eliminating irregularities in the image quality, the recording medium 208 is supported on support tables 211, 212 lying forwardly and rearwardly of the position where the recording medium 208 is scanned by the light beam 202. The support tables 211, 212 should be wide enough to support recording mediums, respectively, thereon. Therefore, the light beam scanning system must have a space to accommodate the support tables 211, 212 therein, and hence is large in size in the auxiliary scanning direction. The drum 209 has a width larger than that of the recording medium 208 for stably delivering the recording medium 208. Since the motor 213 is disposed in the axial direction of the drum 209, the light beam scanning system is also large in size in the main scanning direction.

To record desired image information highly accurately on the recording medium 208 while the latter is being transferred, the motor 213 must be controlled so that the recording medium 208 can be delivered at a constant speed with high accuracy. Inasmuch as the motor 213 that is controllable with high accuracy is expensive, the overall cost of the light beam scanning system is high. The rollers 210A, 210B required for stably feeding the recording medium 208 prevent any image from being recorded on the leading and trailing ends of the recording medium 208 in the auxiliary scanning direction. Consequently, the leading and trailing ends of the recording medium 208 cannot be processed into black edges, for example.

FIG. 63 shows another conventional light beam scanning system capable of scanning the recording medium in the auxiliary scanning direction without moving the recording medium. The light beam scanning system of FIG. 63 additionally includes an auxiliary scanning galvanometer mirror 220 angularly movable at a low speed in the direction of the arrow C for deflecting the light beam 202 to move the main scanning line in the direction of the arrow D over a sheet-like recording medium 219 which is fixed in position, while at the same time the light beam 202 is being deflected by the main scanning mirror 206 in the main scanning direction. The auxiliary scanning galvanometer mirror 220 completes its one angular movement in the direction of the arrow C normal to the main scanning direction while image information is being recorded on the recording medium 219. The recording medium 219 is thus two-dimensionally scanned with the light beam 202 by the main scanning mirror 206 and the auxiliary scanning galvanometer mirror 220. When the recording of image information on the recording medium 219 is finished, the auxiliary scanning galvanometer mirror 220 returns to its original position in readiness for a next cycle of recording image information. An image-forming lens 223 comprising an $f\theta$ lens is disposed between the auxiliary scanning galvanometer mirror 220 and the recording medium 219. The image-forming lens 223 serves to cause the light beam 202 which is reflected and deflected by the main and auxiliary mirrors 206, 220 at a constant angular velocity to linearly scan the flat recording medium 219 at a constant speed.

A relay lens 221 is disposed between the main and auxiliary scanning mirrors 206, 220 for enabling the path of the light beam 202 that has been spread by the main scanning mirror 206 to be converged onto the reflecting surface of the relatively small auxiliary scanning galvanometer mirror 220 and then for enabling the converged path of the light beam 202 to be spread from the auxiliary scanning galvanometer mirror 220. The auxiliary scanning galvanometer mirror 220 is positioned where the path of the light beam 202 is converged by the relay lens 221. Therefore, the light beam 202 is fully applied by the relay lens 221 to the auxiliary scanning galvanometer mirror 220 by which it is deflected. After the light beam 202 has been reflected and deflected by the auxiliary scanning galvanometer mirror 220, its path is spread thereby to the extent commensurate with the beam deflecting angle of the main scanning mirror 206, so that a main scanning line of required length can be formed on the recording medium 219.

With the light beam scanning system shown in FIG. 63, however, the optical system is complex making the entire scanning system large in size since the relay lens 221 is required in addition to the image-forming lens 223. Addition of the relay lens 221 increases the number of parts of the optical system and the cost thereof. The $f\theta$ lens 223 should be two-dimensionally improved in its characteristics inasmuch as the light beam 202 deflected by the main and auxiliary scanning mirrors 206, 220 is applied thereto over its substantially entire surface. The $f\theta$ lens 223 is therefore costly to manufacture, thus adding to the cost of the light beam scanning system.

FIG. 64 shows one conventional optical scanning system incorporated in an apparatus for reading out radiation image information. A stimulating light beam 302 of constant intensity emitted from a light beam source 301 is applied to a light deflector 303 comprising a galvanometer mirror and reflected and deflected thereby as it is angularly moved in the direction of the arrow A. The stimulating light beam 302 deflectd by the galvanometer mirror 303 then passes through an image-forming lens 104 comprising an $f\theta$ lens to scan a stimulable phosphor sheet 305 in a main scanning direction indicated by the arrow B. At the same time, the stimulable phosphor sheet 305 placed on an endless belt conveyor 306 is fed in the direction of the arrow D substantially normal to the main scanning direction. Therefore, the stimulable phosphor sheet 305 is two-dimensionally scanned over its entire surface by the stimulating light beam 302.

When exposed to the stimulating light beam 302, the stimulable phosphor sheet 305 emits light representing image information stored thereon, and the emitted light enters a transparent light guide 307 through an inlet end 307a extending parallel to the main scanning line closely to the stimulable phosphor sheet 305. The light guide 307 has a flat front end portion 307b positioned near the stimulable phosphor sheet 305 and progressively narrowed into a cylindrical rear end portion 307c which is coupled to a photomultiplier 308. Therefore, the light that has entered the light guide 307 is applied through the rear end portion 307c to the photomultiplier 308, which includes a filter for rejecting extraneous light other than the light emitted from the stimulable phosphor sheet 305. The applied light is photoelectrically converted by the photomultiplier 308 to an electric signal that is processed by an image information reading circuit 309. The processed signal is displayed as a visible image on a CRT 310, recorded on a magnetic tape 111, or recorded on a photographic photosensitive sheet to produce a hard copy.

Since the stimulable phosphor sheet 305 is moved for auxiliary scanning, the endless belt conveyor 306 must be of such a size as to allow at least two stimulable phosphor sheets to be placed thereon forwardly and rearwardly of the scanning position. The endless belt conveyor 306 thus has a length corresponding to at least two stimulable phosphor sheets in the auxiliary scanning direction, making the optical beam scanning system large in size.

Prior to reading out the stored radiation image information (main reading mode) for image display or recording purpose, the stored radiation image information may roughly be read out (preliminary reading mode) to determine read-out conditions based on which the main reading mode will be carried out. According to Japanese Unexamined Patent Publication No. 58(1983)-67240, such a preliminary reading mode is effected by scanning the stimulable phosphor sheet with stimulating light of a lower energy than that of stimulating light used in the main reading mode, and photoelectrically reading light emitted from the stimulable phosphor sheet upon exposure to the lower-energy stimulating light.

For effecting the main and preliminary reading modes successively, the stimulable phosphor sheet 305 is fed in the direction of the arrow D in the preliminary reading mode, and then the endless belt conveyor 306 is reversed to deliver the stimulable phosphor sheet 305 backwards in the direction of the arrow D'. Thereafter, the stimulable phosphor sheeet 305 is fed again in the direction of the arrow D in the main reading mode. Alternatively, after the stimulable phosphor sheet 305 is fed in the direction of the arrow D in the preliminary reading mode, it is moved back in the direction of the arrow D' while the main reading mode is being carried out, followed by discharging the stimulable phosphor sheet 305 in the direction of the arrow D. However, inasmuch as the stimulable phosphor sheet 305 is required to be fed back and forth in the main and preliminary reading modes, and hence a time required for the main and preliminary reading modes is long, failing to achieve an efficient reading process.

FIG. 65 shows a proposed apparatus for reading out radiation image information, which has a light source 301A energizable for the preliminary reading mode and another light source 302A energizable for the main reading mode. The main and prelimiary reading modes can successively be effected by delivering a stimulable phosphor sheet in the direction of the arrows E by a series of endless belt conveyors 309A, 309B, 309C, 309D, 309E without moving back the stimulable phosphor sheet. The conveyor system however requires a length corresponding to at least three stimulable phosphor sheets in the auxiliary scanning direction, with the result that the entire apparatus is larger in size.

For reading out radition image information highly accurately, a motor or motors for the endless belt conveyors must be controlled so that the stimulable phosphor sheet can be delivered at a constant speed with high accuracy even if subjected to load variations. Such a motor or motors are expensive, and the overall cost of the light beam scanning system is high.

SUMMARY OF THE INVENTION

It is therefore an object of the present invention to provide a light beam scanning system which is small in size and can be manufactured at a low cost.

According to the present invention, there is provided a light beam scanning system for two-dimensionally scanning a recording medium with a light beam, comprising a light beam source for emitting the light beam, a main scanning light deflector for deflecting the light beam from the light beam source in a main scanning direction, an auxiliary scanning light deflector angularly movable about an axis for deflecting the light beam in an auxiliary scanning direction which is substantially perpendicular to the main scanning direction, an image-forming lens disposed between the main and auxiliary scanning light deflectors for passage therethrough of the light beam traveling from the main scanning light deflector to the auxiliary scanning light deflector, and a recording medium support having a support surface for supporting the recording medium thereon to cause the recording medium to be scanned with the light beam deflected by the main and auxiliary scanning light deflectors, the support surface having an arcuate shape having a center of curvature substantially aligned with the axis of angular movement of the auxiliary scanning light deflector.

The axis of angular movement of the auxiliary scanning light deflector lies on a line of intersection between a plane including a path of the light beam having passed through the image-forming lens or a plane parallel to the first-mentioned plane and a plane lying perpendicularly to an optical axis of the image-forming lens. The auxiliary scanning light deflector comprises an elongate plane mirror having a longitudinal axis about which the elongate plane mirror is angularly movable.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 3A through 3E are schematic side elevational views showing the manner in which the light beam scanning system of FIG. 2 operates;

FIGS. 4A and 4B are plan views showing the manner in which a recording medium is positioned in an auxiliary scanning direction in the light beam scanning system of FIG. 2;

FIGS. 5A through 5C are schematic side elevational views illustrating the manner in which a light detector of the light beam scanning system of FIG. 2 operates;

FIG. 6 is a plan view showing a light detector in a different position;

FIG. 7 is a fragmentary perspective view of another shifter arm;

FIGS. 10A through 10C are schematic side elevational views illustrating the manner in which a light detector of the light beam scanning system of FIG. 9 operates;

FIGS. 18A through 18F are schematic side elevational views showing the manner in which the light scanning system of FIG. 17 operates;

FIGS. 19A and 19B are plan views showing the manner in which a recording medium is positioned in an auxiliary scanning direction in the light beam scanning system of FIG. 17;

FIG. 20 is a plan view of a recording medium support of a modified light beam scanning system;

FIGS. 23A through 23E are schematic side elevational views showing the manner in which the light scanning system of FIG. 22 operates;

FIGS. 24A through 24D are plan views showing the manner in which the light scanning system of FIG. 22 operates;

FIG. 29 is a schematic perspective view of a light beam scanning system according to still another embodiment of the present invention, with inlet and outlet rollers omitted from illustration;

FIG. 53 is an enlarged perspective view of a box-shaped photomultiplier in the light beam scanning system of FIG. 52;

FIG. 54 is a cross-sectional view taken along line 54—54 of FIG. 53;

FIG. 56 is an enlarged perspective view of a cylindrical photomultiplier according to a modification;

FIG. 57 is a cross-sectional view taken along line 57—57 of FIG. 56;

FIGS. 58A through 58F are fragmentary perspective views of different filter and light guide combinations used on photomultipliers;

FIGS. 62 through 65 are views showing conventional light beam scanning systems.

DESCRIPTION OF THE PREFERRED EMBODIMENTS

Figure 1:
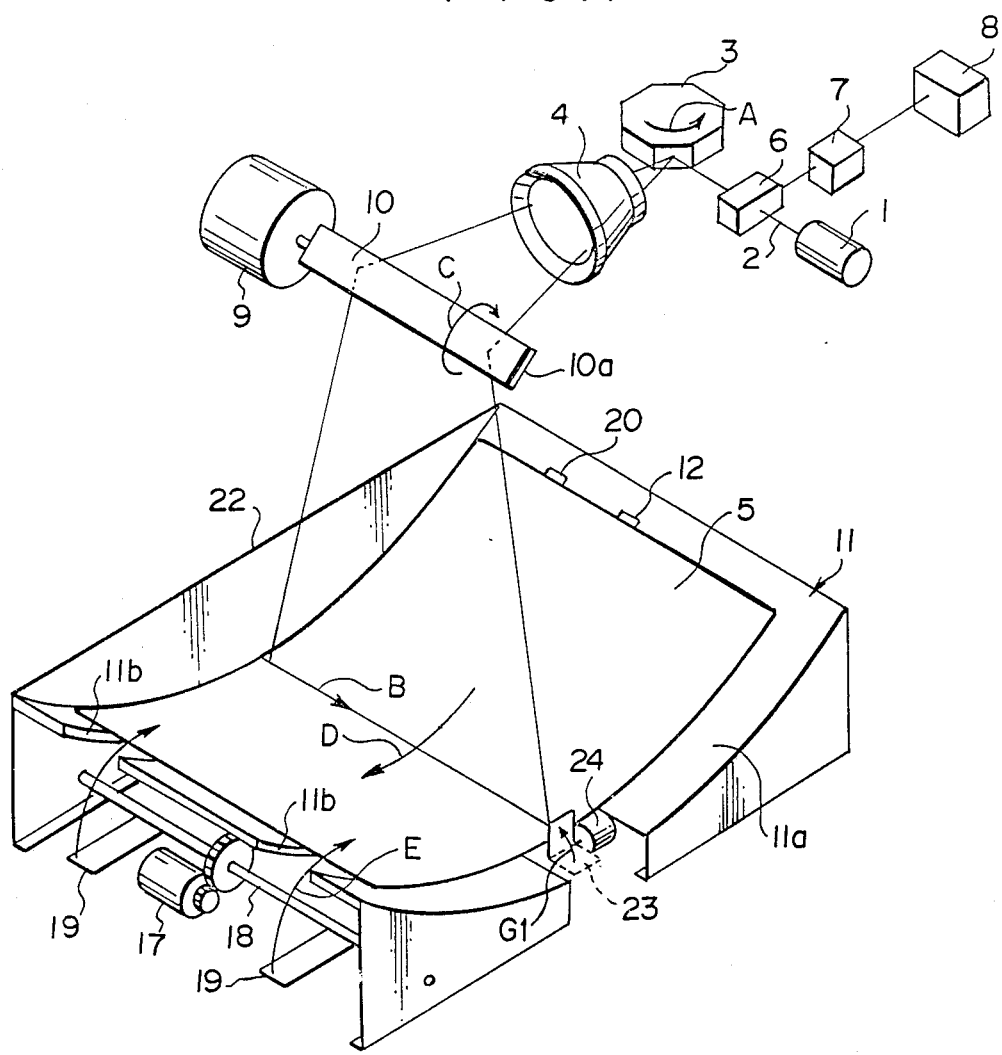
FIG. 1 is a schematic perspective view of a light beam scanning system according to an embodiment of the present invention.

Like or corresponding parts are denoted by like or corresponding reference characters throughout several views.

FIG. 1 shows a light beam scanning system according to an embodiment of the present invention, the light beam scanning system being incorporated in an image recording apparatus. The light beam scanning system includes a laser beam source 1 for emitting a laser light beam 2 that is applied to and modulated by a light modulator 6 driven by a modulator driver 7 in response to an image signal generated by an image signal generator 8. The modulated light beam 2 is then applied to a main scanning light beam deflector 3 such as a rotatable polygonal mirror which rotates about its own axis in the direction of the arrow A for deflecting the light beam 2 in a main scanning direction.

The light beam source 1 may comprise an He-Ne laser, an Ar laser, or a combination of a semiconductor laser and a beam shaper optical system. Where the light beam source 1 comprises a semiconductor laser or the like which can directly modulate the generated light beam, no light modulator 6 may be disposed in the path of the light beam 2, but the light beam source 1 may directly be controlled for modulating the light beam 2. The main scanning light beam deflector 3 may instead comprise a galvanometer mirror or an acoustooptic deflector (AOD).

The light beam 2 deflected by the polygonal mirror 6 then passes through a main scanning image-forming lens 4 such as an $f\theta$ lens and is thereafter applied to and reflected by a reflecting surface 10a of an auxiliary scanning light beam deflector 10 comprising a plane reflecting mirror which is elongate in the main scanning direction and is angularly moved at a low speed about its longitudinal axis in the direction of the arrow C by a motor 9 coupled to the reflecting mirror 10.

A sheet-like recording medium 5 such as photographic film or paper or a stimulable phosphor sheet is placed below the auxiliary scanning mirror 10 in the optical path of the light beam reflected by the mirror 10. The recording sheet 5 is supported as a partly cylindrical shape on an arcuate upper support surface 11a of a recording medium support 11. The recording medium support 11 may be in the form of a curved plate or a unitary block molded of synthetic resin and having an arcuately concave surface. The partly cylindrical shape given by the arcuate support surface 11a has a center of curvature which is substantially aligned with the axis of angular movement of the auxiliary scanning mirror 10. The recording medium support 11 has a pair of spaced grooves 11b defined at one end thereof.

The recording medium 5 supported on the support 11 is scanned in a main scanning mode in the direction of the arrow B by the light beam 2 deflected by the rotating polygonal mirror 3. The image-forming lens 4 serves to converge the light beam 2 on the recording medium 5 and also to scan or sweep the light beam 2 at a constant speed on the recording medium 5 that extends straight in the main scanning direction, the light beam 2 having been deflected by the rotating polygonal mirror 3 at a constant angular velocity. The axis of angular movement of the auxiliary scanning mirror 10 is substantially aligned with a line of intersection between a plane including the path of the light beam that has passed through the lens 4 or a plane parallel to such a plane and a plane normal to the optical axis of the lens 4. Preferably, the position where the light beam 2 is reflected by the reflecting surface 10a is aligned with the axis of angular movement of the auxiliary scanning mirror 10. However, the axis of angular movement of the auxiliary scanning mirror 10 may be deviated from the beam reflecting position on the reflecting surface 10a within a small allowable range which imposes no problem on the beam scanning accuracy. For example, the axis of angular movement of the auxiliary scanning mirror 10 may be aligned with the geometrically longitudinal central axis of the mirror 10 which is slightly spaced from the beam reflecting position on the reflecting surface 10a in the transverse direction of the mirror 10.

The auxiliary scanning mirror 10 is angularly moved in the direction of the arrow C through an angle which is large enough to allow the light beam 2 to scan the entire upper surface of the recording medium 5 while recording desired image information on the recording medium 5. As the auxiliary scanning mirror 10 is angularly moved in this manner, the main scanning line formed by the light beam 2 on the recording medium 5 is progressively moved in the direction of the arrow D to scan the recording medium 5 in an auxiliary scanning mode. Therefore, the entire surface of the recording medium 5 is two-dimensionally scanned with the light beam 2 by the rotating polygonal mirror 6 and the auxiliary scanning mirror 10.

After the desired image information has been recorded on the recording medium 5 over its entire surface through the angular movement of the auxiliary scanning mirror 10 at a prescribed speed and through a given angle, the auxiliary scanning mirror 10 is then angularly moved backwards or continuously angularly moved to make a full revolution, until the mirror 10 reaches its initial position in readiness for a next recording cycle.

A light detector 12 is mounted on the recording medium support 11 for detecting the light beam 2 to determine the position to start scanning the recording medium 5 for image recording. More specifically, the light detector 12 detects the light beam as it reaches a leading end of the recording medium 5 on scanning movement from its initial position in the direction of the arrow D when the auxiliary scanning mirror 10 is angularly moved in the direction of the arrow C. At this time, the light modulator 6 is energized by an image signal to modulate the light beam 2 therewith for starting to record a desired image on the recording medium 5.

The recording medium 5 is fixed in place while it is being scanned in the auxiliary scanning mode by the light beam 2 which is swept by angular movement of the auxiliary scanning mirror 10. Therefore, the light beam scanning system is small in size in the auxiliary scanning direction. The size of the image recording apparatus in the auxiliary scanning direction may be reduced to about half of that of image recording apparatus in which recording mediums are moved in the auxiliary direction for auxiliary scanning. The auxiliary scanning mirror 10 which is elongate in the main scanning direction may of only a length required in the main scanning direction to allow the light beam 2 being deflected to be applied thereto. The length of the auxiliary scanning mirror 10 is sufficiently smaller than that of the main scanning lines on the recording medium 5. The combined length of the motor 9 and the auxiliary scanning mirror 10 may be smaller than the dimension of the recording medium support 11 in the main scanning direction. Therefore, the light beam scanning system and hence the image recording apparatus are small in size in the main scanning direction. Where the auxiliary scanning mirror 10 is positioned sufficiently closely to the main scanning light beam deflector 3, the auxiliary scanning mirror 10 may not necessarily be elongate and may be of any shape insofar as it can be angularly moved about its own axis and allows the light beam 2 to be fully applied thereto. The motor 9 for driving the auxiliary scanning mirror 10 may be a motor which is relatively inexpensive, small in size, and of a low torque since it is not subject to load variations. The opposite ends of the recording medium 5 on the recording medium support 11 may have black edges inasmuch as the entire surface thereof can be scanned with the light beam from the leading end to the trailing end thereof.

Because of the auxiliary scanning mirror 10 sized to permit the light beam 2 to be fully applied thereto, any relay lens for adjusting the path of the light beam 2 is not required, and hence the optical arrangement of the light beam scanning system is simple. Accordingly, the light beam scanning system and the image recording apparatus are relatively small in size and can be manufactured at a relatively low cost. Furthermore, since the recording medium 5 is supported in an arcuate plane, the image-forming lens 4 is disposed between the main scanning light beam deflector 3 and the auxiliary scanning light beam deflector 10. This arrangement also contributes to a size reduction which has not been achieved by conventional light beam scanning systems in which an image-forming lens is disposed between an auxiliary scanning mirror and a recording medium.

The recording medium 5 is manually placed onto and removed from the recording medium support 11. The recording medium 5 on the recording medium support 11 can be positioned in the auxiliary scanning direction by means of a pair of feeder arms 19 attached to a shaft 18 rotatably mounted in the recording medium support 11 at one end thereof. The shaft 18 can be turned about its own axis by a motor 17 operatively coupled thereto by a pair of meshing gears. When the feeder arms 19 are angularly moved with the shaft 18 in the direction of the arrow E into the grooves 11b, respectively, the feeder arms 19 engage one end of the recording medium 5 and push it in the auxiliary scanning direction on the arcuate upper support surface 11a of the recording medium support 11. A detector 20 such as a reflection-type photointerrupter or a limit switch is mounted on the recording medium support 11 at its rear end remote from the feeder arms 19 for detecting the leading end of the recording medium 5. By de-energizing the motor 17 in response to generation of a signal from the detector 20 upon detection of the leading end of the recording medium 5, the recording medium 5 can accurately and easily be positioned in the main scanning direction on the recording medium support 11.

The recording medium 5 on the recording medium support 11 can also be positioned in the main scanning direction by means of a shifter arm 23 coupled to an actuator 24 such as a motor or a rotary solenoid and disposed on one side of the recording medium support 11 substantially centrally in the longitudinal direction thereof. A vertical guide plate 22 is attached to the other side of the recording medium support 11. When the actuator 24 is energized, the shifter arm 23 is lifted in the direction of the arrow G1 and engages a side edge of the recording medium 5. The shifter arm 23 is further turned into a first position (indicated by the solid lines) to push the recording medium 5 until its opposite side edge is held against the vertical guide plate 22, whereupon the recording medium 5 is accurately and reliably positioned in the main scanning direction. When the recording medium 5 is to be removed from the recording medium support 11, the shifter arm 23 is retracted to a second position (indicated by the dotted lines) out of engagement with the recording medium 5.

FIGS. 2 and 3A through 3E illustrate a light beam scanning system according to another embodiment of the present invention. The light beam scanning system of FIG. 2 differs from that of FIG. 1 in that it has an automatic recording medium loader for reliably and accurately introducing and positioning recording mediums and an automatic recording medium unloader for reliably discharging recording mediums.

The automatic recording medium loader comprises a pair of parallel elongate inlet rollers 13A, 13B positioned at one end of the recording medium support 11 near the feeder arms 19, and the automatic recording medium unloader comprises a pair of parallel elongate outlet rollers 21A, 21B positioned at the opposite end of the recording medium support 11.

As shown in FIG. 3A, a stack of recording mediums 5 is stored in a magazine 14, and picked up, one at a time, by a suction means 16. The recording medium 5 picked up by the suction means 16 is then dropped through a guide 15 and gripped by the inlet rollers 13A, 13B which are rotated about their own axes in the directions of the arrows to feed the recording medium 5 onto the arcuate support surface 11a of the recording medium support 11 in the direction of the arrow F1, until the recording medium 5 reaches a position, as shown in FIG. 3B, upstream of a desired recording position on the arcuate support surface 11a. While the recording medium 5 is being fed by the inlet rollers 13A, 13B, the feeder arms 19 are retracted away from the arcuate support surface 11a, as shown in FIG. 3A.

Then, the motor 17 is energized to turn the feeder arms 19 in the direction of the arrow E1 (FIG. 3B) into engagement with the trailing end of the recording medium 5. The feeder arms 19 are continuously turned in the direction of the arrow E2 (FIG. 3C) into the grooves 11b to push the recording medium 5 to the desired recording position on the arcuate support surface 11a in the direction of the arrow F2. Up to this time, the shifter arm 23 remains in the second position out of engagement with the recording medium 5, as shown in FIG. 4A. When the detector 20 detects the leading end of the recording medium 5, it generates a signal which is applied to the motor 17 to de-energize the same, thus locating the recording medium 5 in the desired recording position on the support surface 11a.

The actuator 24 is now energized to turn the shifter arm 23 upwardly in the direction of the arrow G1 (FIG. 4B) into the first position to push one side of the recording medium 5 toward the guide plate 22. The recording medium 5 is shifted by the shifter arm 23 until the other side thereof abuts against the guide plate 22. The recording medium 5 is now positioned in the main and auxiliary scanning directions. Thereafter, the motor 17 is reversed to retract the feeder arms 19 in the direction of the arrow E3 (FIG. 3D) out of engagement with the trailing end of the recording medium 5. The light beam 2 which is being deflected by the rotating polygonal mirror 3 and the angularly moving mirror 10 is applied to the recording medium 5 for two-dimensionally scanning the same to record desired image information thereon.

The position in which the recording medium 5 is scanned by the light beam 2 varies dependent on the direction in which the reflecting surface 10a of the auxiliary scanning mirror 10 faces. As shown in FIG. 5A, the auxiliary scanning mirror 10 is initialized such that the light beam 2 starts its scanning cycle from a position outside of the leading edge of the recording medium 5 that is fixed in the desired recording position. Upon rotation of the main and auxiliary scanning mirrors 3, 9, the light beam 2 which is not yet modulated by the light modulator 6 is moved by the auxiliary scanning mirror 10 in the auxiliary scanning direction toward the leading end of the recording medium 5 while at the same time scanning the support surface 11a in the main scanning direction. When the light beam 2 hits the light detector 12, the light detector 12 generates a starting signal S (FIG. 5B) which is applied to the video signal generator 8 that begins to apply an image signal to the modulator driver 7. Therefore, substantially at the same time that the light beam 2 reaches the leading end of the recording medium 5, the light beam 2 starts being modulated with the image signal by the light modulator 6 driven by the modulator driver 7. As a result, the desired image starts to be recorded by the modulated light beam 2 on the recording medium 5 substantially from its leading end and the recording medium 5 is subsequently two-dimensionally scanned by the light beam 2, as shown in FIG. 5C. Alternatively, the image signal generator 8 may be arranged such that it will be energized with a time delay after the light beam 2 is detected by the light detector 12. This allows the unmodulated light beam 2 to scan the leading end of the recording medium 5 for thereby forming an image-free edge thereon, which is followed by a desired image recorded by the subsequently modulated light beam 2. The light detector 12 may be positioned in front of the detector 20 in the auxiliary scanning direction, as shown in FIG. 6, so that the light detector 12 can detect the light beam 2 before it reaches the recording medium 5 in the auxiliary scanning direction. With the modification of FIG. 6, the time required for the light beam 2 to arrive at the leading end of the recording medium 5 after the light beam 2 has been detected by the light detector 12 is measured in advance, and the light beam 2 starts to be modulated by the light modulator 6 upon elapse of such measured time after detection of the light beam 2 by the light detector 12.

According to another process of starting to record a desired image on the recording medium 5, the unmodulated light beam 2 may be deflected and detected by the light detector 12 before the recording medium 5 is delivered onto the recording medium support 11. When the light beam 2 is thus detected by the light detector 12, a signal is applied to a control circuit for the motor 9 to de-energize the motor 9, thus stopping the auxiliary scanning mirror 10, whereupon emission of the light beam 2 is cut off. Thereafter, the recording medium 5 is introduced and positioned on the recording medium support 11, and then the light beam source 1 and the image signal generator 8 are simultaneously energized to scan the recording medium 5 with the modulated light beam 2. At any rate, any desired image can be recorded efficiently and positionally accurately on the recording medium 5 since the image recording can be started from any desired position with high accuracy.

After the recording medium 5 has been fully scanned by the light beam 2, the motor 17 is energized again to turn the feeder arms 19 in the direction of the arrow E4 (FIG. 3E) to engage and push the trailing end of the recording medium 5 for causing the leading end thereof to be gripped by the outlet rollers 21A, 21B. The outlet rollers 21A, 21B are then rotated about their own axes in the directions of the arrows to move the recording medium 5 in the direction of the arrow F3 out of the image recording apparatus. The recording medium 5 thus discharged from the image recording apparatus may be introduced into an automatic developing machine or a receiver magazine, and the outlet rollers 21A, 21B may double as inlet rollers of such an automatic developing machine. After the recording medium 5 has been discharged, the feeder arms 19 are angularly moved back again in the direction of the arrow E5 (FIG. 3E) to the position of FIG. 3A to allow a next recording medium 5 to be introduced onto the support surface 11a.

FIG. 7 shows a modification in which the shifter arm 23 can be linearly displaced in the direction of the arrow G2 by a linear solenoid 24' for positioning the recording medium 5 in the main scanning direction.

The shifter arm 23 may be of a length and a shape which can be selected dependent on the size of the recording medium 5 used. While the single shifter arm 23 is shown and described, two or more shifter arms may be employed.

Figure 8A:
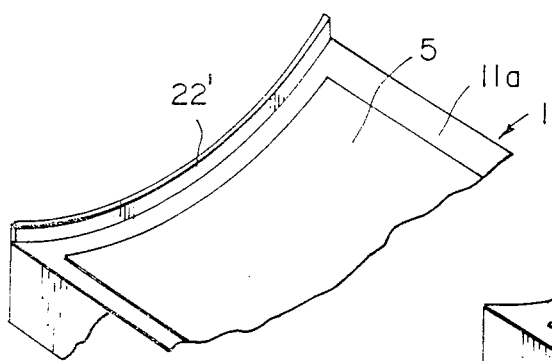
FIGS. 8A and 8B are fragmentary perspective views of modified guide plates.
Figure 8B:
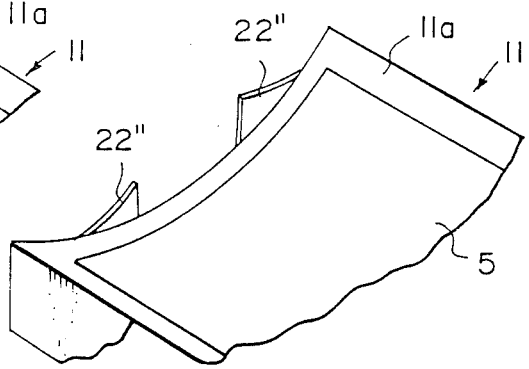

FIG. 8A illustrates a modified guide plate 22' having an upper edge curved along the arcuate support surface 11a of the recording medium support 11. According to another modification shown in FIG. 8B, a pair of spaced guide plates 22" is attached to the other side of the recording medium support 11.

The detector 20 may be located at the trailing end of a recording medium as it is held in the desired recording position on the support surface 11a, so that the detector 20 can detect the trailing end of the recording medium 5 for stopping the feeder arms 19. Where the recording medium 5 may be located less accurately on the support surface 11a, the detector 20 may be dispensed with, and the motor 17 may be energized for a predetermined period of time to enable the feeder arms 19 to push the recording medium 5 onto the support surface 11a during such a predetermined period of time. The motor 17 may easily be controlled if it is a stepping motor. Alternatively, a stop plate may be attached to the support surface 11a of the recording medium support 11 for forcibly stopping the recording medium 5 in the desired recording position.

Figure 2:
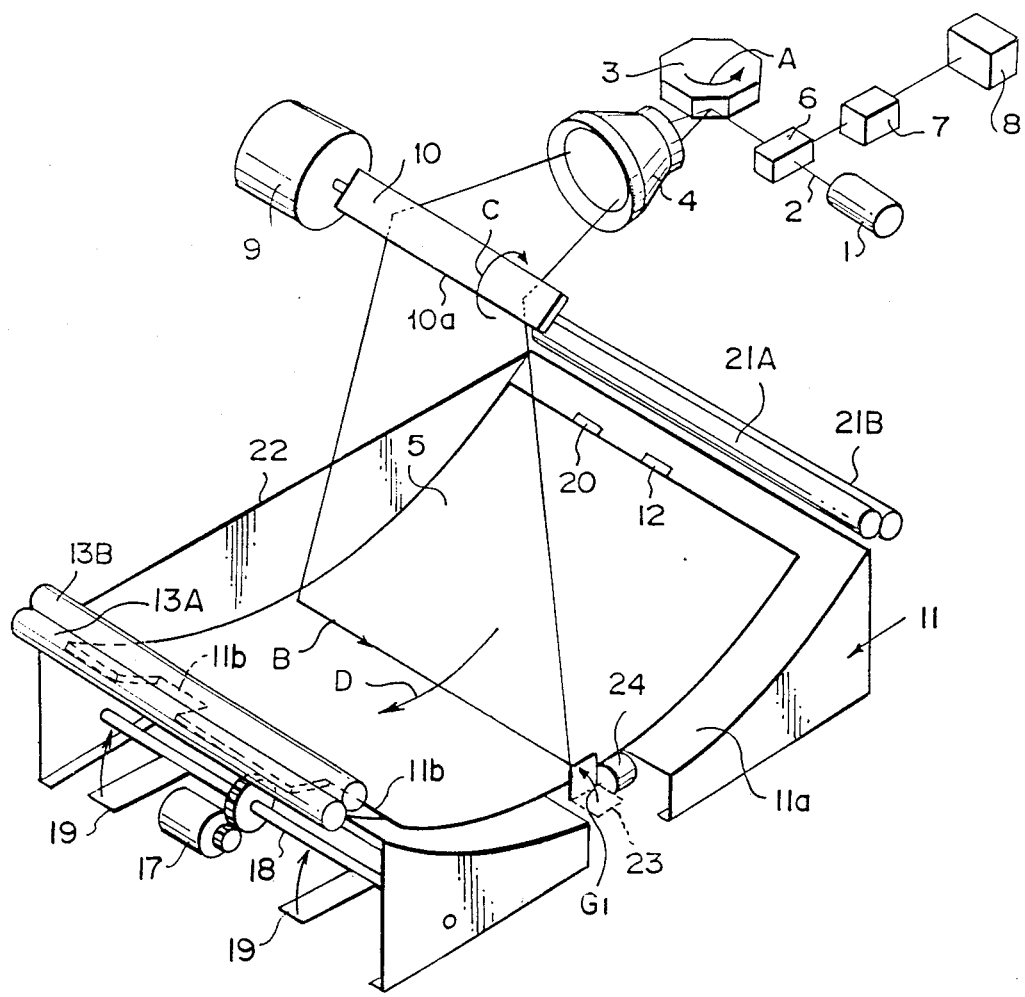
FIG. 2 is a schematic perspective view of a light beam scanning system according to another embodiment of the present invention.
Figure 10A:
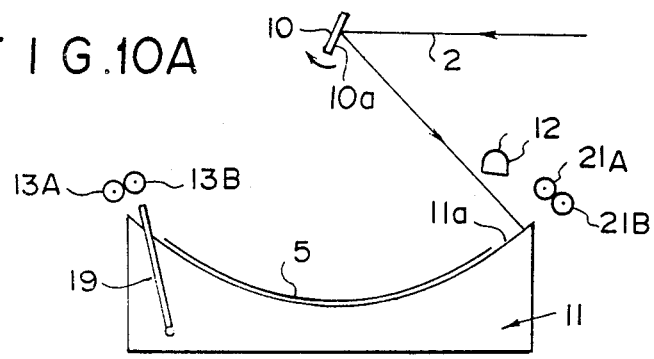
Figure 10B:
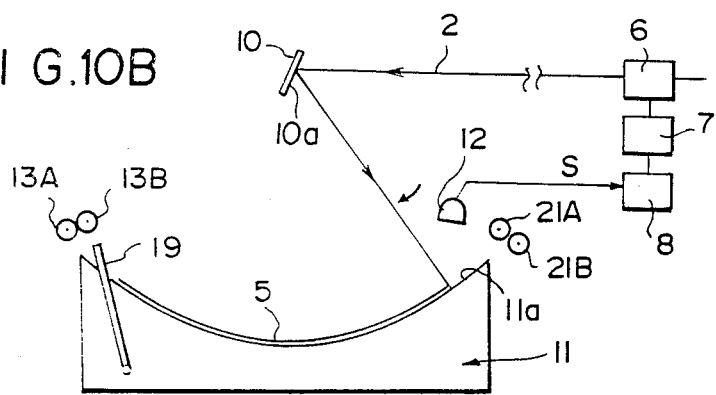
Figure 9:
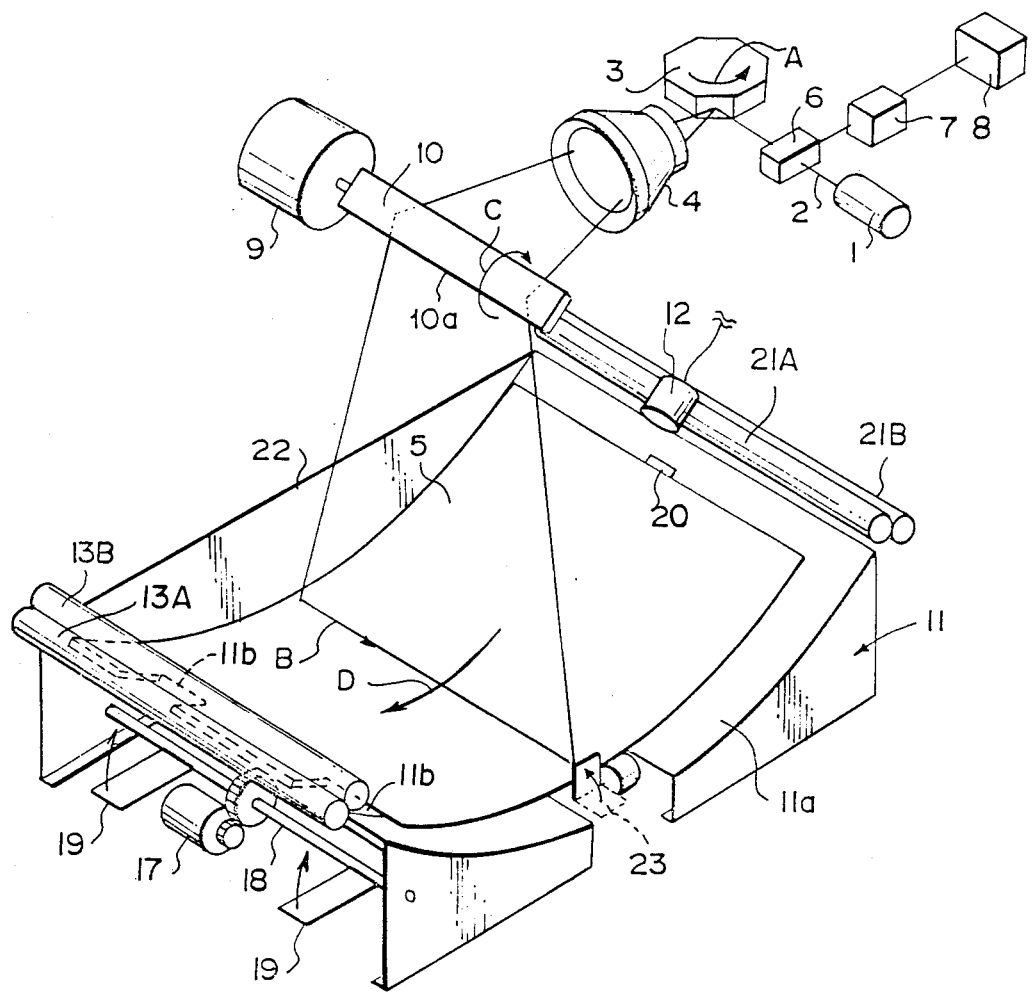
FIG. 9 is a schematic perspective view of a modified light beam scanning system.

FIGS. 9 and 10A through 10C are illustrative of a modified light scanning system which is substantially the same as the light scanning system shown in FIG. 2, except that the support surface 11a is made of a material having a reflectivity different from that of the recording medium 5, and the light detector 12 is positioned above the support surface 11a at the leading end of the recording medium 5 for detecting light reflected from the support surface 11a. While the light beam 2 does not reach the leading end of the recording medium 5 and is scanning the support surface 11a as shown in FIG. 10A, light of a constant level is reflected from the support surface 11a and applied to the light detector 12. As the light beam 2 hits the leading end of the recording medium 5, a different level of light is reflected and applied to the light detector 12, which then generates a starting signal S that is fed to the image signal generator 8 for enabling the same to produce an image signal for recording the image in the same manner as described above. The light detector 12 may be located in any position above the leading end of the recording medium 5 insofar as it can detect a change in the reflected light beam 2. The successive recording mediums 5 may be held in slightly different positions on the support surface 11a within a range in which the light detector 12 can detect a change in the reflected light when the light beam 2 hits the leading ends of the recording mediums 5.

FIGS. 11, 12, and 13A through 13E illustrate a light beam scanning system according to still another embodiment of the present invention. The light beam scanning system of FIG. 11 differs from that of FIG. 2 in that the motor 17, the shaft 18, and the feeder arms 19 are dispensed with, and a feeder roller 25 is mounted in the recording medium support 11.

The feeder roller 25 is of an elongate shape extending in the main scanning direction and positioned in an elongate opening or recess 26 defined in the support surface 11a, the feeder roller 25 being exposed upwardly through the opening 26. The feeder roller 25 is vertically movable by a suitable driver between a first upper position in which the feeder roller 25 has its upper peripheral surface located above the support surface 11a and a second lower position in which the upper peripheral surface of the feeder roller 25 is retracted downwardly from the support surface 11a.

Figure 13:
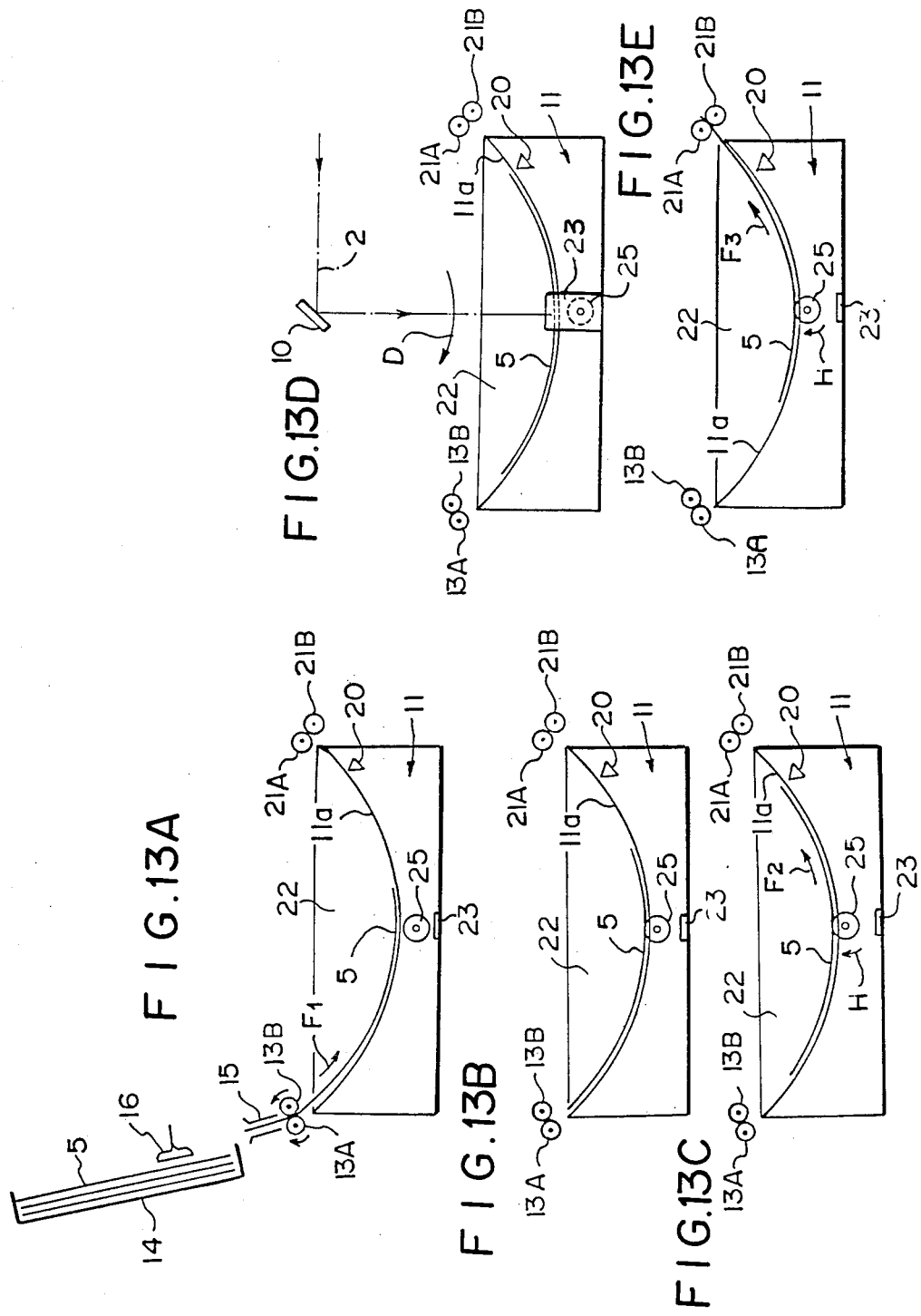
FIGS. 13A through 13E are schematic side elevational views showing the manner in which the light beam scanning system of FIG. 11 operates.
Figure 14:
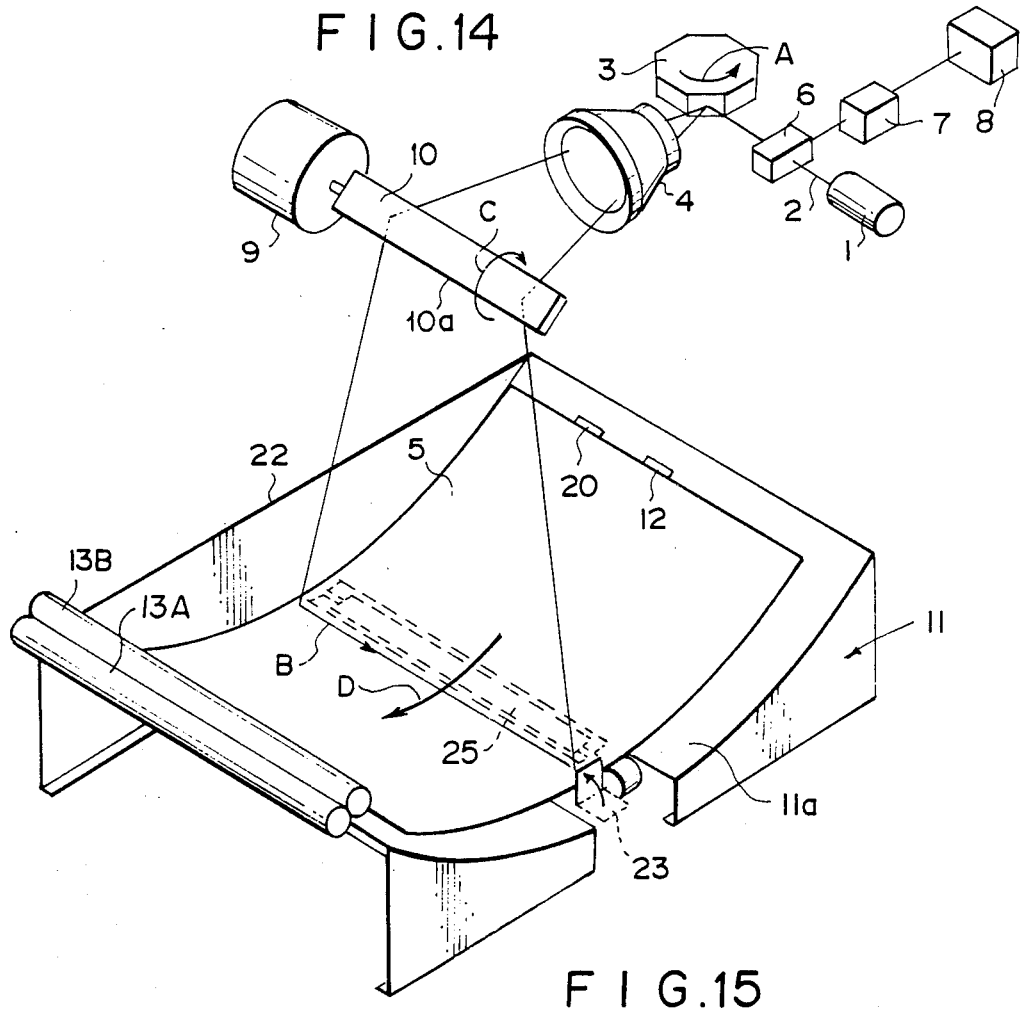
FIG. 14 is a schematic perspective view of a light beam scanning system according to a still further embodiment of the present invention.
Figure 15:
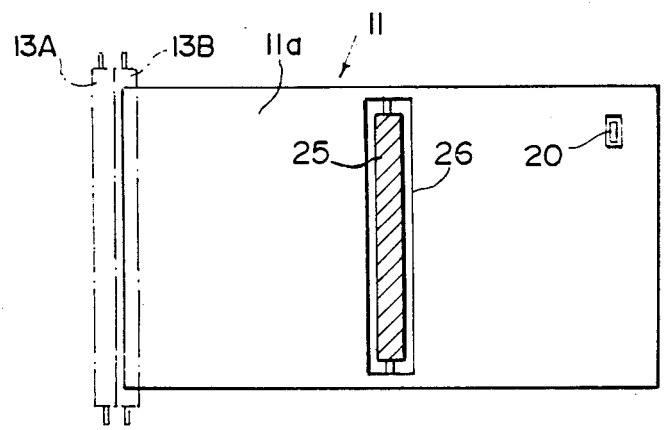
FIG. 15 is a plan view of a recording medium support of the light beam scanning system of FIG. 14.

As shown in FIG. 13A, while the recording medium 5 is being fed in the direction of the arrow F1 onto the support surface 11a by the inlet rollers 13A, 13B, the upper peripheral surface of the feeder roller 25 is lowered in the second position below the support surface 11a. When the recording medium 5 is delivered to a position just upstream of the desired recording position on the support surface 11a and released from the inlet rollers 13A, 13B, the feeder roller 25 is moved upwardly to the first position in which it contacts the lower surface of the recording medium 5, as shown in FIG. 13B. The feeder roller 25 is then rotated about its own axis by a suitable motor in the direction of the arrow E (FIG. 13C) to move the recording medium 5 in the direction of the arrow F2 to the desired recording position.

Although the feeder roller 25 is shown as having its peripheral surface held against the recording medium 5 fully transversely, the feeder roller 25 may be shaped to have its opposite ends or central portion in contact with the recording medium 5.

The motor which rotates the feeder roller 25 is de-energized in response to a signal from the detector 20 which detects the leading end of the recording medium 5 that reaches the desired recording position. Upon arrival of the recording medium 5 at the desired recording position, the shifter arm 23 is turned upwardly as shown in FIG. 13D to displace the recording medium 5 in the main scanning direction until it is held edgewise against the guide plate 22. Then, the feeder roller 25 is moved downwardly to the second position, and the recording medium 5 is two-dimensionally scanned with the light beam 2, as shown in FIG. 13D. After the recording medium 5 has been scanned, the feeder roller 25 is raised again to the first position and rotated in the direction of the arrow E (FIG. 13E) to deliver the recording medium 5 until the leading end of the recording medium 5 is gripped by the outlet rollers 21A, 21B. Then, the outlet rollers 21A, 21B are rotated to move the recording medium 5 in the direction of the arrow F3 so that it can be discharged out of the image recording apparatus. After the recording medium 5 has been discharged, the feeder roller 25 returns downwardly to the second position to allow a next recording medium 5 to be introduced onto the support surface 11a.

Figure 12:
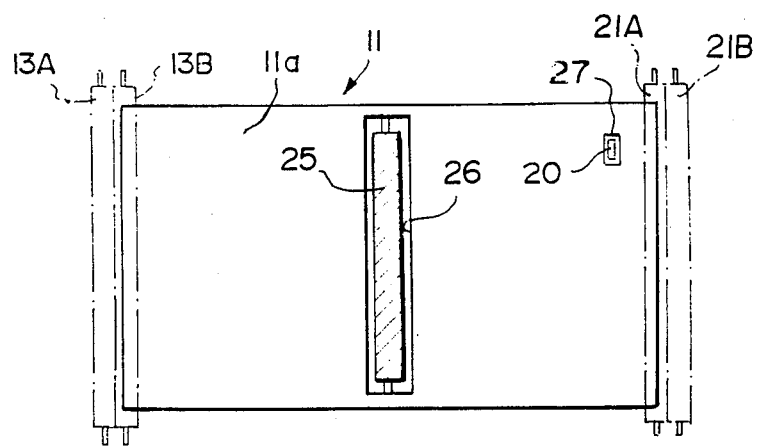
FIG. 12 is a plan view of a recording medium support of the light beam scanning system of FIG. 11.

The detector 20 is disposed in an opening or recess 27 defined in the support surface 11a and is exposed upwardly, as shown in FIG. 12. Where the recording medium 5 may be located less accurately on the support surface 11a, the detector 20 may be dispensed with, and the motor for rotating the feeder roller 25 may be energized for a predetermined period of time to enable the feeder roller 25 to move the recording medium 5 on the support surface 11a during such a predetermined period of time. The motor for rotating the feeder roller 25 may easily be controlled if it is a stepping motor.

FIGS. 14, 15, and 16A through 16E show a light beam scanning system according to a still further embodiment of the present invention. The light beam scanning system of FIG. 14 differs from that of FIG. 11 in that the outlet rollers 21A, 21B are dispensed with, and the rollers 13A, 13B disposed at one end of the recording medium support 11 comprise delivery rollers which can rotate selectively in opposite directions about their own axes, and that the guide 15 is tiltable and the feeder roller 25 is reversible.

Figure 16:
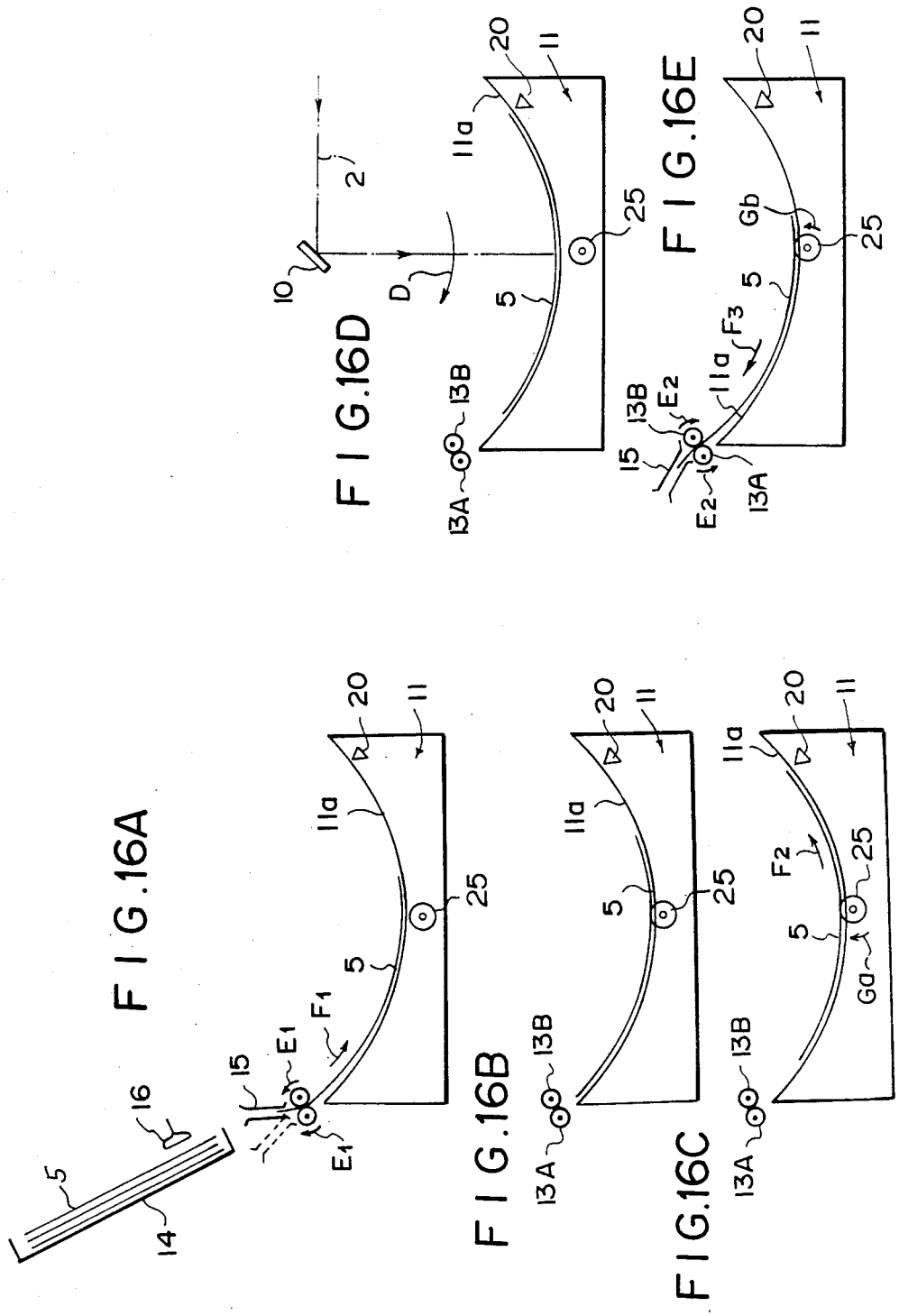
FIGS. 16A through 16E are schematic side elevational views showing the manner in which the light beam scanning system of FIG. 14 operates.
Figure 17:
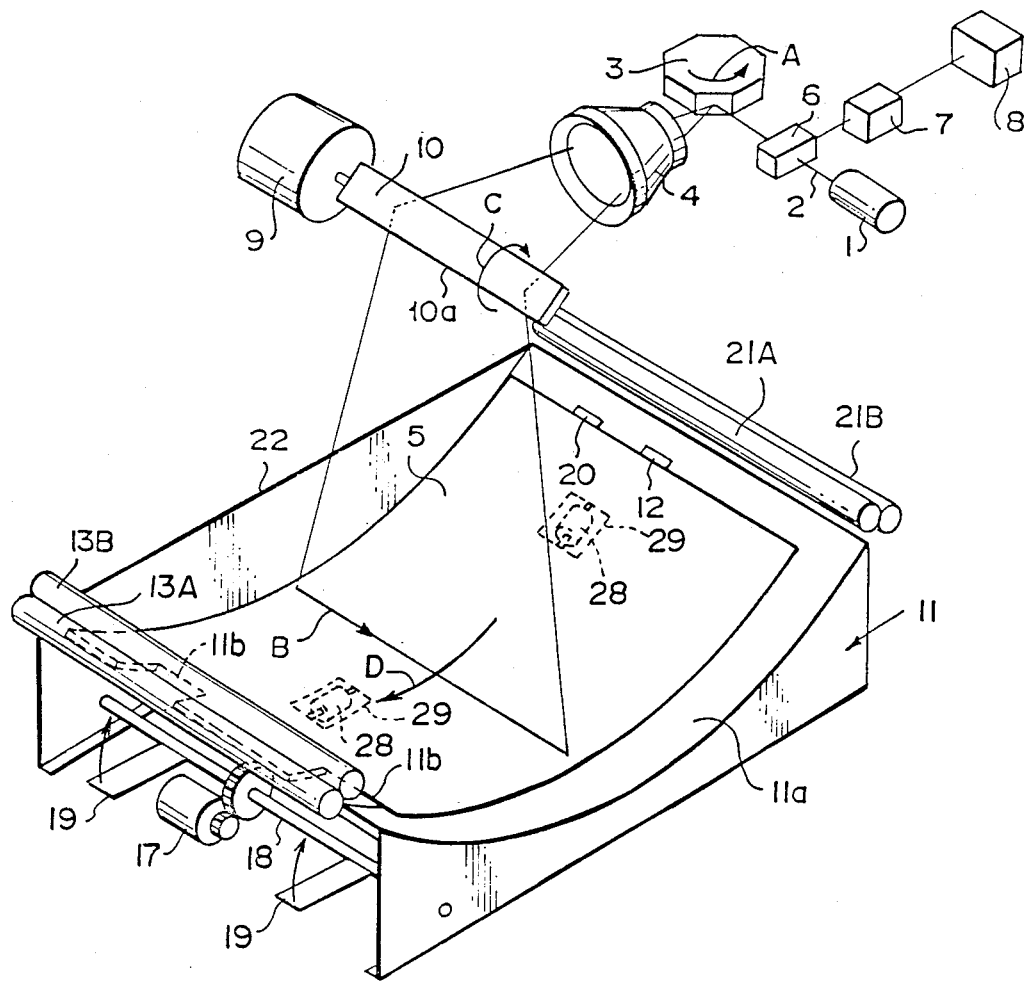
FIG. 17 is a schematic perspective view of a light beam scanning system according to a yet still further embodiment of the present invention.

One of the recording mediums 5 is picked up from the magazine 14 by the suction means 16 and then gravity-fed through the guide 15 in an erected position toward the delivery rollers 13A, 13B. The recording medium 5 is then fed in the direction of the arrow F1 (FIG. 16A) by the delivery rollers 13A, 13B which rotate in the directions of the arrows E1 about their own axes. During this time, the feeder roller 25 is retracted to the second position. The recording medium 5 is delivered by the delivery rollers 13A, 13B until it is released from the delivery rollers 13A, 13B whereupon the recording medium 5 is positioned just short of the desired recording position on the support surface 11a, as shown in FIG. 16B. The feeder roller 25 is lifted to the first position and rotated about its own axis in the direction of the arrow Ga (FIG. 16C) to move the recording medium 5 in the direction of the arrow F2 into the desired recording position.

When the recording medium 5 reaches the desired recording position, the feeder roller 25 is stopped in response to a signal from the detector 20 and then lowered to the second position. The recording medium 5 is now two-dimensionally scanned by the light beam 2, as shown in FIG. 16D.

Upon completion of the two-dimensional scanning of the recording medium 5, the feeder roller 25 is raised to the first position and rotated in the direction of the arrow Gb (FIG. 16E) to move the recording medium 5 backwards to the delivery rollers 13A, 13B. The delivery rollers 13A, 13B are rotated in the directions of the arrows E2 to grip and deliver the recording medium 5 in the direction of the arrow F3 out of the image recording apparatus through the guide 15, which is now tilted to a lowered position (indicated by the dotted lines in FIG. 16A and the solid lines in FIG. 16E) for directing the recording medium 5 below the magazine 14 for easy introduction into the automatic developing machine or receiver magazine. After the recording medium 5 has been discharged, the feeder roller 25 is lowered to the second position in readiness for the feeding of a new recording medium.

The magazine 14 may be replaced with a cassette containing a single recording medium. The recording medium is first taken from the cassette onto the recording medium support 11 and then a desired image is recorded on the recording medium. Thereafter the recording medium is fed back into the empty cassette, which is removed for processing. With this arrangement, therefore, the guide 15 is not required to be tilted as shown in FIG. 16E.

A light beam scanning system according to a yet still further embodiment is illustrated in FIGS. 17, 18A through 18F, 19A and 19B. This light beam scanning system is different from that of FIG. 2 in that the shifter arm 23 and its actuator 24 are dispensed with, and a pair of rotatable shifter rollers 28 is disposed in the recording medium support 11 for positioning the recording medium 5 in the main scanning direction.

The shifter rollers 28 are disposed in respective opening or recesses 29 defined in the support surface 11a of the recording medium support 11, and are spaced from each other in the auxiliary scanning direction. The shifter rollers 28 have their axes oriented in the auxiliary scanning direction and are exposed upwardly in the openings 29. Each of the shifter rollers 28 is vertically movable between a first upper position in which the shifter roller 28 has its upper peripheral surface projecting beyond the support surface 11a and a second lower position in which the upper peripheral surface of the shifter roller 28 is retracted downwardly from the support surface 11a. In operation, the shifter rollers 28 remain in the second lower position until the recording medium 5 is delivered by the inlet rollers 13A, 13B and the feeder arms 19 into the desired recording position on the support surface 11 in the auxiliary scanning direction, as shown in FIGS. 18A, 18B, and 18C. When the recording medium 5 is located in the desired recording position, the shifter rollers 28 are moved upwardly into the first upper position in which the shifter rollers 28 contact the lower surface of the recording medium 5, as shown in FIG. 18D. Then, the shifter rollers 28 are rotated about their axes in the directions of the arrows G3 to displace the recording medium 5 from the position of FIG. 19A to the position of FIG. 19B until the recording medium 5 is held edgewise against the guide plate 22. The recording medium 5 is now positioned in the main scanning direction.

Thereafter, the shifter rollers 28 are lowered into the second position out of engagement with the recording medium 5. The recording medium 5 is then two-dimensionally scanned by the light beam 2 as shown in FIG. 18E, and thereafter discharged by the feeder arms 19 and the outlet rollers 21A, 21B out of the image recording apparatus, as illustrated in FIG. 18F.

The number, length, and position of the shifter rollers 28 may be selected as desired to meet the type and size of the recording mediums 5 employed.

Figure 11:
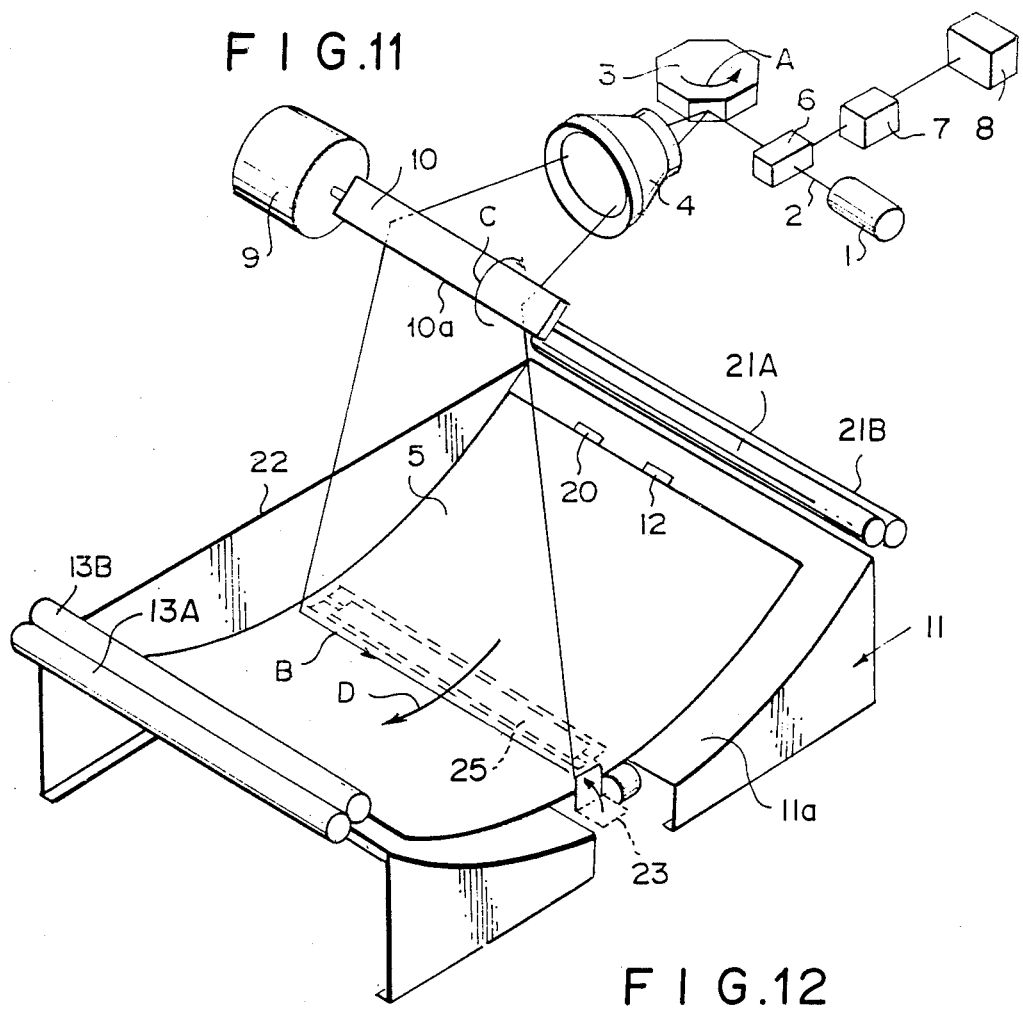
FIG. 11 is a schematic perspective view of a light beam scanning system according to still another embodiment of the present invention.

FIGS. 20 and 21A through 21F show a modified light beam scanning system that is similar to that of FIG. 11, except that the pair of feeder rollers 28 disposed in the recording medium support 11 is employed, rather than the shifter arm 23 and its actuator 24, for positioning the recording medium 5 in the main scanning direction.

Figure 21:
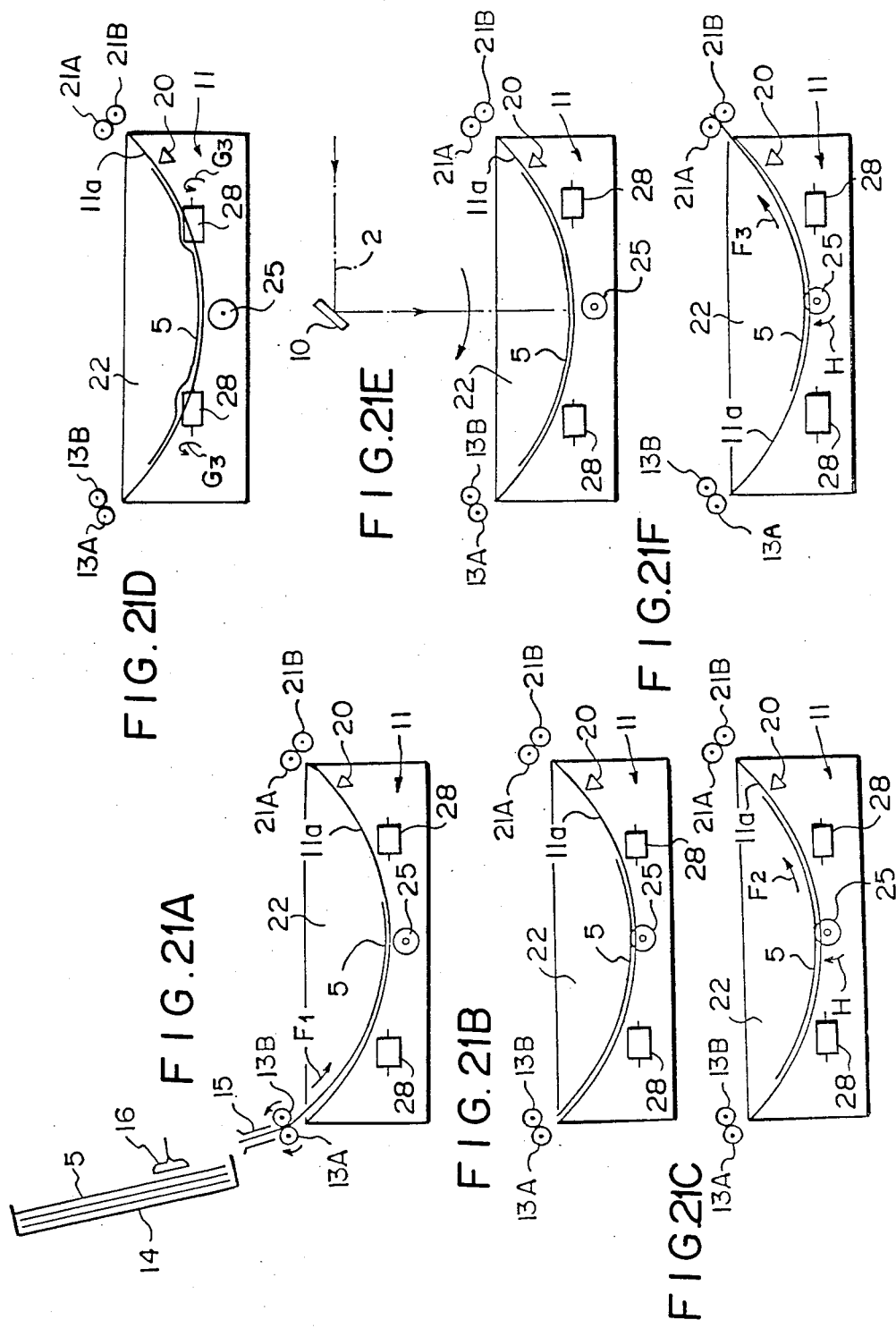
FIGS. 21A through 21F are schematic side elevational views showing the manner in which the light scanning system of FIG. 20 operates.
Figure 22:
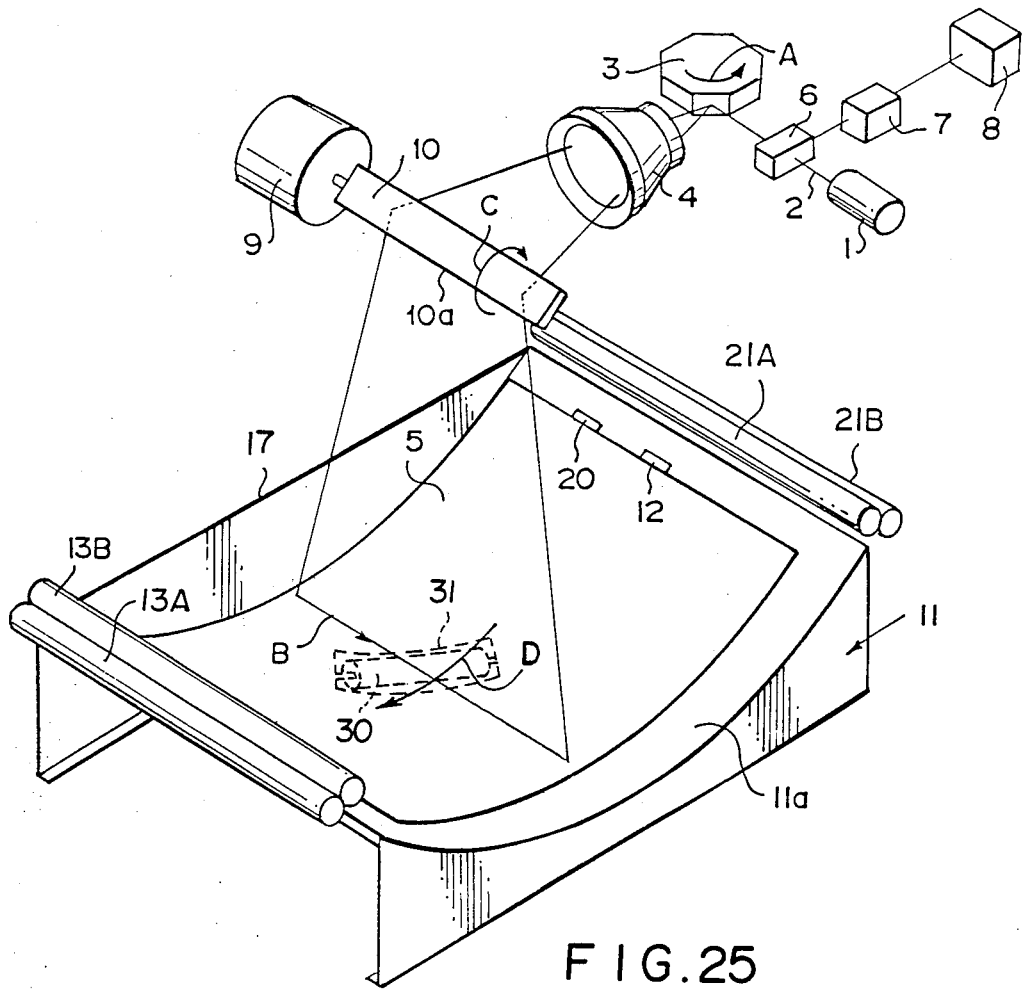
FIG. 22 is a schematic perspective view of a light beam scanning system according to another embodiment of the present invention.

As shown in FIGS. 21A through 21C, the feeder rollers 28 are retracted in the second lower position until the recording medium 5 is introduced and positioned by the inlet rollers 13A, 13B and the feeder roller 25 in the auxiliary scanning direction on the recording medium support 11. With the recording medium 5 positioned in the auxiliary scanning direction on the recording medium support 11, the shifter rollers 28 are moved upwardly into engagement with the recording medium 5 and then rotated about their own axes in the directions of the arrows G, as shown in FIG. 21D, to position the recording medium 5 in the main scanning direction. Then, the shifter rollers 28 are lowered into the second position, and the recording medium 5 is two-dimensionally scanned by the light beam 2, as shown in FIG. 21E, followed by discharging the recording medium 5 with the feeder roller 25 and the outlet rollers 21A, 21B, as shown in FIG. 21F.

FIGS. 22, 23A through 23E, and 24A through 24D show another embodiment in which a light beam scanning system has a skewed feeder/shifter roller 30 mounted in the recording medium support 11.

The skewed feeder/shifter roller 30 is of an elongate shape extending obliquely to the main and auxiliary scanning directions and positioned in a skewed elongate opening or recess 31 defined in the support surface 11a, the feeder/shifter roller 30 being exposed upwardly through the opening 31. The feeder/shifter roller 30 is vertically movable by a suitable driver between a first upper position in which the feeder/shifter roller 30 has its upper peripheral surface located above the support surface 11a and a second lower position in which the upper peripheral surface of the feeder/shifter roller 30 is retracted downwardly from the support surface 11a.

As shown in FIG. 23A, while the recording medium 5 is being fed in the direction of the arrow F1 onto the support surface 11a by the inlet rollers 13A, 13B, the upper peripheral surface of the feeder/shifter roller 30 is lowered in the second position below the support surface 11a. When the recording medium 5 is delivered to a position just upstream of the desired recording position on the support surface 11a and released from the inlet rollers 13A, 13B, the feeder/shifter roller 30 is moved upwardly to the first position in which it contacts the lower surface of the recording medium 5, as shown in FIGS. 23B and 24A.

Upon arrival of the recording medium 5 at the position of FIGS. 23B and 24A, the skewed feeder/shifter roller 30 is rotated about its own axis in the direction of the arrow G4 (FIG. 24B) to move the recording medium 5 in the direction of the arrow F2 toward the guide plate 22 and the detector 20. The angle $\theta$ at which the skewed feeder/shifter roller 30 is inclined to the main scanning direction is selected such that the side edge of the recording medium 5 will be brought into abutting engagement with the guide plate 22 before the leading end of the recording medium 5 reaches the detector 20. Therefore, as the feeder/shifter roller 30 rotates, the recording medium 5 first abuts against the guide plate 22 and hence is positioned in the main scanning direction. Continued rotation of the feeder/shifter roller 30 causes the recording medium 5 to move in the auxiliary scanning direction indicated by the arrow F3 (FIG. 24C) while the recording medium 5 is being held edgewise against the guide plate 22, until the recording medium 5 reaches the desired recording position in which the leading end thereof is detected by the detector 20. The detector 20 now generates a signal which is applied to the driver of the feeder/shifter roller 30 to stop the rotation of the feeder/shifter roller 30, which is then lowered from the first position (FIG. 23C) to the second position (FIG. 23D). The recording medium 5 which is positioned in the main and auxiliary scanning directions is then two-dimensionally scanned by the light beam 2, as shown in FIG. 23D.

After the recording medium 5 has been scanned by the light beam 2, the feeder/shifter roller 30 is moved upwardly to the first position as shown in FIG. 23E and rotated about its own axis in the direction of the arrow G4 to feed the recording medium 5 in the direction of the arrow F4 (FIGS. 23E and 24D). The leading end of the recording medium 5 is gripped by the outlet rollers 21A, 21B which now discharges the recording medium 5 out of the image recording apparatus. After the recording medium 5 has been discharged, the feeder/shifter roller 30 is lowered to the second position to allow a next recording medium to be introduced onto the support surface 11a.

Figure 25:
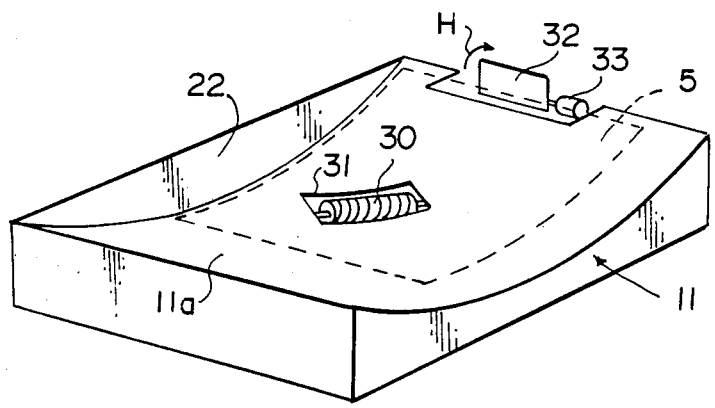
FIG. 25 is a schematic perspective view of a recording medium support of a modified light beam scanning system.

As illustrated in FIG. 25, a recording medium stop plate 32 may be employed instead of the detector 20 for stopping the recording medium 5 in the auxiliary scanning direction. More specifically, the stop plate 32 is disposed at the rear end of the recording medium support 11 and normally directed vertically and perpendicularly to the guide plate 22, the stop plate 32 being angularly movable between such a vertical position and a substantially horizontal position by an actuator 33 such as a rotary solenoid or a motor. While the recording medium 5 is being positioned by the skewed feeder/shifter roller 30, the stop plate 32 is in the vertical position and projects upwardly from the support surface 11a, as indicated by the solid lines, so that the leading end of the recording medium 5 abuts against the stop plate 5 to stop the recording medium 5 in the desired recording position in the auxiliary scanning direction. After the recording medium 5 has been positioned in the main and auxiliary scanning directions and scanned by the light beam 2, the stop plate 32 is angularly moved by the actuator 33 into the horizontal position in the direction of the arrow H, thus allowing the recording medium 5 to be removed from the support surface 11a. Where the stop plate 32 is employed, the feeder/shifter roller 30 may be angularly oriented such that it will first bring the recording medium 5 into engagement with the stop plate 32 to position it in the auxiliary scanning direction before the recording medium 5 abuts against the guide plate 22.

According to another modification, the outlet rollers 21A, 21B may be dispensed with, and the recording medium 5 after it has been scanned may be discharged by rotating the feeder/shifter roller 30 in a direction opposite to the direction of the arrow G4 to move the recording medium 5 toward the inlet rollers 13A, 13B, which may be reversed to grip the trailing end of the recording medium 5 and to discharge the recording medium 5. In this modification, the stop plate 32 may be fixed in the vertical position projecting upwardly from the support surface 11a.

In case the recording medium 5 is positioned in the auxiliary scanning direction by the stop plate 32 (FIG.

25), the recording medium 5 may be positioned in the main scanning direction by means of a detector placed in the vicinity of a side edge of the support surface 11a, rather than the guide plate 22. With this arrangement, the skewed feeder/shifter roller 33 should be directed such that the leading end of the recording medium 5 will engage the stop plate 32 prior to detection by the detector of the side edge of the recording medium 5.

Figure 26:
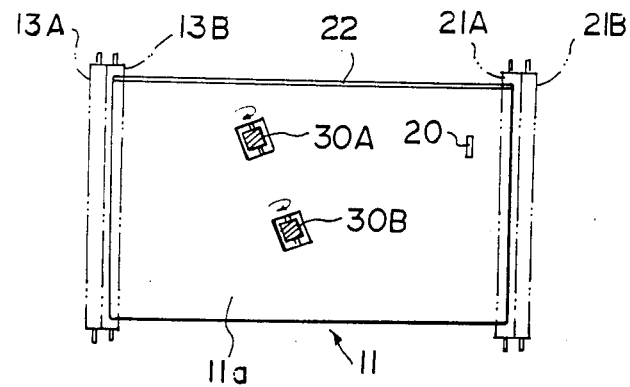
FIGS. 26, 27, 28A and 28B are plan views of recording medium supports according to other modifications.

FIG. 26 shows a modification in which a pair of relatively short skewed feeder/shifter rollers 30A, 30B is disposed in the support surface 11a, the feeder/shifter rollers 30A, 30B being coaxial with each other.

Figure 27:
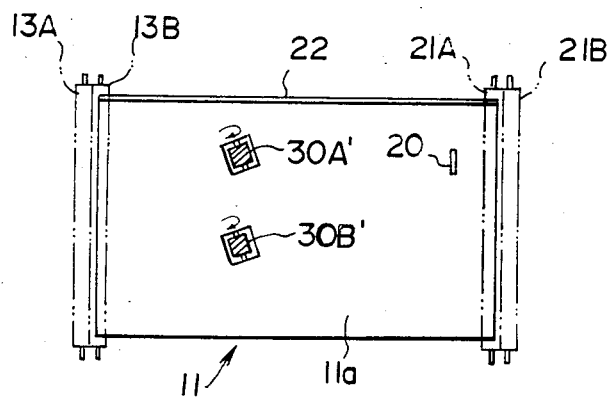

According to another modification shown in FIG. 27, a pair of relatively short skewed feeder/shifter rollers 30A', 30B' is disposed in the support surface 11a, with their axes parallel to each other.

Figure 28A:
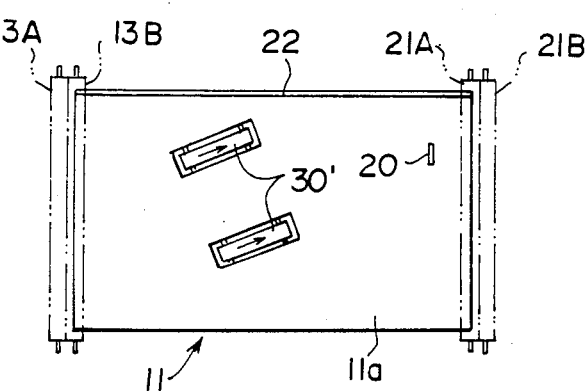
Figure 28B:
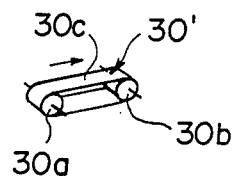

FIGS. 28A and 28B illustrate still another modification in which a pair of parallel feeder/shifter endless belts 30' is disposed in the support surface 11a. Each of the feeder/shifter endless belts 30' comprises a belt 30c mounted on a pair of spaced rollers 30a, 30b rotatably mounted in the recording medium support 11.

Figure 30:
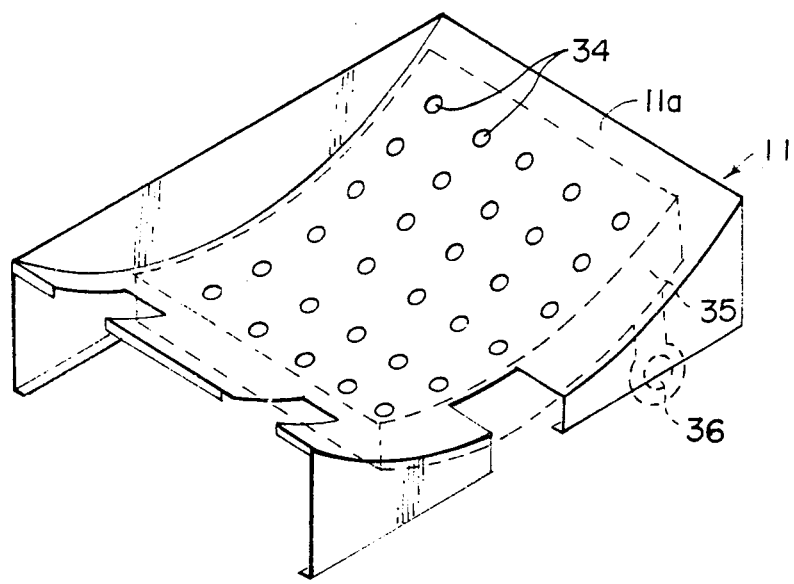
FIG. 30 is a schematic perspective view of a suction structure of the light beam scanning system of FIG. 29.
Figure 31:
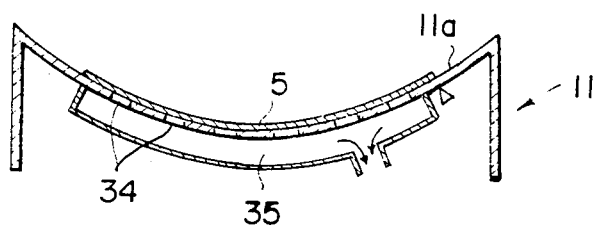
FIG. 31 is a vertical cross-sectional view of the suction structure of FIG. 30.

FIGS. 29, 30, and 31 illustrate a suction structure incorporated in the light beam scanning system shown in FIG. 2, for example. As described above, the support surface 11a of the recording medium support 11 is of an arcuately concave shape for supporting the recording medium 5. For allowing the light beam 2 to be focused accurately on the recording medium 5 for accurately scanning the same, it is necessary for the recording medium 5 to be arcuately curved in intimate contact with the arcuate support surface 11a. However, if the support surface 11a is of a relatively large curvature or the recording medium 5 is relatively rigid, then the recording medium 5 tends to float out of intimate engagement with the support surface 11a. Furthermore, if the recording medium 5 itself is distorted or irregularly curved, then it is locally displaced out of full contact with the support surface 11a.

The suction structure shown in FIGS. 29, 30, and 31 is designed to keep the recording medium 5 in intimate contact with the arcuate support surface 11a. More specifically, the support surface 11a has a plurality of suction holes 34 defined at spaced intervals over its substantially full area. A suction box 35 (FIGS. 30 and 31) is disposed underneath the support surface 11a and has an upper end open toward the support surface 11a, the suction box 35 having a suction means 36 such as an air pump. The suction box 35 remains inactivated before the recording medium 5 is positioned in the main and auxiliary scanning directions on the support surface 11a. When the recording medium 5 is positioned on the support surface 11a, the air pump 36 is actuated to develop a vacuum in the suction box 35 to attract the recording medium 5 against the support surface 11a under the vacuum applied through the suction holes 34. Therefore, the recording medium 5 is prevented from floating off the support surface 11a, but remains held intimately against the support surface 11a, so that the light beam 2 can sharply be focused on the recording medium 5 to allow the same to be accurately scanned by the light beam 2. The recording medium 5 is stably supported on the support surface 11a even when it is subjected to vibration while being scanned by the light beam 2.

Figure 32:
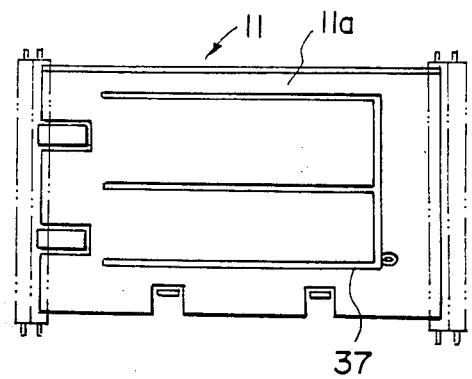
FIGS. 32, 33, and 34 are plan views of suction grooves according to modifications.
Figure 33:
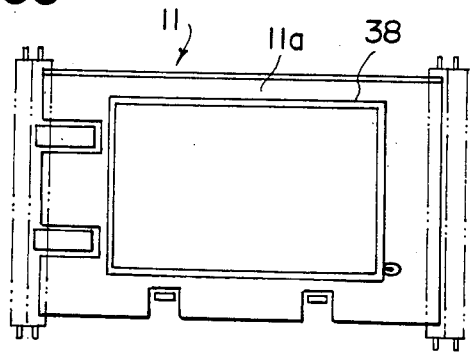
Figure 34:
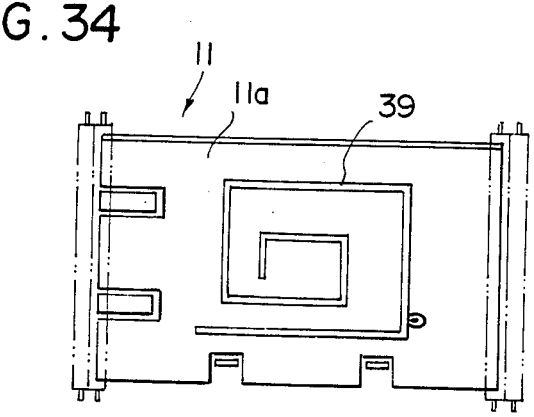

FIGS. 32, 33, and 34 show modifications in which the support surface 11a has a comb-shaped suction groove 37, a square suction groove 38, and a spiral suction groove 39, respectively, coupled to a suction means for holding the recording medium 5 against the support surface 11a. These suction grooves 37, 38, 39 may be employed where the accuracy with which the recording medium 5 is attracted under suction to the support surface 11a may be relatively low because the light beam 2 can be well focused due for example to the depth of focus of the lens 4. The suction grooves 37, 38, and 39 may be of other shapes as far as they can hold the entire surface of the recording medium efficiently under suction against the support surface 11a.

Figure 35:
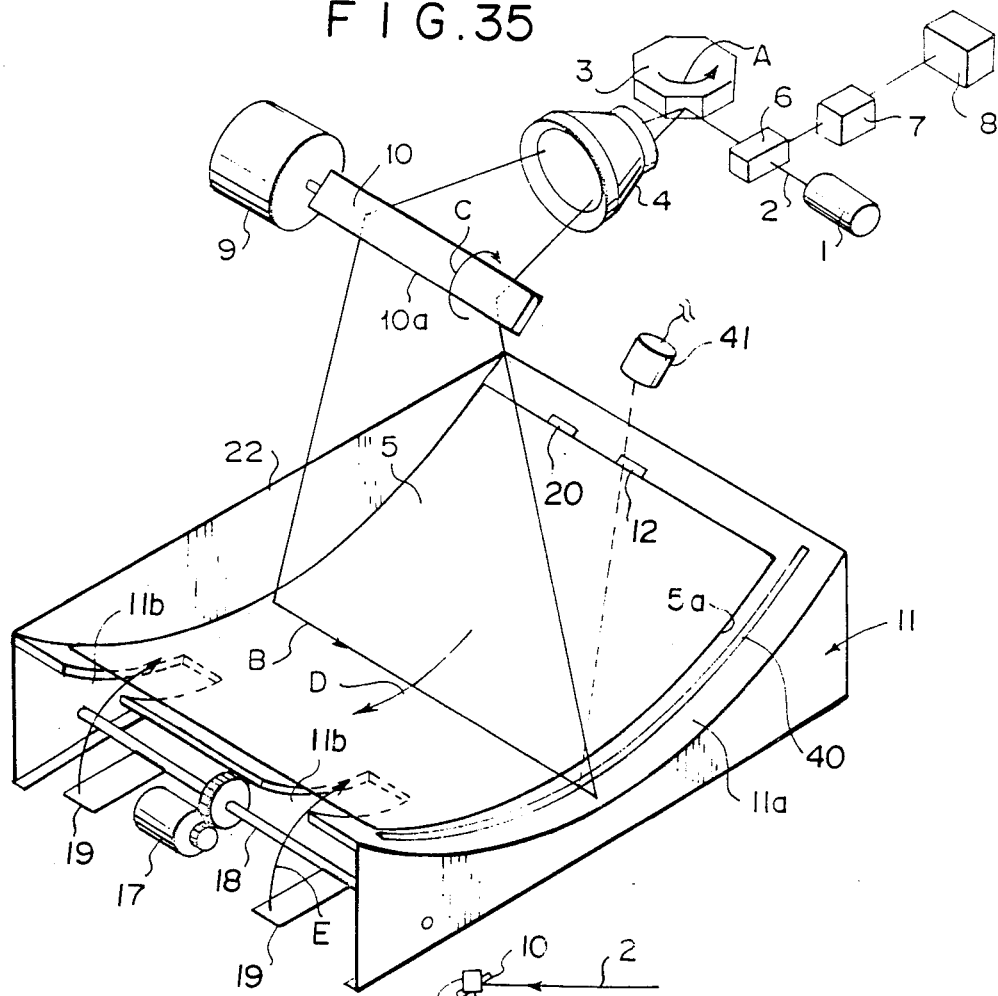
FIG. 35 is a schematic perspective view of a light beam scanning system according to still another embodiment of the present invention, with inlet and outlet rollers omitted from illustration.
Figure 36:
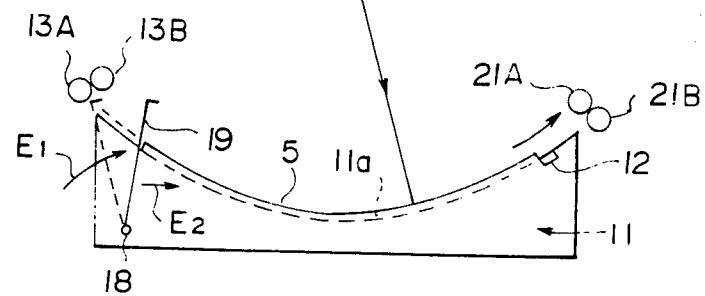
FIG. 36 is a schematic side elevational view of the light beam scanning system of FIG. 35.
Figure 37:
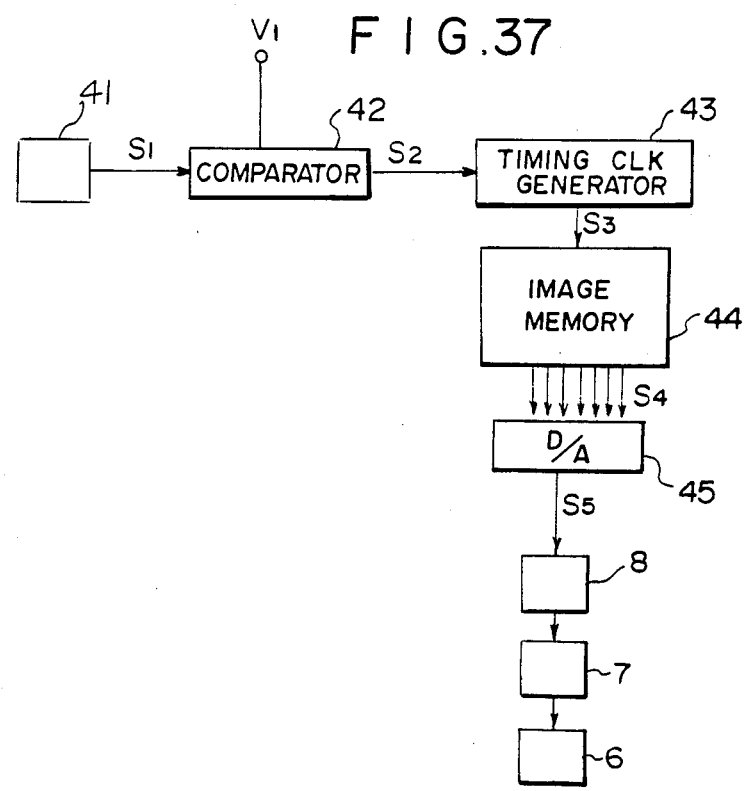
FIG. 37 is a block diagram of a synchronizing arrangement of the light beam scanning system shown in FIG. 35.

FIGS. 35, 36, and 37 show an arrangement for starting a main scanning cycle over the recording medium 5 from a prescribed position in the main scanning direction in the light beam scanning system illustrated in FIG. 2, for example.

As shown in FIG. 35, a beam reflecting strip 40 is mounted on the support surface 11a and extends in the auxiliary scanning direction so as to lie parallel to a side edge 5a of the recording medium 5 remotely from the guide plate 22, the beam reflecting strip 40 being positioned within an area scanned by the light beam 2. Therefore, each time the light beam 2 is deflected in a main scanning cycle, light is reflected from the beam reflecting strip 40. A light detector 41 for detecting such reflected light from the beam reflecting strip 40 is disposed above the beam reflecting strip 40. The light detector 40 thus generates a main scanning synchronizing signal in response to detection of reflected light each time the light beam 2 traverses the beam reflecting strip 40. The light detector 41 may be positioned at any location insofar as it can detect light reflected from the beam reflecting strip 40. However, light reflected from the beam reflecting strip 40 can most efficiently be detected by the light detector 41 which is located at a point directly above the beam reflecting strip 40 in coaxial relation to the auxiliary scanning mirror 10, since any such reflected light passes through such a point.

Inasmuch as the beam reflecting strip 40 extends parallel to and is spaced a constant distance from the side edge 5a of the recording medium 5, the light beam 2 in each main scanning cycle reaches the side edge 5a of the recording medium 5 upon elapse of a constant period of time after a main scanning synchronizing signal is generated by the light detector 41 when the light beam 2 traverses the beam reflecting strip 40. The main scanning synchronizing signal is therefore produced in timed relation to the starting of image recording in each main scanning line. Consequently, points to start such image recording with the light beam 2 can easily be controlled by utilizing the main scanning synchronizing signal.

As illustrated in FIG. 37, the main scanning synchronizing signal, indicated by S1, generated by the light detector 41 is applied to a comparator 42 and shaped in waveform thereby by comparison with a reference voltage V1. The comparator 42 issues a digital synchronizing signal S2 to a timing clock generator 43 which generates an image clock signal S3 required to record an image on the recording medium 5, the image clock signal S3 being applied to an image memory 44. The image memory 44 stores in advance image information to be recorded on the recording medium 5, the image information being supplied from an external device (not shown). The image memory 44 generates a digital image data signal S4 for each pixel in timed relation to the image clock signal S3. The digital image signal S4 is converted by a D/A converter 45 to an analog image signal S5, which is applied to the image signal generator 8. The image signal generator S5 transmits the analog image signal S5 through the modulator driver 7 to the light modulator 6 that modulates the light beam 2 with the image signal.

Because the beam reflecting strip 40 is spaced from the side edge 5a of the recording medium 5, a certain period of time is required to elapse after the main scanning synchronizing signal S1 is produced and until the image clock signal S3 is generated, i.e., for the light beam 2 to travel from the beam reflecting strip 40 to the side edge 5a of the recording medium 5. Such a period of time can be predetermined by knowing the speed at which the light beam 2 travels and the distance from the beam reflecting strip 40 to the side edge 5a of the recording medium 5. To this end, the timing clock generator 43 has a delay circuit for generating the image clock signal S3 with a time delay after the synchronizing signal S2 has been applied.

Figure 38:
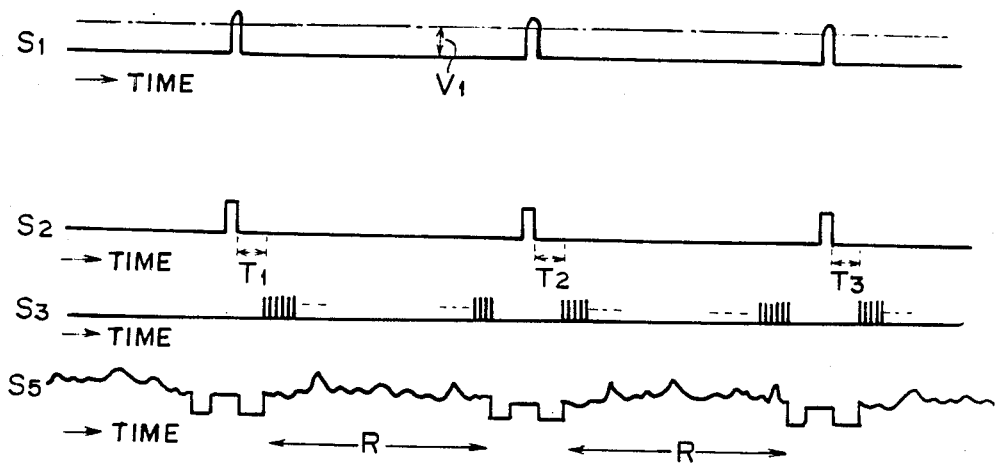
FIG. 38 is a timing chart of signals generated in the synchronizing arrangement of FIG. 37.

As shown in FIG. 38, the main scanning synchronizing signal S1 is shaped by the reference voltage V1 into the synchronizing signal S2, which is applied to the timing clock generator 43. The first image clock signal S3 which is produced by the timing clock generator 43 in response to the synchronizing signal S2 is delayed by a time delay T1 from the synchronizing signal S2. In case the light deflector 3 for deflecting the light beam 2 is a rotating polygonal mirror as illustrated, delay times T1, T2, T3, ..., Tn may be predetermined with respect to the n reflecting surfaces, respectively, of the polygonal mirror 3, and the image clock signals may be delayed by the respective delay times T1, T2, T3, ..., Tn for recording an image highly accurately with a minimum degree of jitter.

The analog image signal S5 which is produced by the D/A converter 45 in timed relation to the image clock signal S3 has a waveform as shown in FIG. 38. Denoted at R is an image region in which an image is recorded while the recording medium 5 is being scanned by the light beam in one main scanning cycle. When the light beam 2 passes across the beam reflecting strip 40, a signal of a constant level is applied to the light modulator 6 to energize the same for enabling the light beam 2 to be applied the beam reflecting strip 40 for light reflection.

FIGS. 39, 40, 41, and 42 show a light beam scanning system according to a still further embodiment of the present invention.

Figure 39:
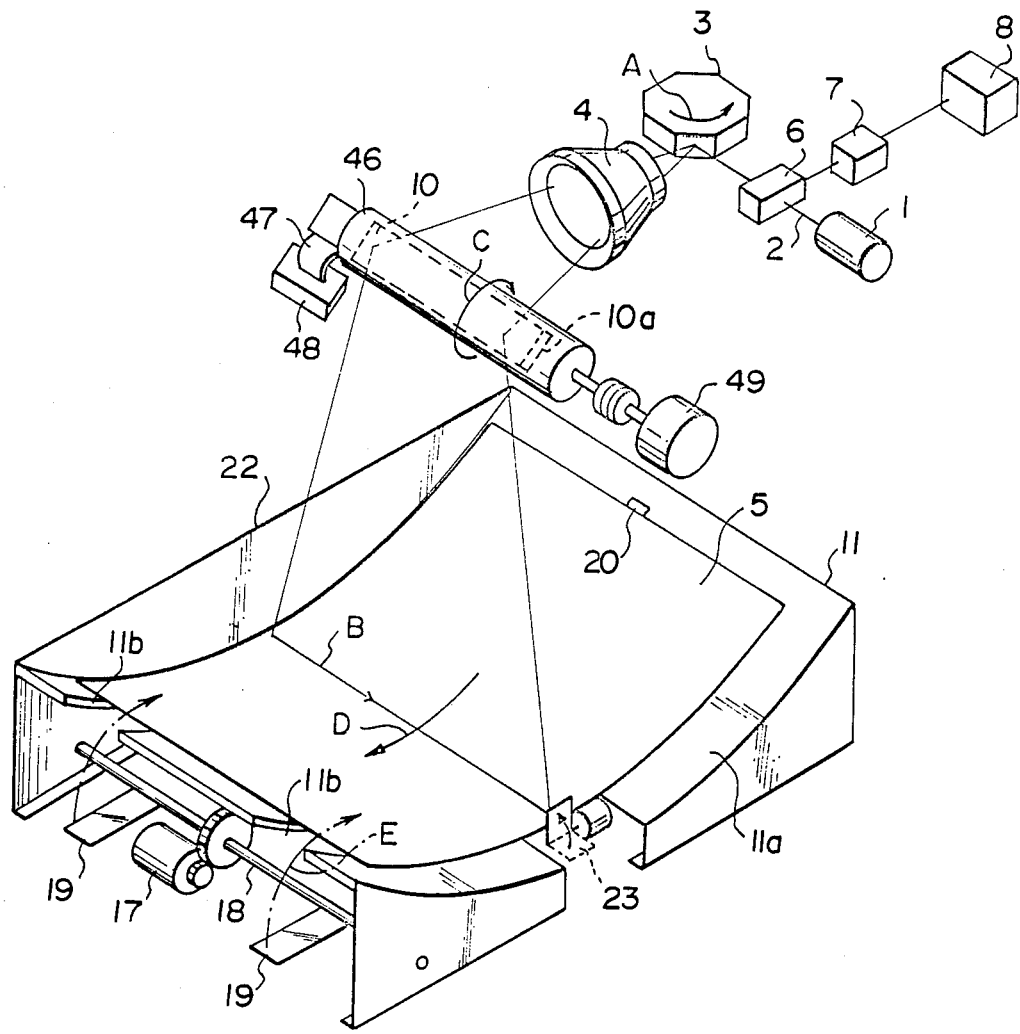
FIG. 39 is a schematic perspective view of a light beam scanning system according to a still further embodiment of the present invention.
Figure 40:
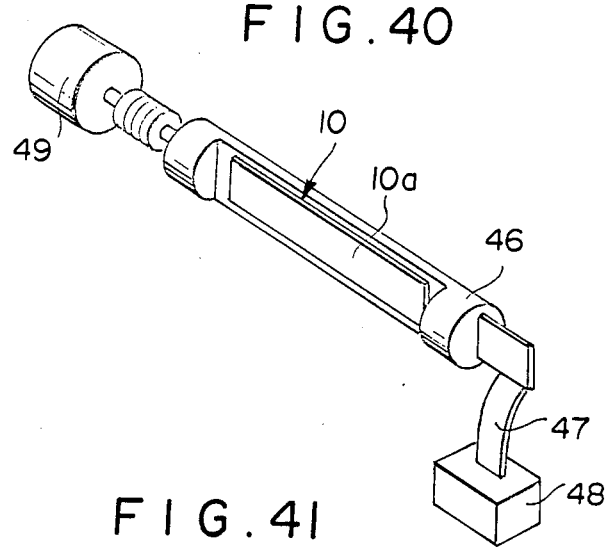
FIG. 40 is a perspective view of an auxiliary scanning mirror, a support member, a bimorph-type piezoelectric device, a control unit, and a resolver of the light beam scanning system of FIG. 39.
Figure 41:
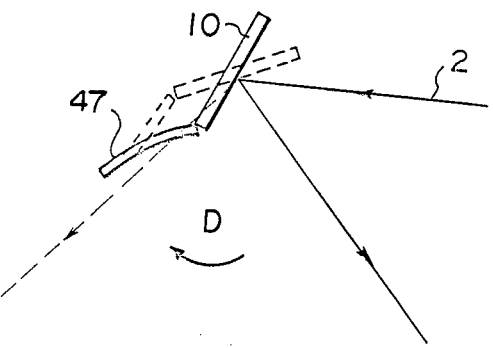
FIG. 41 is a side elevational view of the auxiliary scanning mirror and the bimorph-type piezoelectric device.

The light beam scanning system shown in FIG. 39 is similar to the light beam scanning system of FIG. 1, except that the auxiliary scanning mirror 10 is supported by an elongate support member 46, and a bimorph-type piezoelectric device 47 controlled by a control unit 48 and a resolver 49 are attached to the axially opposite ends of the support member 46. A command signal indicative of an angle through which the auxiliary scanning mirror 10 is to be angularly moved is supplied to the control unit 48 which, in response to the supplied command signal, applies a corresponding voltage to the bimorph-type piezoelectric device 11. As the voltage applied to the bimorph-type piezoelectric device 11 is continuously varied, the bimorph-type piezoelectric device 11 is continuously deformed mechanically from the solid-line position to the dotted-line position in FIG. 41, causing the auxiliary scanning mirror 10 to be angularly moved from the solid-line position to the dotted-line position in FIG. 41 for deflecting the light beam 2 applied to the reflecting surface 10a in the auxiliary scanning direction indicated by the arrow D. The bimorph-type piezoelectric device 47 may be attached directly to the auxiliary scanning mirror 10. The bimorph-type piezoelectric device 47 is flexibly attached to the support member 46 or the auxiliary scanning mirror 10 so as to allow the auxiliary scanning mirror 10 to be angularly moved in response to mechanical deformation of the bimorph-type piezoelectric device 47.

The resolver 49 serves as an angle detecting means for generating a signal representative of the angle through which the auxiliary scanning mirror 10 has been angularly moved. The angle commanded by the command signal applied to the control unit 48 and the actual angle detected by the resolver 49 are compared, and their difference is fed back to the bimorph-type piezoelectric device 47 for controlling the auxiliary scanning mirror 10 to be angularly moved through the commanded angle.

Figure 42:
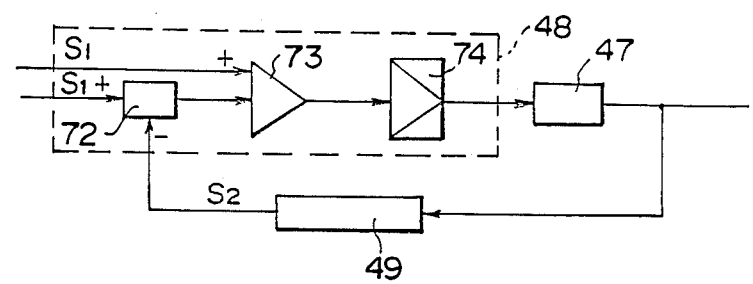
FIG. 42 is a block digram of a feedback servo loop for controlling the bimorph-type piezoelectric device.

Such feedback control will be described with reference to FIG. 42. The control unit 48 has an adder 72, a differential amplifier 73, and an amplifier 74. A command signal S1 indicative of the angle through which the auxiliary scanning mirror 8 is to be angularly moved is applied as a voltage signal via the differential amplifier 73 to the amplifier 74. The command signal amplified by the amplifier 74 is imposed on the bimorph-type piezoelectric device 47 to enable the same to be deformed for thereby turning the auxiliary scanning mirror 10. The angle through which the auxiliary scanning mirror 10 has been angularly moved is detected by the resolver 49 which then generates a voltage signal S2 representative of the detected angle. The signal S2 is applied as a negative signal to the adder 14 by which it is added to the command signal S1 which is applied as a positive signal to the adder 14. If the auxiliary scanning mirror 10 is properly turned through the commanded angle, then the absolute values of the signals S1, S2 are equal, and no voltage is generated by the adder 14. If the auxiliary scanning mirror 10 is not turned through the commanded angle, then the absolute values of the signals S1, S2 differ from each other, and a voltage signal S3 is applied from the adder 72 via the differential amplifier 73 to the amplifier 74, from which the amplified signal is applied to the bimorph-type piezoelectric device 47 for turning the auxiliary scanning mirror 10 through the commanded angle. With the servo loop thus arranged for controlling the voltage to be applied to the bimorph-type piezoelectric device 47, the mechanical deformation of the bimorph-type piezoelectric device 47 and hence the angular movement of the auxiliary scanning mirror 10 can be controlled in a corrective manner for controlling the light beam 2 highly accurately in the auxiliary scanning direction. The resolver 49 is advantageous over a rotary encoder or an FG in that it can produce a continous detected signal for a wider control range and it is highly resistant to vibration. However, other angle detecting means than the resolver 49 may be employed insofar as it can detect the angle through which the auxiliary scanning mirror 10 is turned and generate a signal representative of the detected angle. The detected signal may be a current signal, which should be converted to a voltage signal prior to application to the adder 72.

For recording an image from the leading end of the recording medium 5, the auxiliary scanning mirror 10 is angularly moved to bring the scanning position of the light beam into alignment with the leading end of the recording medium 5, and then the command signal S1 is continuously varied to enable the auxiliary scanning mirror 10 to scan the recording medium in the auxiliary scanning direction. For recording an image from a desired position on the recording medium 5, the command signal S1 is initially set to a level indicating the desired position to start the auxiliary scanning mirror 10 in an auxiliary scanning process, thus moving the auxiliary scanning mirror 10 to the desired position, and then is continuously varied to turn the auxiliary scanning mirror 10 in the auxiliary scanning direction. The inertia of the combined mass of the support member 46 and the auxiliary scanning mirror 10 is selected to be small to allow the auxiliary scanning mirror 10 to be instantaneously moved to the scanning start position. After the desired image has been recorded on the recording medium 5, the auxiliary scanning mirror 10 can be quickly returned to its original position by changing the voltage applied to the bimorph-type piezoelectric device 47.

Figure 43:
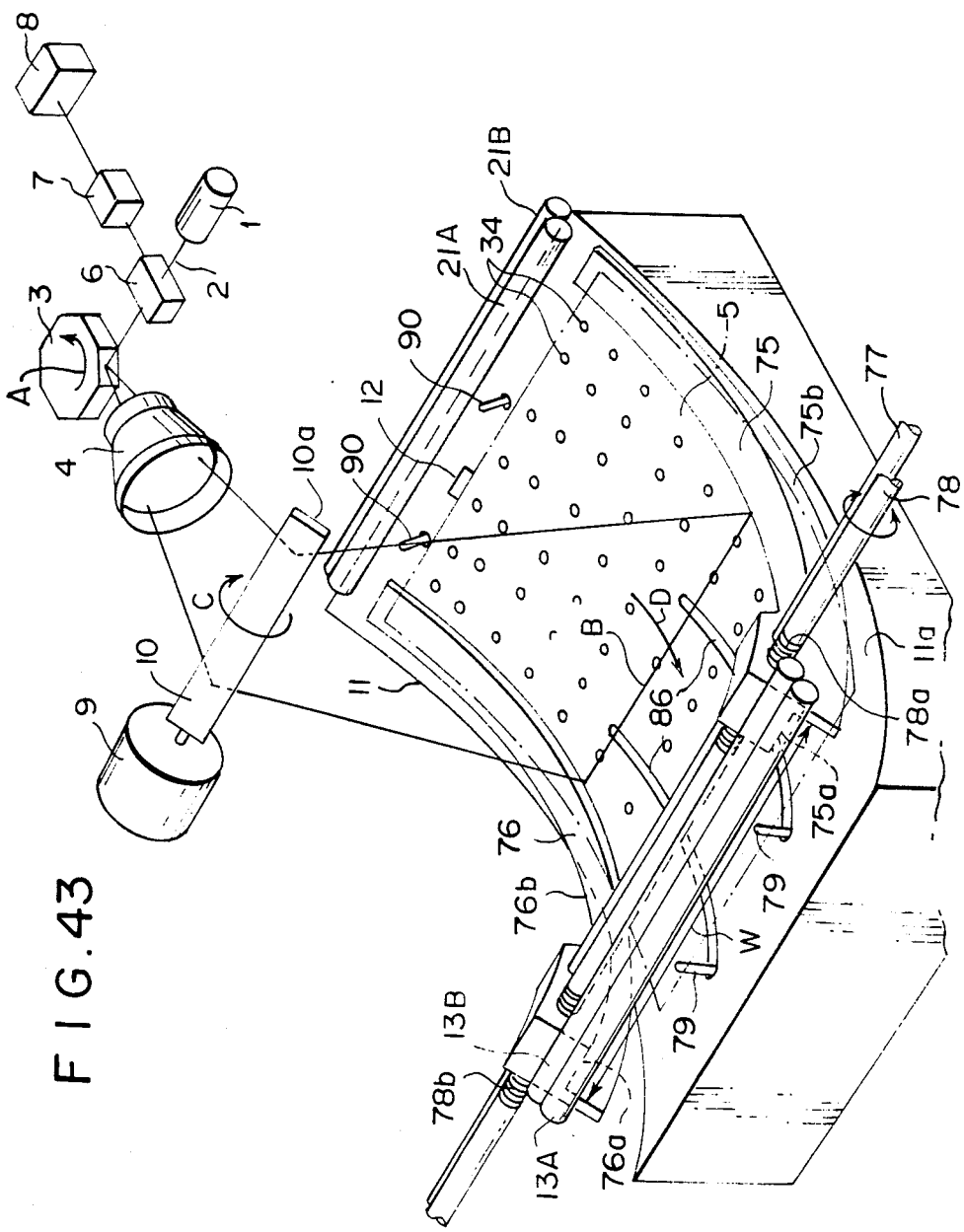
FIG. 43 is schematic perspective view of a light beam scanning system according to a yet still further embodiment of the present invention.

FIGS. 43 and 44A through 44C are illustrative of another embodiment in which a pair of spaced arcuate guide members 75, 76 is disposed on the support surface 11a and extends in the auxiliary scanning direction. As shown in FIG. 43, have ends lying above the support surface 11a and adjacent to the inlet rollers 13A, 13B, and include respective horizontal flanges 75a, 76a and vertical side walls 75b, 76b extending downwardly from the outer edges fo the horizontal flanges 75a, 76a, respectively. The recording medium 5 as it is introduced by the inlet rollers 13A, 13B onto the support surface 11a is guided by the guide members 75, 76 while it is advancing below the flanges 75a, 76a with its side edges engaged by the side walls 75b, 76b. To accommodate recording mediums of different sizes, the guide members 75, 76 are relatively movable in the main scanning direction to change the distance W between these guide members 75, 76. More specifically, the guide members 75, 76 are movably supported on a guide shaft 77 extending in the main scanning direction and also mounted threadedly on a feed screw 78 extending parallel to the guide shaft 77. The feed screw 78 is rotatable about its axis in the directions of the arrows and has external threads 78a, 78b cut in opposite directions and held in engagement with internal threads in the guide members 75, 76. Therefore, upon rotation of the feed screw 78, the guide members 75, 76 are moved toward or away from each other, changing the distance W. By rotating the feed screw 78 to equalize the distance W to the width of a recording medium to be introduced, the recording medium as it is fed onto the support surface 11a can be guided and positioned in the main scanning direction by the guide members 75, 76.

Figure 44A:
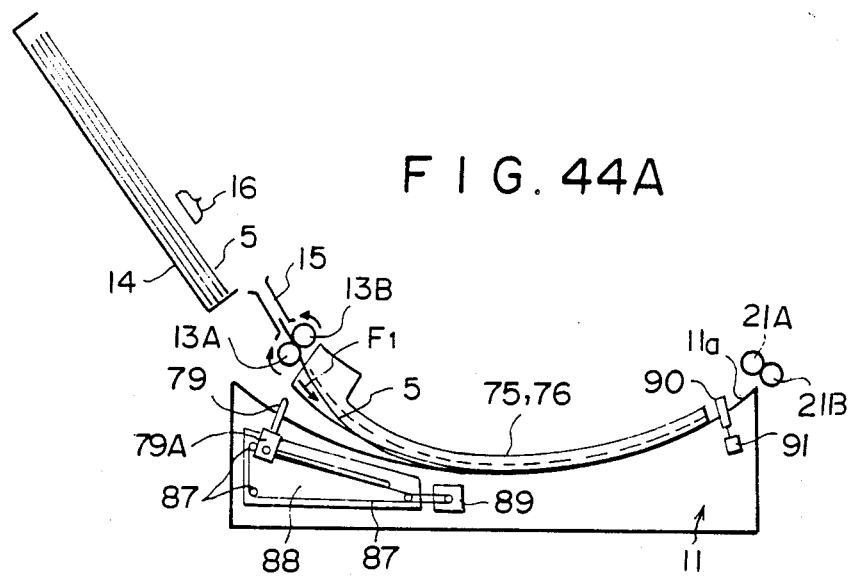
FIGS. 44A through 44C are schematic side elevational views showing the manner in which the light beam scanning system of FIG. 43 operates.
Figure 44B:
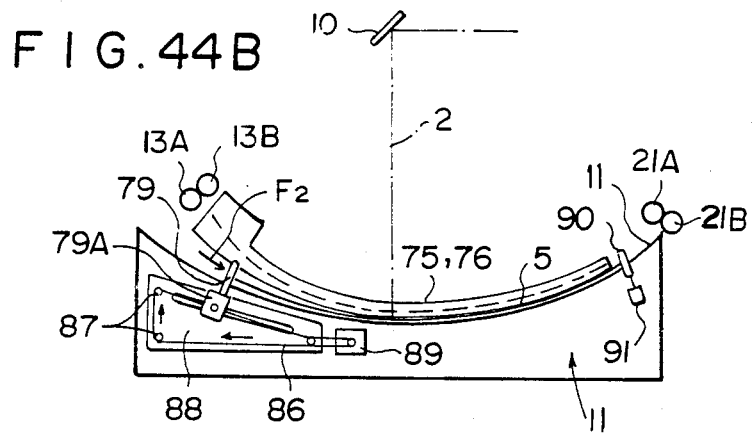
Figure 44C:
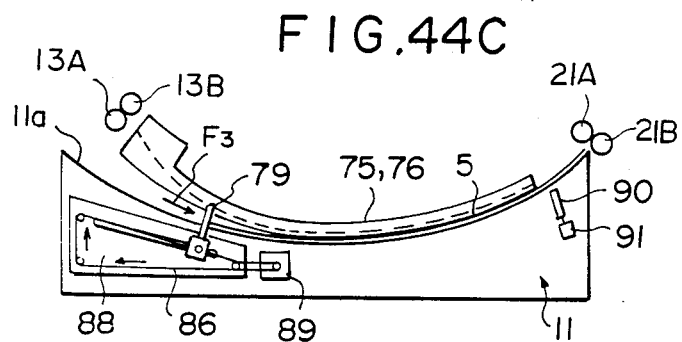

Two spaced pusher pins 79 are movably mounted in the recording medium support 11 and extend upwardly through respective parallel slots 86 defined in the support surface 11a in the auxiliary scanning direction. As illustrated in FIGS. 44A through 44C, the recording medium support 11 houses therein a pusher pin displacing means including two chains (only one shown) 86 trained around pins 87 rotatably supported on support plates 88, the chains 86 being movable by a motor 89. The pusher pins 79 have support bases 79A fixed to the chains 86. The pusher pins 79 are movable in and along the slots 86 when the chains 86 are moved by the motor 89.

When the recording medium 5 is fed by the inlet rollers 13A, 13B in the direction of the arrow F1 (FIG. 44A) and its trailing end disengages from the inlet rollers 13A, 13B, the recording medium 5 is placed on the support surface 11a at a position upstream of the desired recording position. Then, the pusher pins 79 are moved along the slots 86 to push the trailing end of the recording medium 5 until the recording medium 5 is moved in the direction of the arrow F2 (FIG. 44B) into the desired recording position on the support surface 11a. Before the pusher pins 79 are moved, they are positioned out of interference with the recording medium 5 when it is introduced by the inlet rollers 13A, 13B onto the support surface 11a.

As shown in FIG. 43, two recording medium stopper pins 90 retractably project upwardly from the support surface 11a for engaging the leading end of the recording medium 5 as it is in the desired recording position. The recording medium 5 which is pushed by the pusher pins 79 is stopped in the desired recording position by the stopper pins 90, and is then two-dimensionally scanned by the light beam 2, as shown in FIG. 44B.

The recording medium support 11 accommodates therein the suction structure as shown in FIGS. 29, 30, and 31 for holding the recording medium 5 in intimate contact with the arcuate support surface 11a.

After the recording medium 5 has been scanned, the stopper pins 90 are retracted downwardly below the support surface 11a by respective actuators 91 such as linear solenoids, as shown in FIG. 44C. The pusher pins 79 are now moved by the chains 86 to push the trailing end of the recording medium 5 in the direction of the arrow F3 until the recording medium 5 is gripped by the outlet rollers 21A, 21b, which thereafter discharge the recording medium 5 out of the image recording apparatus.

In case the recording medium 5 does not need to be positioned highly accurately on the support surface 11a, the stopper pins 90 may be dispensed with, and the motor 89 may be operated for a predetermined period of time to move the pusher pins 79 until the predetermined period of time expires. The motor 89 may easily be controlled if it is a stepping motor.

Figure 45:
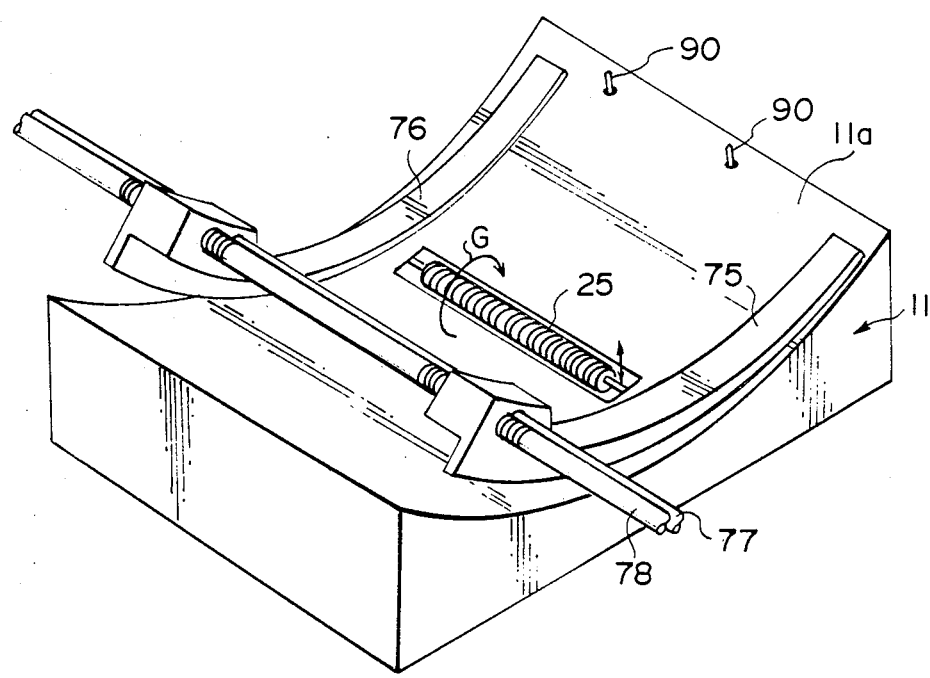
FIG. 45 is a schematic perspective view of a modified light beam scanning system.

As shown in FIG. 45, the feeder roller 25 such as shown in FIG. 11 may be employed for feeding the recording medium 5 into and out of the desired recording position.

One of the guide members 75, 76 may be fixed and only the other guide member may be movable. When the recording medium 5 has been positioned on the support surface 11a, the guide members 75, 76 may be moved farther away from each other to bring the flanges 75a, 76b out of overlapping relation to recording medium 5, so that images can be recorded on lateral edges of the recording medium 5.

Figure 46:
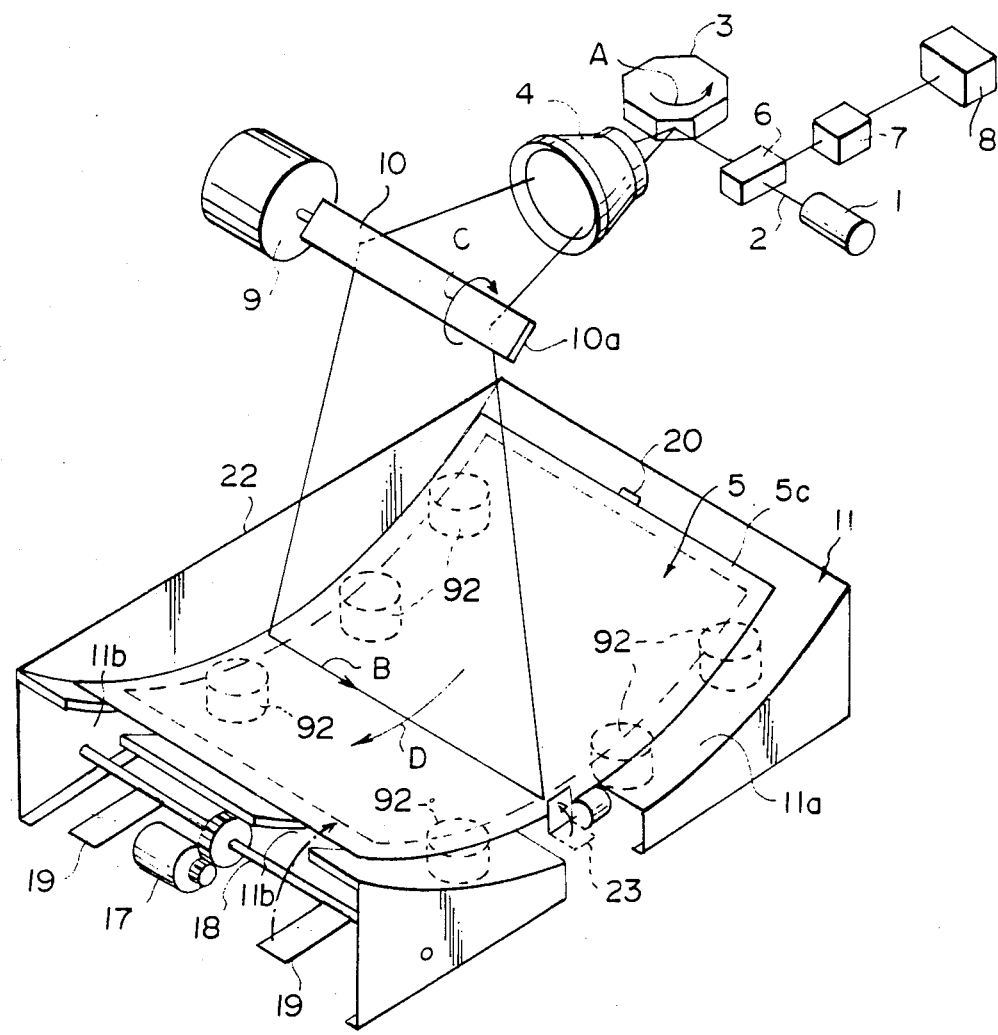
FIG. 46 is a schematic perspective view of a light beam scanning system according to another embodiment of the present invention.

A light beam scanning system shown in FIGS. 46 and 47A through 47C has a magnetic means for holding the recording medium 5 intimately against the arcuate support surface 11a of the recording medium support 11. As illustrated in FIG. 46, the recording medium 5 has a magnetic marginal edge 5c made of a ferromagnetic material, and the recording medium support 11 houses therein a plurality of permanent magnets 92 disposed in a pattern below the magnetic marginal edge 5c for magnetically attracting the recording medium 5 down against the support surface 11a. The magnetic marginal edge 5c extends around an area in which an image is to be recorded, so that any image portion will not be covered with the magnetic marginal edge 5c when the recorded image is observed as a transmitted image.

Each of the magnets 92 is supported on a magnet support 93 and vertically movable between a first upper position in which it magnetically attracts the magnetic marginal area 5c to hold the recording medium 5 against the support surface 11a and a second lower position in which the magnet 92 does not magnetically attract the magnetic marginal area 5c.

Figure 47A:
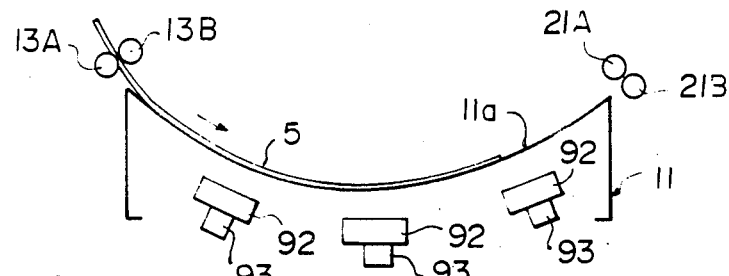
FIGS. 47A through 47C are schematic side elevational views showing the manner in which the light beam scanning system of FIG. 46 operates.
Figure 47B:
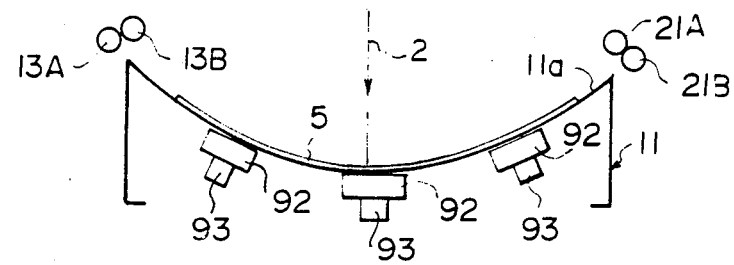
Figure 47C:
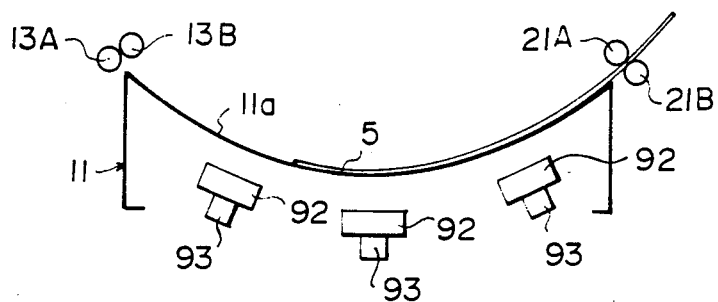

More specifically, while the recording medium 5 is being introduced and positioned on the recording medium support 11, the magnets 92 are displaced in the second position away from the support surface 11a, as shown in FIG. 47A, failing to exert substantial magnetic forces on the magnetic marginal area 5c. When the recording medium 5 has been positioned, the magnets 92 are moved upwardly into the first position close to the support surface 11a to magnetically attract the magnetic marginal area 5c, as illustrated in FIG. 47B. The recording medium 5 is now reliably and stably held in intimate contact with the arcuate support surface 11a under magnetic forces against any unwanted displacement during two-dimensional scanning of the recording medium 5. After the recording medium 5 has been scanned, the magnets 92 are lowered again to the second position, as shown in FIG. 47C, allowing the recording medium 5 to be delivered from the recording medium support 11.

The magnetic marginal area 5c may be formed by coating the ferromagnetic material on the recording medium 5 around the image-forming-area or applying a magnetic tape to the recording medium 5. The magnetic marginal area 5c may be either continuous or made as discrete magnetic layers located respectively above the magnets 92. The magnetic area 5c may be formed on the lower surface of the recording medium 5 or on any of other layers (not shown) of the recording medium 5 within a region subject to magnetic forces from the magnets 92.

Figure 48:
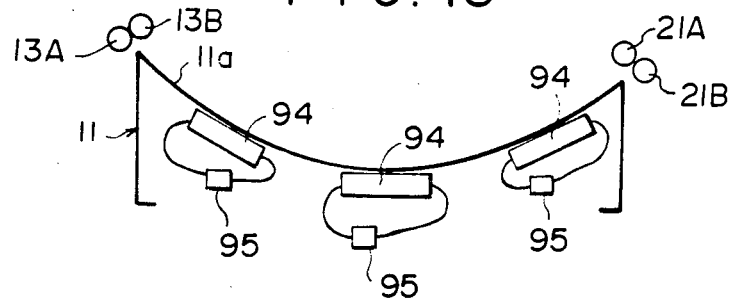
FIG. 48 is a schematic perspective view of a modified light beam scanning system.

FIG. 48 shows a modification in which a plurality of electromagnets 94 are housed in the recording medium support 11 in contact with the support surface 11a and connected respectively to power supplies 95. The electromagnets 94 remain de-energized while the recording medium 5 is being introduced and positioned on the support surface 11a. The electromagnets 94 are energized when the recording medium 5 has been positioned in place, and remain energized to hold the recording medium 5 against the support surface 11a while the recording medium 5 is being two-dimensionally scanned.

Figure 49:
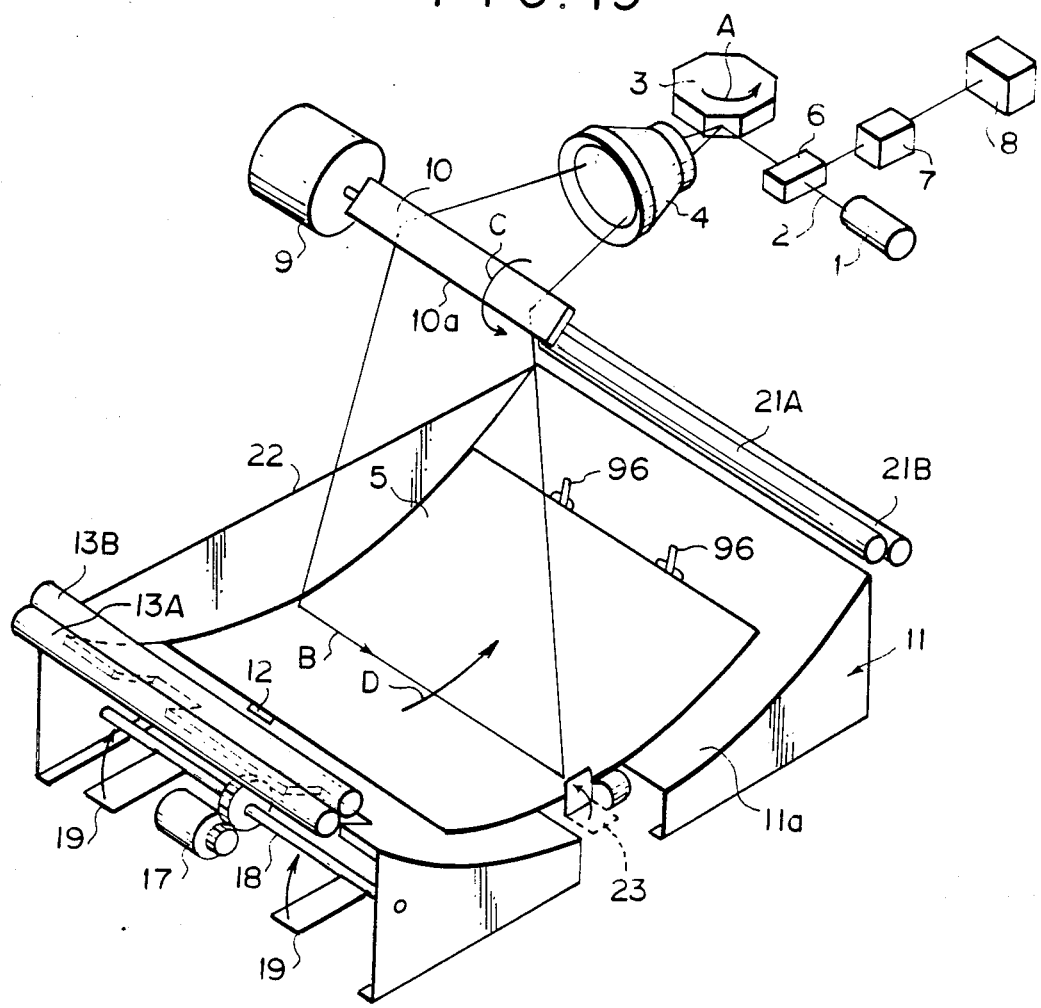
FIG. 49 is a schematic perspective view of a light beam scanning system according to still another embodiment of the present invention.
Figure 50A:
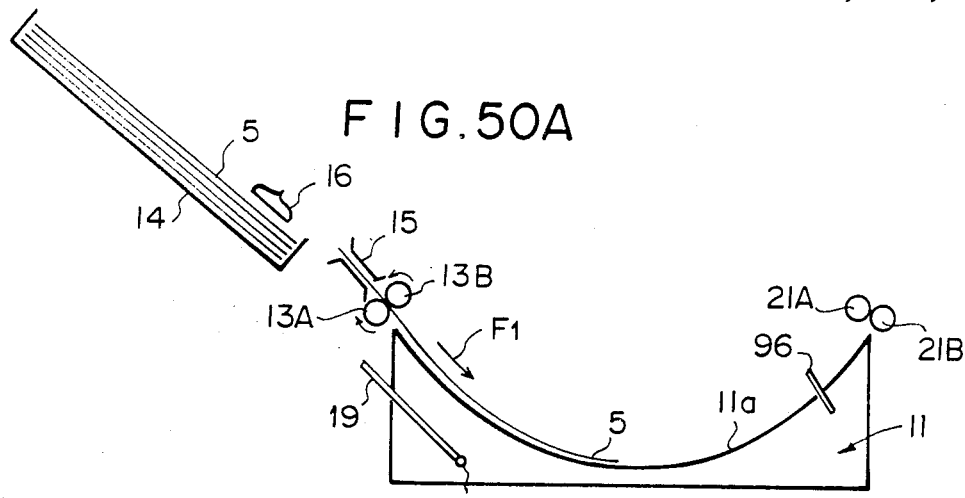
FIGS. 50A through 50H are schematic side elevational views showing the manner in which the light beam scanning system of FIG. 49 operates.

FIGS. 49 and 50A through 50 show a light beam scanning system according to still another embodiment of the present invention. The light beam scanning system illustrated in FIG. 49 is similar to that of FIG. 2, except that two lifter pins 96 retractably project upwardly from the support surface 11a of the recording medium support 11. The lifter pins 96 are vertically movable by suitable actuators such as linear solenoids between a first upper position above the support surface 11a and a second lower position beneath the support surface 11a.

Figure 50B:
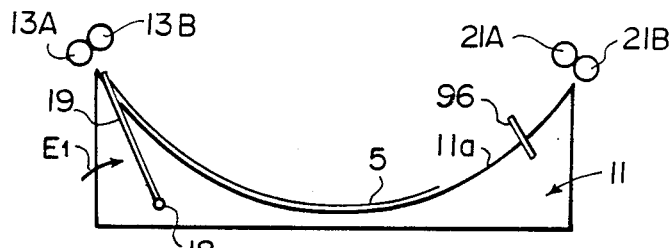
Figure 50C:
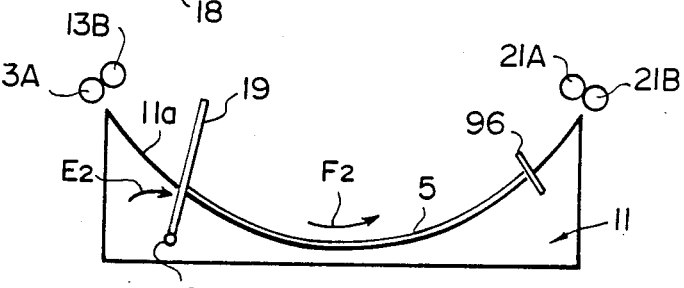
Figure 50D:
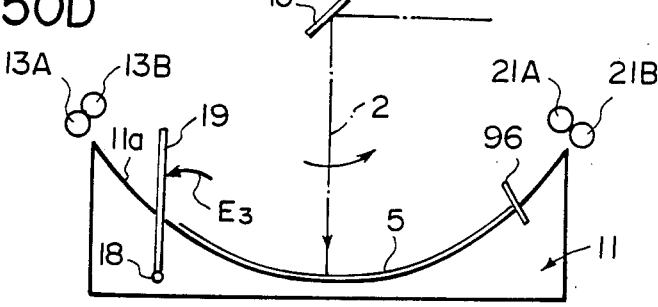

While the recording medium 5 is being introduced onto the support surface 11a, the lifter pins 96 are lifted in the first position as shown in FIGS. 50A and 50B. The recording medium 5 as it is pushed by the feeder arms 19 in the direction of the arrow F2 is stopped in the desired recording position by the lifter pins 96 as shown in FIG. 50C. When the recording medium 5 has been positioned, it is two-dimensionally scanned by the light beam 2, as shown in FIG. 50D.

Figure 50E:
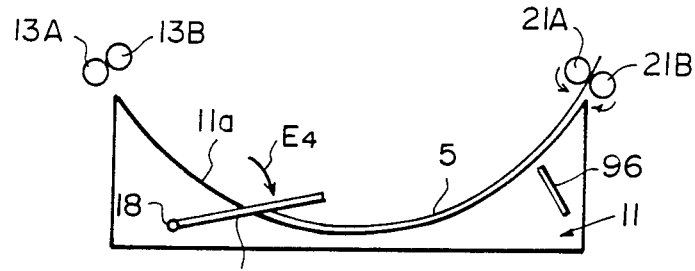
Figure 50F:
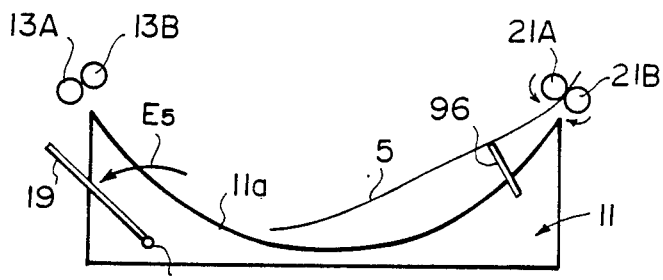
Figure 50G:
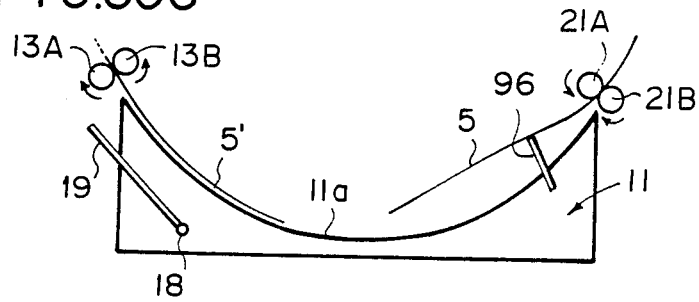
Figure 50H:
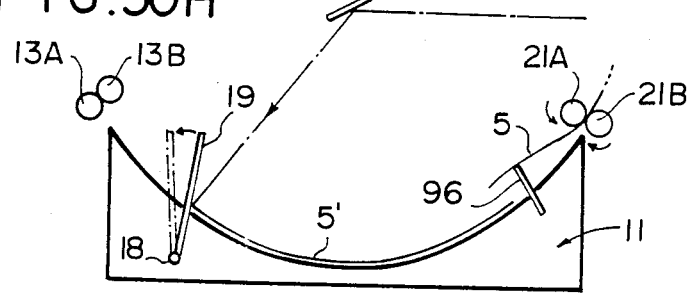

After the recording medium 5 has been scanned, the lifter pins 96 are retracted downwardly into the second position within the recording medium support 11, allowing the recording medium 5 to be pushed by the feeder arms 19 and gripped by the outlet rollers 21A, 21B, as shown in FIG. 50E. Upon the leading edge of the recording medium 5 being gripped by the outlet rollers 21A, 21B, the lifter pins 96 are raised into the first position to lift the entire recording medium 5 off the support surface 11a under its own regidity or stiffness, as illustrated in FIG. 50F. At the same time, the feeder arms 19 are returned to their original position. Since the recording medium 5 as it is discharged by the outlet rollers 21A, 21B is lifted off the support surface 11a, a next recording medium 5 can simultaneously be introduced by the inlet rollers 13A, 13B onto the support surface 11a. The next recording medium 5 starts being supplied immediately when the preceding recording medium 5 is lifted by the lifter pins 96, as shown in FIG. 50G. The next recording medium 5 thus introduced is pushed again by the feeder arms 19 and then stopped in the desired recording position by the lifter pins 96 which have been raised to lift the preceding recording medium 5. Inasmuch as the preceding recording medium 5 is continuously discharged and its trailing end is lifted off the support surface 11a, the next recording medium 5 is not brought into physical interference with the former recording medium 5. Even if the former recording medium 5 remains partly over the support surface 11a, the next recording medium 5 introduced and positioned on the support surface 11a can be two-dimensionally scanned by the light beam 2 by deflecting the light beam 2 from the trailing end of the recording medium 5, as shown in FIG. 50H. Accordingly, one recording medium can be introduced and scanned while the preceding recording medium is being discharged, and hence a plurality of recording mediums can successively be scanned within a relative short period of time. The number, the shape, and the extent of projection of the lifter pins 96 may be selected dependent on the rigidity and size of the recording medium 5 for effectively lifting the same without causing damage thereto.

Figure 51A:
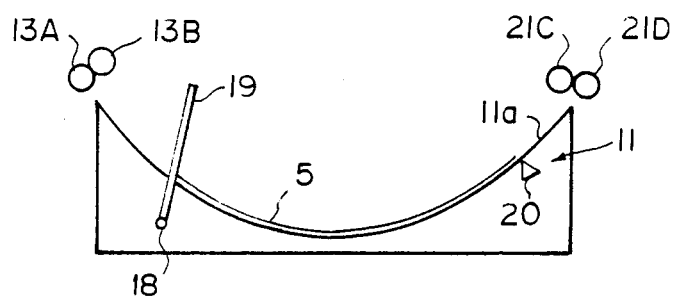
FIGS. 51A through 51C are schematic side elevational views illustrative of the manner in which a modified light beam scanning system operates.
Figure 51B:
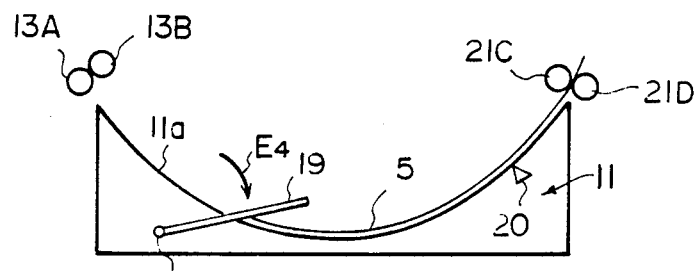
Figure 51C:
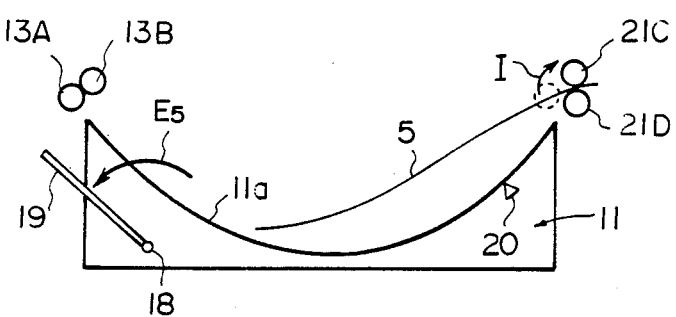

FIGS. 51A through 51C show a modified light beam scanning system in which outlet rollers 21C, 21D are arranged to lift the recording medium 5 off the support surface 11a. After the recording medium 5 has been scanned, it is pushed by the feeder arms 19 from the position of FIG. 51A until the leading end of the recording medium 5 is gripped by the outlet rollers 21C, 21D as shown in FIG. 51B. When the outlet rollers 21C, 21D grip the leading end of the recording medium 5, the outlet roller 21C is swung in the direction of the arrow I (FIG. 51C) about the axis of rotation of the outlet roller 21D to lift the recording medium 5 off the support surface 11a. While the recording medium 5 is then being discharged by the outlet rollers 21C, 21D, a next recording medium can be introduced by the inlet rollers 13A, 13B and the feeder arms 19 onto the support surface 11a. Instead of the outlet roller 21C, the outlet roller 21D may be swung in a direction opposite to the direction of the arrow I about the axis of rotation of the outlet roller 21C to lift the recording medium 5 off the support surface 11a.

Figure 52:
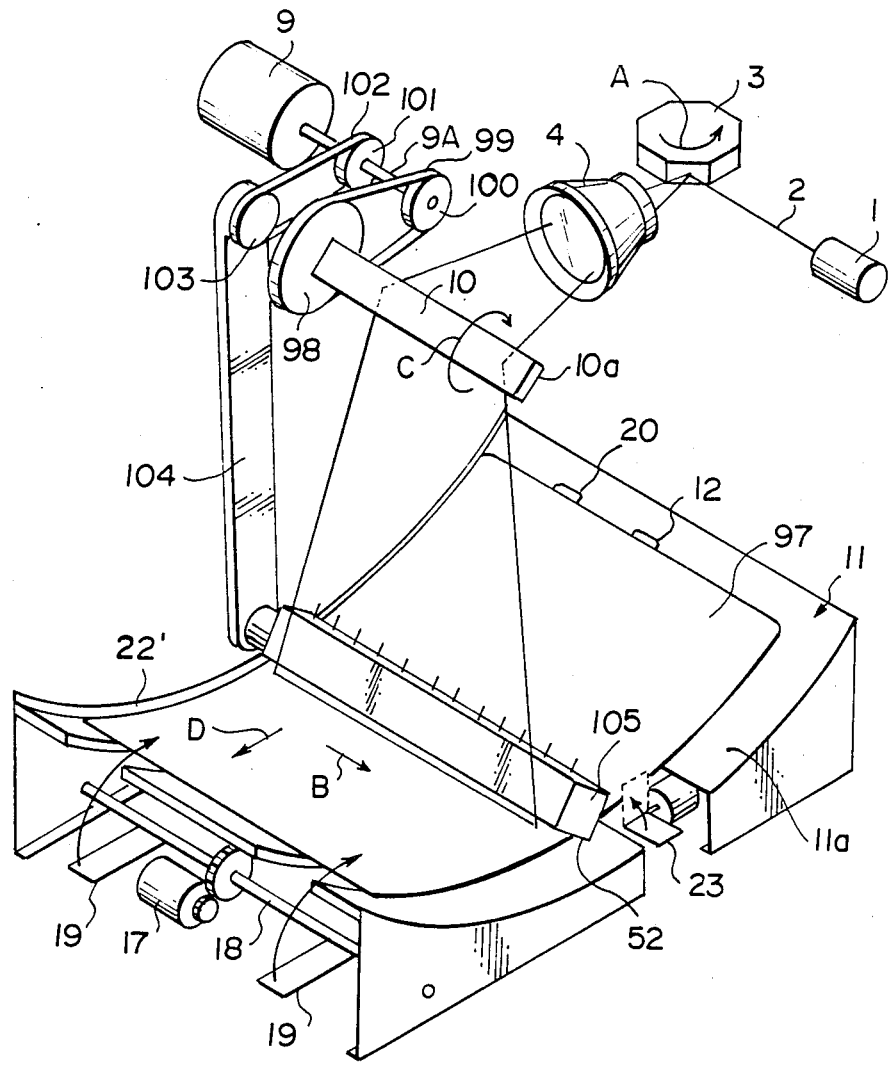
FIG. 52 is a schematic perspective view of a light beam scanning system according to a still further embodiment of the present invention, with inlet and outlet rollers omitted from illustration.
Figure 61:
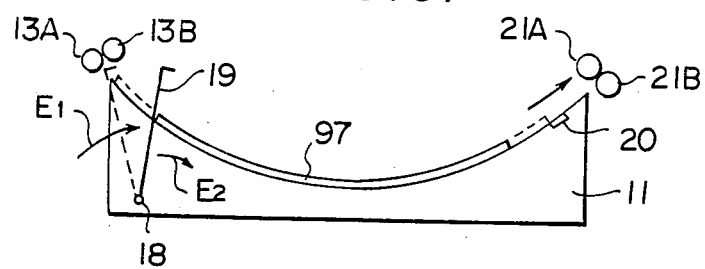
FIG. 61 is a schematic side elevational view of the light beam scanning system of FIG. 52.
Figure 64:
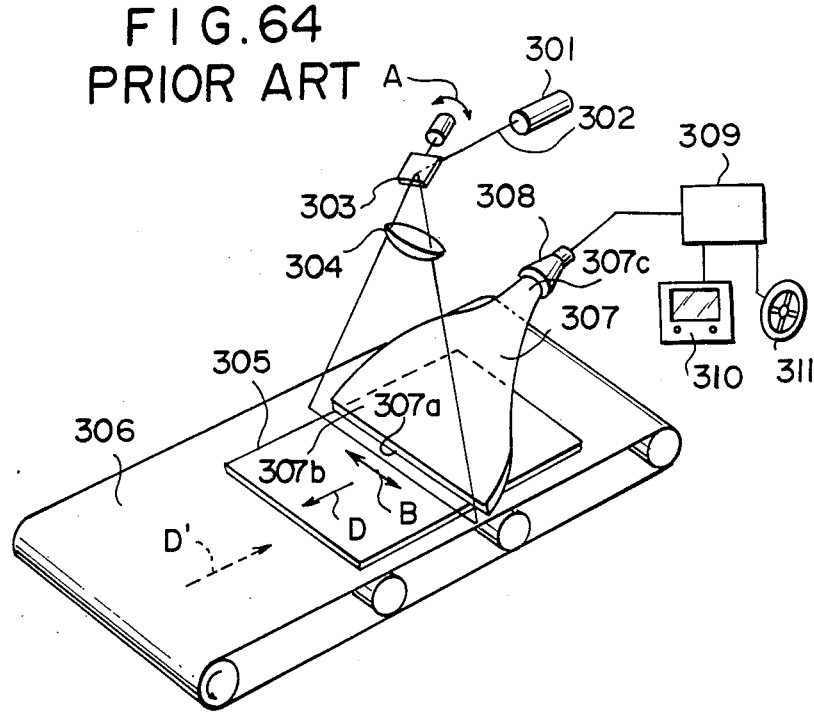
Figure 65:
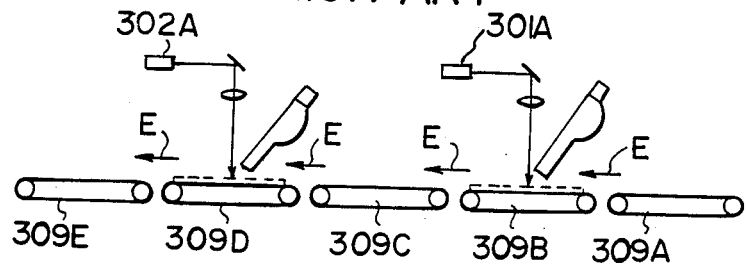

FIG. 52 shows a light beam scanning system incorporated in an image reading apparatus for reading out recorded radiation image information. The light beam scanning system of FIG. 52 includes a laser beam source 1 for emitting a light beam 2, a main scanning light beam deflector 3, an image-forming lens 4, a motor 9, an auxiliary scanning light beam deflector 10, a recording medium support 11, a motor 17, a shaft 18, a pair of feeder arms 19, a shifter arm 23, an actuator 24, and detectors 12, 20, which are identical to those shown in FIG. 1. The recording medium support 11 has a guide plate 22' which is the same as that illustrated in FIG. 8A. The light beam scanning system also includes inlet rollers 13A, 13B and outlet rollers 21A, 21B, as shown in FIG. 61, which are identical to those shown in FIG. 2.

A sheet-like recording medium 97 to be supported on the support surface 11a of the recording medium support 11 may comprise a stimulable phosphor sheet capable of storing radiation image information upon exposure to radiation that has passed through an object to be imaged and of emitting light representing such stored radiation image information when stimulating light such as visible light is applied to the stimulable phosphor sheet.

The auxiliary scanning light beam deflector or reflecting mirror 10 supports on one end a pulley 98 operatively coupled by a belt 99 to a pulley 100 mounted on a rotatable output shaft 9A of the motor 9. The output shaft 9A supports thereon another pulley 101 operatively coupled by a belt 102 to a pulley 103 on an upper end of an arm 104 which supports on a lower end thereof an elongate box-shaped light detector 105 comprising a photomultiplier positioned immediately above and movable over the recording medium 97. The pulleys 98, 103 are held in coaxial relation to each other. The photomultiplier 105 serves to detect light representative of recorded radiation image information which is emitted from the recording medium 97 upon exposure to the stimulating light beam 2 reflected from the auxiliary scanning reflecting mirror 10.

The photomultiplier 105 has a light entry surface 52 extending along the main scanning line and having a length which is preferably greater than the scanned width of the recording medium 97 for allowing light emitted therefrom at any position in the main scanning direction to enter the photomultiplier 105 through the light entry surface 52. The light applied to the photomultiplier 105 is then converted thereby to an electric signal that is fed to an image information reader (not shown), from which it is displayed as a visible image on a CRT or recorded on a magnetic storage medium such as a magnetic tape.

When the motor 9 is energized, the auxiliary scanning mirror 10 and the photomultiplier 105 are angularly moved at the same time. The pulleys 100, 101 are identical in construction, and the pulley 103 has a diameter which is substantially half that of the pulley 98. These pulley configurations permit the photomultiplier 105 to angularly move at an angular velocity that is twice that of the auxiliary scanning mirror 10, so that the photomultiplier 105 can sweep in the auxiliary scanning direction closely to the main scanning line as it is moved in the same direction by angular movement of the auxiliary scanning mirror 10.

The auxiliary scanning mirror 10 and the photomultiplier 105 may be coaxially rotated by independent motors operatively coupled thereto, respectively.

After the stored image information has been read out from the recording medium 5 over its entire surface through the angular movement of the auxiliary scanning mirror 10 and the photomultiplier 105 at prescribed speeds and through a given angle, the auxiliary scanning mirror 10 and the photomultiplier 105 are angularly moved backwards or continuously angularly moved to make a full revolution, until the mirror 10 and the photomultiplier 105 reach their initial position in readiness for a next read-out cycle.

The light detector 12 mounted on the recording medium support 11 detects the stimulating light beam 2 to determine the position to start scanning the recording medium 5 for image read-out. More specifically, the light detector 12 detects the stimulating light beam as it reaches a leading end of the recording medium 97 on scanning movement from its initial position in the direction of the arrow D when the auxiliary scanning mirror 10 is angularly moved in the direction of the arrow C. At this time, the photomultiplier 105 is energized to start reading out emitted light indicative of the stored image information.

Conventional photomultipliers are classified into several types dependent on the construction of dynodes cascaded in a multiplier assembly for multiplying a small photoelectric current to a suitable level. The elongate photomultiplier of the present invention can be constructed by elongating any of these photomultipliers in a direction normal to the sides thereof. FIGS. 53 and 54 illustrate the photomultiplier 105 of the invention, which has a box-shaped dynode structure. The photomultiplier 105 has an evacuated body 51 made of glass, for example, and housing a photocathode 53 disposed against the elongate light entry surface 52, and a multiplier assembly 67 disposed below (as viewed in FIGS. 53, 54) the photocathode 53 and comprising a plurality (thirteen in the illustrated embodiment) of dynodes 54 through 66 for emitting secondary electrons in response to primary electrons impinging upon them. Each of the dynodes 54 through 66 is in the form of a quadrantal cylindrical wall. A shield electrode 68 is disposed in confronting relation to the lowermost dynode 66, and an anode 69 is disposed in the shield electrode 68 for collecting electrons multiplied by the multiplier assembly 67 as a signal which can be picked up from the photomultiplier 105. The photocathode 53, the dynodes 54 through 66, the shield electrode 68, and the anode 69 are electrically connected to respective terminals 70 supported on the body 51 remotely from the light entry surface 52. The dynodes 54 through 66 and the shield electrode 68 are fixedly supported in the body 51 by a support 71 made of an insulating material.

Figure 55:
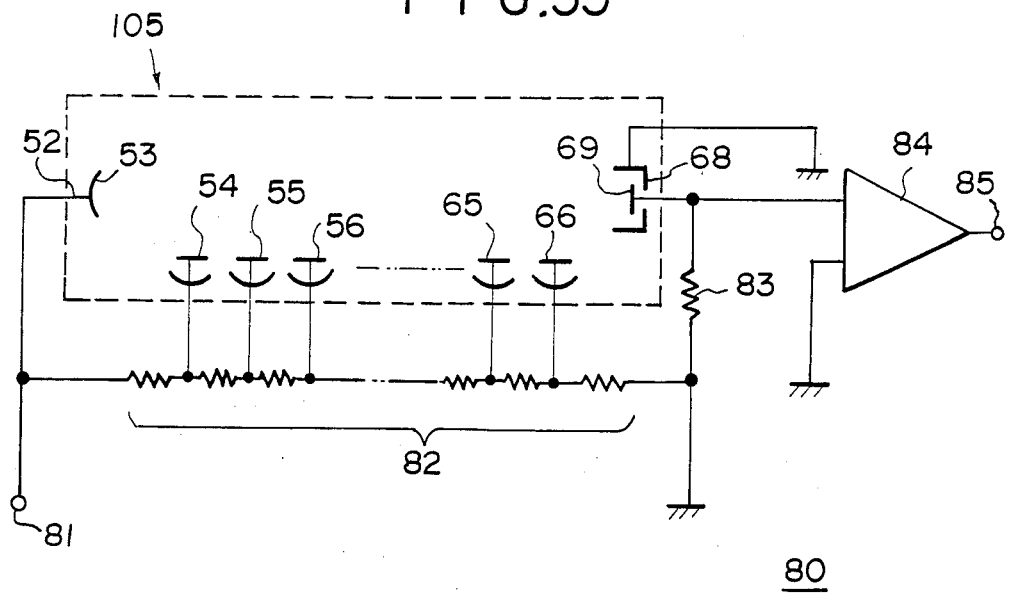
FIG. 55 is a circuit diagram of an electric circuit for driving the photomultiplier.

FIG. 55 shows an electric circuit for driving the photomultiplier 105 to pick up a photoelectric output. A negative high voltage is applied to the photocathode 53 through a terminal 81. The negative high voltage applied to the terminal 81 is divided by a group 82 of bleeder resistors into lower voltages which are applied to the dynodes 54 through 66. The shield electrode 68 is grounded, and the anode 69 is grounded through a resistor 83 and connected to one input terminal of an amplifier 84, the other input terminal thereof being grounded. The amplifier 84 has an output terminal 85 for issuing an electric signal which is photoelectrically converted from the image information stored on the recording medium 97.

FIGS. 56 and 57 illustrate a photomultiplier 106 according to another embodiment of the present invention. The photomultiplier 106 has a bynode structure generally referred to as the venetian blind type. The photomultiplier 106 includes a cylindrical body 151 housing a photocathode 153 extending along and held against a light entry surface 152. A mutiplier assembly 167 in the body 151 comprises a plurality (thirteen in the illustrated embodiment) of dynodes 154 through 166 disposed below (as viewed in FIGS. 56 and 57) the photocathode 153. The dynodes 154 through 166 are mutually spaced by insulating members 172 and connected together by pins 173. Each of the dynodes 154 through 166 comprises a single conductive plate having a number of channel-shaped and bent cutouts, the dynodes 154 through 166 being stacked in a blind configuration. A shield electrode 168 is disposed below the multiplier assembly 168 and fixed thereto by the pins 173 with insulating members 172 interposed therebetween. An anode 169 is disposed in the shield electrode 168. The dynodes 154 through 166, the shield electrode 168, and the anode 169 are electrically coupled to terminals 170 mounted on an end of the body 151. A photoelectric output of the photomultiplier 106 can be picked up through an electric circuit that is identical to the electric circuit shown in FIG. 55.

An elongate photomultiplier according to the present invention may also be constructed by elongating a conventional photomultiplier having a multiplier assembly comprising dynodes of another type or dynodes of different types. Alternatively, another light detector such as a contact-type photosensor array may be employed instead of the elongate photomultiplier, or a light detector comprising a photomultiplier mounted on an exit end of a light guide may also be employed.

Use of the elongate photomultiplier is advantageous in that the light beam scanning system is relatively small in size, and the light beam scanning system is manufactured at a reduced cost since it does not use a light guide which is manufactured through a complex process and at a large cost. Since the light entry surface of the photomultiplier is located closely to the recording medium, almost all light emitted from the recording medium is directly applied to the photomultiplier, and hence the efficiency of the photomultiplier to collect emitted light is high. Such light collecting efficiency can further be increased by placing a reflecting mirror in confronting relation to the light entry surface of the photomultiplier with the main scanning line interposed therebetween.

The apparatus for reading out recorded radiation image information is particularly required to collect light highly efficiently which is emitted from the stimulable phosphor sheet. The stimulating light beam applied to the stimulable phosphor sheet tends to be partly reflected by the sheet toward the light entry surface of the photomultiplier. For this reason, the photomultiplier should be arranged not to detect any reflected light of the stimulating light beam. The elongate photomultiplier for use in the apparatus for reading out recorded radiation image information should therefore preferably be provided on the light entry surface with a light guide of a small thickness mounted on the light entry surface and a filter for only passing light having a wavelength belonging to the wavelength region of the light emitted from the stimulable phosphor sheet. Various combinations of a light guide and a filter will be described with reference to FIGS. 58A through 58F.

FIG. 58A shows a filter and light guide combination composed of a filter 107 mounted on the flat light entry surface 52 of the box-shaped photomultiplier 105 and a plate-like light guide 108 of acrylic resin disposed on the filter 107. Since the light guide 108 is thin and simple in shape, the size and cost of the light beam scanning system are not increased. The filter 107 and the light guide 108 may be switched around in position as shown in FIG. 58B. According to another embodiment of FIG. 58C, a light guide 107' is colored to transmit light in the wavelength region of the light emitted from the recording medium and absorb light in the wavelength region of the stimulating light beam. Therefore, the light guide 107' doubles as a filter, and no separate filter is required.

FIG. 58D shows an arcuate filter 109 mounted on the arcuate light entry surface 152 of the cylindrical photomultiplier 106 and a light guide 110 disposed on the filter 109 and having an arcuate surface fitted over the arcuate filter 109. In another embodiment shown in FIG. 58E, the light guide 110 has its arcuate surface fitted over the arcuate light entry surface 152 of the cylindrical photomultiplier 106 and the flat filter 107 is disposed on the light guide 110. FIG. 58F shows a further embodiment in which a filter 111 has an arcuate surface fitted over the arcuate light entry surface 152 of the cylindrical photomultiplier 106, the flat light guide 108 being disposed on the filter 111. To provide uniform filter characteristics despite the varying thicknesses of the filter 111 in the transverse direction, the color density of the filter 111 is varied such that the color density is lower for thicker filter portions.

Figure 59:
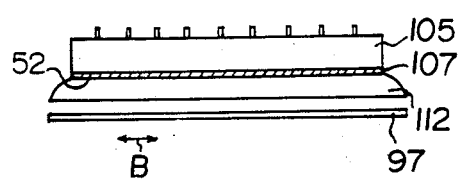
FIG. 59 is an elevational view of a modified light guide.

Rather than employing filter and light guide combinations, only one of the filter and the light guide may be disposed on the light entry surface of the photomultiplier.

Where the photomultiplier 105 is somewhat shorter than the scanned width of the recording medium 97, as shown in FIG. 59, a light guide 112 which flares toward the recording medium 97 is mounted on the filter 107 on the light entry surface 52 of the photomultiplier 105. This flaring light guide 112 serves to effectively guide light emitted from the recording medium 97 across its entire scanned width toward the light entry surface 52.

Figure 60:
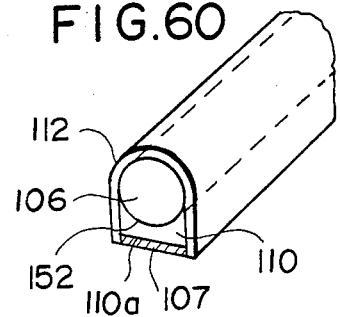
FIG. 60 is a fragmentary perspective view of a light shield case on a photomultiplier.

Any light entering the elongate photomultiplier 105 or 106 without passing through the light entry surface or the filter would be apt to appear as noise on reproduced images. To prevent such noise from being produced, the photomultiplier 106 may be covered with a light shield case 112, as shown in FIG. 60, for preventing extraneous light from entering the photomultiplier 106 to thereby allow image information to be read out more accurately. The light shield case 112 extends around the photomultiplier 106 and has its side legs extending along the sides of the light guide 110 down to the sides of the filter 107 disposed on the light entry end 110a of the light guide 110. The elongate photomultiplier 105 or 106 in the light beam scanning system is more susceptible to external magnetic fields than smaller photomultipliers. If the photomultiplier 105 or 106 were subjected to an external magnetic field, the multiplication ratio thereof would be varied to a large extent. It is preferable therefore to make the light shield case 112 of permalloy or the like so that the light shield case 112 doubles as a magnetic shield case.

Preliminary and main reading modes can successively be effected by reciprocally moving the auxiliary scanning mirror 10 without delivering the recording medium 97. Therefore, image information can efficiently be read out in the preliminary and main reading modes without any undesired loss in time.

The light beam scanning system may also be incorporated in other image reading apparatus than the apparatus for reading out radiation image information.

Although certain preferred embodiments have been shown and described, it should be understood that many changes and modifications may be made therein without departing from the scope of the appended claims.

We claim:

1. A light beam scanning system for two-dimensionally scanning a recording medium with a light beam, comprising:
   (i) a light beam source for emitting the light beam;
   (ii) a main scanning light deflector for deflecting the light beam from said light beam source in a main scanning direction;
   (iii) an auxiliary scanning light deflector angularly movable about an axis for deflecting the light beam in an auxiliary scanning direction which is substantially perpendicular to said main scanning direction;
   (iv) an image-forming lens disposed between said main and auxiliary scanning light deflectors for passage therethrough of the light beam traveling from said main scanning light deflector to said auxiliary scanning light deflector; and
   (v) a recording medium support having a support surface for supporting the recording medium thereon to cause the recording medium to be scanned with the light beam deflected by said main and auxiliary scanning light deflectors, said support surface having an arcuate shape having a center of curvature substantially aligned with said axis of angular movement of said auxiliary scanning light deflector.

2. A light beam scanning system according to claim 1, wherein said axis of angular movement of said auxiliary scanning light deflector lies on a line of intersection between a plane including a path of the light beam having passed through said image-forming lens or a plane parallel to said first-mentioned plane and a plane lying perpendicularly to an optical axis of said image-forming lens.

3. A light beam scanning system according to claim 2, wherein said auxiliary scanning light deflector comprises an elongate plane mirror having a longitudinal axis which extends in said main scanning direction and about which the elongate plane mirror is angularly movable.

4. A light beam scanning system according to claim 1, further including inlet means at one end of said recording medium support for delivering the recording medium to a position forward of a desired position on the support surface, outlet means at an opposite end of said recording medium support for discharging the recording medium from said support surface, and feeder means on said recording medium support for feeding the recording medium from said first-mentioned position to said desired position and for feeding the recording medium from said desired position until an end thereof is held by said outlet means.

5. A light beam scanning system according to claim 4, wherein said inlet means comprises a pair of inlet rollers and said outlet means comprises a pair of outlet rollers.

6. A light beam scanning system according to claim 4, wherein said feeder means comprises a pair of feeder arms angularly movably supported on said recording medium support.

7. A light beam scanning system according to claim 4, wherein said feeder means comprises a feeder roller having a longitudinal axis extending in said main scanning direction and rotatably mounted on said recording medium support, said feeder roller being movable between a first position in which it has an upper peripheral surface lying above said support surface and a second position in which the upper peripheral surface thereof is retracted from said support surface, said feeder roller feeding said recording medium to and from said desired position when the feeder roller is in said first position.

8. A light beam scanning system according to claim 1, including shifter means on said recording medium support for shifting said recording medium in said main scanning direction on said support surface.

9. A light beam scanning system according to claim 8, wherein said shifter means comprises a shifter arm angularly movably disposed at one side of said recording medium support, said shifter arm being angularly movable between a first position in which it engages and pushes a side edge of said recording medium on said support surface and a second position in which it is retracted from said side edge of the recording medium.

10. A light beam scanning system according to claim 8, wherein said shifter means comprises at least one shifter roller rotatably disposed in said recording medium support, said shifter roller being angularly movable between a first position in which it has an upper peripheral surface lying above said support surface and a second position in which said peripheral surface is retracted from said support surface, said shifter roller shifting said recording medium when it is in said first position.

11. A light beam scanning system according to claim 8, further including a guide plate mounted on an opposite side of said recording medium support for engaging an opposite side edge of said recording medium when the recording medium is pushed by said shifter means.

12. A light beam scanning system according to claim 10, wherein said guide plate has a straight upper edge.

13. A light beam scanning system according to claim 10, wherein said guide plate has an arcuate upper edge.

14. A light beam scanning system according to claim 10, wherein said guide plate comprises a pair of spaced guide plates.

15. A light beam scanning system according to claim 1, further including delivery means at one end of said recording medium support for introducing the recording medium onto said support surface to a position forward of a desired position on the support surface and for discharging the recording medium from said support surface, and feeder means on said recording medium support for feeding the recording medium from said first-mentioned position to said desired position and for feeding the recording medium back from said desired position until an end thereof is held by said delivery means.

16. A light beam scanning system according to claim 15, wherein said delivery means comprises a pair of delivery rollers rotatable selectively in opposite directions.

17. A light beam scanning system according to claim 15, wherein said feeder means comprises a feeder roller having a longitudinal axis extending in said main scanning direction and rotatably mounted on said recording medium support, said feeder roller being movable between a first position in which it has an upper peripheral surface lying above said support surface and a second position in which the upper peripheral surface thereof is retracted from said support surface, said feeder roller feeding said recording medium to and from said desired position when the feeder roller is in said first position.

18. A light beam scanning system according to claim 1, further including a light detector disposed on said support surface at a leading end of said recording medium in said auxiliary scanning direction for detecting the light beam from said auxiliary scanning light deflector to determine a position to start scanning said recording medium in the auxiliary scanning direction.

19. A light beam scanning system according to claim 1, wherein said support surface and said recording medium have different reflectivities, further including a light detector disposed above said support surface at a leading end of said recording medium in said auxiliary scanning direction for detecting light reflected from said support surface to determine a position to start scanning said recording medium in the auxiliary scanning direction.

20. A light beam scanning system according to claim 1, further including means for introducing said recording medium onto said support surface in said auxiliary direction, and a detector for detecting a leading end of said recording medium introduced onto said support surface, said means being inactivatable in response to detection by said detector of said leading end of said recording medium.

21. A light beam scanning system according to claim 20, wherein said means comprises inlet means at one end of said recording medium support for delivering the recording medium to a position forward of a desired position on the support surface, and feeder means on said recording medium support for feeding the recording medium from said first-mentioned position to said desired position.

22. A light beam scanning system according to claim 1, further including first stop means on said recording medium support for stopping said recording medium in said main scanning direction, second stop means on said recording medium support for stopping said recording medium in said auxiliary scanning direction, inlet means for introducing said recording medium onto said support surface, and feeder/shifter means on said recording medium support for simultaneously moving said recording medium toward said first and second stop means.

23. A light beam scanning system according to claim 22, wherein said feeder/shifter means comprises a feeder/shifter roller rotatably mounted in said recording medium support and extending obliquely to said main and auxiliary scanning directions, said feeder/shifter roller being movable between a first position in which it has an upper peripheral surface lying above said support surface and a second position in which the upper peripheral surface thereof is retracted from said support surface, said feeder/shifter roller moving said recording medium toward said first and second stop means when the feeder/shifter roller is in said first position.

24. A light beam scanning system according to claim 22, wherein said first stop means comprises a guide plate attached to a side edge of said recording medium support and extending in said auxiliary scanning direction.

25. A light beam scanning system according to claim 22, wherein said second stop means comprises a detector for detecting a leading end of said recording medium, said feeder/shifter means being inactivatable upon detection by said detector of said leading end of said recording medium.

26. A light beam scanning system according to claim 22, wherein said second stop means comprises a stop plate angularly movably mounted on said recording medium support at one end thereof.

27. A light beam scanning system according to claim 22, wherein said feeder/shifter means comprises a pair of feeder/shifter rollers rotatably mounted in said recording medium support and having aligned axes.

28. A light beam scanning system according to claim 22, wherein said feeder/shifter means comprises a pair of feeder/shifter rollers rotatably mounted in said recording medium support and having parallel axes.

29. A light beam scanning system according to claim 22, wherein said feeder/shifter means comprises a pair of feeder/shifter endless belts operatively mounted in said recording medium support and extending parallel to each other.

30. A light beam scanning system according to claim 1, further including means for attracting said recording medium against said support plate.

31. A light beam scanning system according to claim 30, wherein said means comprises suction means for developing a vacuum to attract said recording medium against said support plate.

32. A light beam scanning system according to claim 31, wherein said suction means comprises a suction box disposed in said recording medium support, said support surface having a plurality of holes communicating with said suction box.

33. A light beam scanning system according to claim 31, wherein said suction means comprises a suction box disposed in said recording medium support, said support surface having a groove communicating with said suction box.

34. A light beam scanning system according to claim 30, wherein said recording medium has a magnetic area, said means comprising magnetic means disposed in said recording medium support for magnetically attracting said magnetic area to hold said recording medium against said support surface.

35. A light beam scanning system according to claim 34, wherein said magnetic means comprises at least one permanent magnet movable between a first position to magnetically attract said recording medium against said support surface and a second position to release said recording medium.

36. A light beam scanning system according to claim 34, wherein said magnetic means comprises at least one electromagnet and a power supply for selectively energizing said electromagnet to magnetically attract and release said recording medium.

37. A light beam scanning system according to claim 1, further including a bimorph-type piezoelectric device connected to said auxiliary scanning light deflector and displaceable in response to a command signal for angularly moving said auxiliary scanning light deflector through an angular interval proportional to said command signal, an angle detector for producing an angle signal indicative of an angle through which said auxiliary light deflector has been angularly moved, and control means receptive of said command signal and said angle signal for applying a signal having a voltage based on said command signal and said angle signal to said bimorph-type piezoelectric device to correct the angle of said auxiliary scanning light deflector.

38. A light beam scanning system according to claim 37, wherein said angle detector comprises a resolver.

39. A light beam scanning system according to claim 37, further including a support on which said auxiliary light deflector is supported, said bimorph-type piezoelectric device being connected to one end of said support and said angle detector being connected to an opposite end of said support.

40. A light beam scanning system according to claim 1, wherein said support surface has a beam reflecting strip extending in said auxiliary scanning direction so as to lie along and outside of one edge of said recording medium and located within an area of said support surface which can be scanned by said light beam, further including a light detector disposed above said beam reflecting strip for detecting light reflected by said beam reflecting stop to produce a signal for synchronizing main scanning cycles.

41. A light beam scanning system according to claim 1, further including inlet means at one end of said recording medium support for delivering the recording medium onto said support surface, outlet means at an opposite end of said recording medium support for discharging the recording medium from said support surface, feeder means on said recording medium support for feeding the recording medium from said desired position to a position in which an end thereof is held by said outlet means, and lifter means on said recording medium support for lifting said recording medium off said support surface when said recording medium is fed to said position.

42. A light beam scanning system according to claim 41, wherein said lifter means comprises at least one lifter pin movable between a first position in which it projects above said support surface to lift said recording medium off said support surface and a second position in which it is retracted from said support surface to allow said recording medium to be placed on said support surface.

43. A light beam scanning system according to claim 41, wherein said outlet means comprises a pair of outlet rollers, said lifter means comprising said outlet rollers, one of which is angularly movable about an axis of the other roller for lifting said recording medium off said support surface when said end of the recording medium is gripped by said outlet rollers.

44. A light beam scanning system according to claim 1, further including a pair of spaced guide members disposed on said support surface and extending in said auxiliary scanning direction for guiding said recording medium while it is being introduced onto said support surface, at least one of said guide members being movable in said main scanning direction.

45. A light beam scanning system according to claim 44, wherein each of said guide members comprises a substantially horizontal flange and a substantially vertical side wall extending from said flange toward said support surface, said guide members being arranged to allow said recording medium to be guided between said side walls and below said flanges.

46. A light beam scanning system according to claim 44, further including a feed screw on which said guide members are threadedly mounted, whereby said guide members are relatively movable upon rotation of said feed screw.

47. A light beam scanning system according to claim 1, further including light detecting means angularly movable about an axis substantially aligned with said axis of said auxiliary scanning light deflector for detecting light from said recording medium on said support surface upon exposure to said light beam from said auxiliary scanning light deflector.

48. A light beam scanning system according to claim 47, wherein said light detecting means comprises an elongate photomultiplier having a light entry surface extending in said main scanning direction and disposed closely to said support surface.

49. A light beam scanning system according to claim 47, wherein said recording medium comprises a stimulable phosphor sheet storing radiation image information and capable of emitting said light representative of the stored radiation image information upon exposure to said light beam.

50. A light beam scanning system according to claim 47, wherein said elongate photomultiplier is box-shaped.

51. A light beam scanning system according to claim 47, wherein said elongate photomultiplier is cylindrical in shape.

52. A light beam scanning system according to claim 47, further including a combination of a filter and a light guide disposed on said light entry surface.

53. A light beam scanning system according to claim 52, further including a light/magnetic shield case disposed around said photomultiplier and extending over sides of said filter and said light guide.

* * * * *